(12) United States Patent
Kurs et al.

(10) Patent No.: US 11,112,814 B2
(45) Date of Patent: *Sep. 7, 2021

(54) IMPEDANCE ADJUSTMENT IN WIRELESS POWER TRANSMISSION SYSTEMS AND METHODS

(71) Applicant: WiTricity Corporation, Watertown, MA (US)

(72) Inventors: Andre B. Kurs, Chestnut Hill, MA (US); Morris P. Kesler, Bedford, MA (US); Noam Katz, Lincoln, RI (US); Matthew Dillon, Hingham, MA (US); Herbert Toby Lou, Berkeley, CA (US)

(73) Assignee: WiTricity Corporation, Watertown, MA (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/837,904

(22) Filed: Dec. 11, 2017

(65) Prior Publication Data
US 2018/0101188 A1    Apr. 12, 2018

Related U.S. Application Data

(63) Continuation of application No. 14/459,870, filed on Aug. 14, 2014, now Pat. No. 9,857,821.
(Continued)

(51) Int. Cl.
*G05F 1/625* (2006.01)
*H02J 50/12* (2016.01)
(Continued)

(52) U.S. Cl.
CPC ............ *G05F 1/625* (2013.01); *B60L 53/122* (2019.02); *G05F 1/66* (2013.01); *H02J 50/12* (2016.02);
(Continued)

(58) Field of Classification Search
None
See application file for complete search history.

(56) References Cited

U.S. PATENT DOCUMENTS

| 645,576 A | 3/1900 | Tesla |
| 649,621 A | 5/1900 | Tesla |

(Continued)

FOREIGN PATENT DOCUMENTS

| CA | 142352 | 8/1912 |
| CN | 101789639 | 7/2010 |

(Continued)

OTHER PUBLICATIONS

European Office Action for European Application No. 14 758 224.1 dated Feb. 9, 2018 (7 pages).
(Continued)

*Primary Examiner* — Van H Nguyen
(74) *Attorney, Agent, or Firm* — Fish & Richardson P.C.

(57) ABSTRACT

The disclosure features wireless power transfer systems that include a power transmitting apparatus configured to wirelessly transmit power, a power receiving apparatus connected to an electrical load and configured to receive power from the power transmitting apparatus, and a controller connected to the power transmitting apparatus and configured to receive information about a phase difference between output voltage and current waveforms in a power source of the power transmitting apparatus, and to adjust a frequency of the transmitted power based on the measured phase difference.

17 Claims, 47 Drawing Sheets

Related U.S. Application Data

(60) Provisional application No. 61/927,452, filed on Jan. 14, 2014, provisional application No. 61/865,910, filed on Aug. 14, 2013, provisional application No. 62/024,993, filed on Jul. 15, 2014.

(51) Int. Cl.
    *H02J 50/50*     (2016.01)
    *H02J 50/80*     (2016.01)
    *B60L 53/122*     (2019.01)
    *G05F 1/66*     (2006.01)

(52) U.S. Cl.
CPC .............. *H02J 50/50* (2016.02); *H02J 50/80* (2016.02); *Y02T 10/70* (2013.01); *Y02T 10/7072* (2013.01); *Y02T 90/12* (2013.01); *Y02T 90/14* (2013.01)

(56) References Cited

U.S. PATENT DOCUMENTS

| | | | |
|---|---|---|---|
| 787,412 | A | 4/1905 | Tesla |
| 1,119,732 | A | 12/1914 | Tesla |
| 2,133,494 | A | 10/1938 | Waters |
| 3,517,350 | A | 6/1970 | Beaver |
| 3,535,543 | A | 10/1970 | Dailey |
| 3,780,425 | A | 12/1973 | Penn et al. |
| 3,871,176 | A | 3/1975 | Schukei |
| 4,088,999 | A | 5/1978 | Fletcher et al. |
| 4,095,998 | A | 6/1978 | Hanson |
| 4,180,795 | A | 12/1979 | Matsuda et al. |
| 4,280,129 | A | 7/1981 | Wells |
| 4,450,431 | A | 5/1984 | Hochstein |
| 4,588,978 | A | 5/1986 | Allen |
| 5,027,709 | A | 7/1991 | Slagle |
| 5,033,295 | A | 7/1991 | Schmid et al. |
| 5,034,658 | A | 7/1991 | Hiering et al. |
| 5,053,774 | A | 10/1991 | Schuermann et al. |
| 5,070,293 | A | 12/1991 | Ishii et al. |
| 5,118,997 | A | 6/1992 | El-Hamamsy |
| 5,216,402 | A | 6/1993 | Carosa |
| 5,229,652 | A | 7/1993 | Hough |
| 5,287,112 | A | 2/1994 | Schuermann |
| 5,341,083 | A | 8/1994 | Klontz et al. |
| 5,367,242 | A | 11/1994 | Hulman |
| 5,374,930 | A | 12/1994 | Schuermann |
| 5,408,209 | A | 4/1995 | Tanzer et al. |
| 5,437,057 | A | 7/1995 | Richley et al. |
| 5,455,467 | A | 10/1995 | Young et al. |
| 5,493,691 | A | 2/1996 | Barrett |
| 5,522,856 | A | 6/1996 | Reineman |
| 5,528,113 | A | 6/1996 | Boys et al. |
| 5,541,604 | A | 7/1996 | Meier |
| 5,550,452 | A | 8/1996 | Shirai et al. |
| 5,565,763 | A | 10/1996 | Arrendale et al. |
| 5,630,835 | A | 5/1997 | Brownlee |
| 5,697,956 | A | 12/1997 | Bornzin |
| 5,703,461 | A | 12/1997 | Minoshima et al. |
| 5,703,573 | A | 12/1997 | Fujimoto et al. |
| 5,710,413 | A | 1/1998 | King et al. |
| 5,742,471 | A | 4/1998 | Barbee, Jr. et al. |
| 5,821,728 | A | 10/1998 | Sshwind |
| 5,821,731 | A | 10/1998 | Kuki et al. |
| 5,864,323 | A | 1/1999 | Berthon |
| 5,898,579 | A | 4/1999 | Boys et al. |
| 5,903,134 | A | 5/1999 | Takeuchi |
| 5,923,544 | A | 7/1999 | Urano |
| 5,940,509 | A | 8/1999 | Jovanovich et al. |
| 5,957,956 | A | 9/1999 | Kroll et al. |
| 5,959,245 | A | 9/1999 | Moe et al. |
| 5,986,895 | A | 11/1999 | Stewart et al. |
| 5,993,996 | A | 11/1999 | Firsich |
| 5,999,308 | A | 12/1999 | Nelson et al. |
| 6,012,659 | A | 1/2000 | Nakazawa et al. |
| 6,047,214 | A | 4/2000 | Mueller et al. |
| 6,066,163 | A | 5/2000 | John |
| 6,067,473 | A | 5/2000 | Greeninger et al. |
| 6,108,579 | A | 8/2000 | Snell et al. |
| 6,127,799 | A | 10/2000 | Krishnan |
| 6,176,433 | B1 | 1/2001 | Uesaka et al. |
| 6,184,651 | B1 | 2/2001 | Fernandez et al. |
| 6,207,887 | B1 | 3/2001 | Bass et al. |
| 6,232,841 | B1 | 5/2001 | Bartlett et al. |
| 6,238,387 | B1 | 5/2001 | Miller, III |
| 6,252,762 | B1 | 6/2001 | Amatucci |
| 6,436,299 | B1 | 8/2002 | Baarman et al. |
| 6,450,946 | B1 | 9/2002 | Forsell |
| 6,452,465 | B1 | 9/2002 | Brown et al. |
| 6,459,218 | B2 | 10/2002 | Boys et al. |
| 6,473,028 | B1 | 10/2002 | Luc |
| 6,483,202 | B1 | 11/2002 | Boys |
| 6,515,878 | B1 | 2/2003 | Meins et al. |
| 6,535,133 | B2 | 3/2003 | Gohara |
| 6,561,975 | B1 | 5/2003 | Pool et al. |
| 6,563,425 | B2 | 5/2003 | Nicholson et al. |
| 6,597,076 | B2 | 7/2003 | Scheible et al. |
| 6,609,023 | B1 | 8/2003 | Fischell et al. |
| 6,631,072 | B1 | 10/2003 | Paul et al. |
| 6,650,227 | B1 | 11/2003 | Bradin |
| 6,664,770 | B1 | 12/2003 | Bartels |
| 6,673,250 | B2 | 1/2004 | Kuennen et al. |
| 6,683,256 | B2 | 1/2004 | Kao |
| 6,696,647 | B2 | 2/2004 | Ono et al. |
| 6,703,921 | B1 | 3/2004 | Wuidart et al. |
| 6,731,071 | B2 | 5/2004 | Baarman |
| 6,749,119 | B2 | 6/2004 | Scheible et al. |
| 6,772,011 | B2 | 8/2004 | Dolgin |
| 6,798,716 | B1 | 9/2004 | Charych |
| 6,803,744 | B1 | 10/2004 | Sabo |
| 6,806,649 | B2 | 10/2004 | Mollema et al. |
| 6,812,645 | B2 | 11/2004 | Baarman |
| 6,825,620 | B2 | 11/2004 | Kuennen et al. |
| 6,831,417 | B2 | 12/2004 | Baarman |
| 6,839,035 | B1 | 1/2005 | Addonisio et al. |
| 6,844,702 | B2 | 1/2005 | Giannopoulos et al. |
| 6,856,291 | B2 | 2/2005 | Mickle et al. |
| 6,858,970 | B2 | 2/2005 | Malkin et al. |
| 6,906,495 | B2 | 6/2005 | Cheng et al. |
| 6,917,163 | B2 | 7/2005 | Baarman |
| 6,917,431 | B2 | 7/2005 | Soljacic et al. |
| 6,937,130 | B2 | 8/2005 | Scheible et al. |
| 6,960,968 | B2 | 11/2005 | Odendaal et al. |
| 6,961,619 | B2 | 11/2005 | Casey |
| 6,967,462 | B1 | 11/2005 | Landis |
| 6,975,198 | B2 | 12/2005 | Baarman |
| 6,988,026 | B2 | 1/2006 | Breed et al. |
| 7,027,311 | B2 | 4/2006 | Vanderelli et al. |
| 7,035,076 | B1 | 4/2006 | Stevenson |
| 7,042,196 | B2 | 5/2006 | Ka-Lai et al. |
| 7,069,064 | B2 | 6/2006 | Govorgian et al. |
| 7,084,605 | B2 | 8/2006 | Mickle et al. |
| 7,084,799 | B1 | 8/2006 | Butler |
| 7,116,200 | B2 | 10/2006 | Baarman et al. |
| 7,118,240 | B2 | 10/2006 | Baarman et al. |
| 7,126,450 | B2 | 10/2006 | Baarman et al. |
| 7,127,293 | B2 | 10/2006 | MacDonald |
| 7,132,918 | B2 | 11/2006 | Baarman et al. |
| 7,147,604 | B1 | 12/2006 | Allen et al. |
| 7,180,248 | B2 | 2/2007 | Kuennen et al. |
| 7,191,007 | B2 | 3/2007 | Desai et al. |
| 7,193,418 | B2 | 3/2007 | Freytag |
| D541,322 | S | 4/2007 | Garrett et al. |
| 7,212,414 | B2 | 5/2007 | Baarman |
| 7,233,137 | B2 | 6/2007 | Nakamura et al. |
| D545,855 | S | 7/2007 | Garrett et al. |
| 7,239,110 | B2 | 7/2007 | Cheng et al. |
| 7,248,017 | B2 | 7/2007 | Cheng et al. |
| 7,251,527 | B2 | 7/2007 | Lyden |
| 7,288,918 | B2 | 10/2007 | DiStefano |
| 7,340,304 | B2 | 3/2008 | MacDonald |
| 7,375,492 | B2 | 5/2008 | Calhoon et al. |
| 7,375,493 | B2 | 5/2008 | Calhoon et al. |
| 7,378,817 | B2 | 5/2008 | Calhoon et al. |
| 7,382,636 | B2 | 6/2008 | Baarman et al. |

(56) References Cited

U.S. PATENT DOCUMENTS

| | | |
|---|---|---|
| 7,385,357 B2 | 6/2008 | Kuennen et al. |
| 7,443,135 B2 | 10/2008 | Cho |
| 7,462,951 B1 | 12/2008 | Baarman |
| 7,466,213 B2 | 12/2008 | Lobl et al. |
| 7,471,062 B2 | 12/2008 | Bruning |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,521,890 B2 | 4/2009 | Lee et al. |
| 7,525,283 B2 | 4/2009 | Cheng et al. |
| 7,545,337 B2 | 6/2009 | Guenther |
| 7,554,316 B2 | 6/2009 | Stevens et al. |
| 7,599,743 B2 | 10/2009 | Hassler, Jr. et al. |
| 7,615,936 B2 | 11/2009 | Baarman et al. |
| 7,639,514 B2 | 12/2009 | Baarman |
| 7,741,734 B2 | 6/2010 | Joannopoulos et al. |
| 7,795,708 B2 | 9/2010 | Katti |
| 7,825,543 B2 | 11/2010 | Karalis et al. |
| 7,825,544 B2 | 11/2010 | Jansen et al. |
| 7,835,417 B2 | 11/2010 | Heideman et al. |
| 7,843,288 B2 | 11/2010 | Lee et al. |
| 7,844,306 B2 | 11/2010 | Shearer et al. |
| 7,863,859 B2 | 1/2011 | Soar |
| 7,880,337 B2 | 2/2011 | Farkas |
| 7,884,697 B2 | 2/2011 | Wei et al. |
| 7,885,050 B2 | 2/2011 | Lee |
| 7,919,886 B2 | 4/2011 | Tanaka |
| 7,923,870 B2 | 4/2011 | Jin |
| 7,932,798 B2 | 4/2011 | Tolle et al. |
| 7,948,209 B2 | 5/2011 | Jung |
| 7,952,322 B2 | 5/2011 | Partovi et al. |
| 7,963,941 B2 | 6/2011 | Wilk |
| 7,969,045 B2 | 6/2011 | Schmidt et al. |
| 7,994,880 B2 | 8/2011 | Chen et al. |
| 7,999,506 B1 | 8/2011 | Hollar et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,106,539 B2 | 1/2012 | Schatz et al. |
| 8,115,448 B2 | 2/2012 | John |
| 8,131,378 B2 | 3/2012 | Greenberg et al. |
| 8,178,995 B2 | 5/2012 | Amano et al. |
| 8,193,769 B2 | 6/2012 | Azancot et al. |
| 8,212,414 B2 | 7/2012 | Howard et al. |
| 8,260,200 B2 | 9/2012 | Shimizu et al. |
| 8,304,935 B2 | 11/2012 | Karalis et al. |
| 8,324,759 B2 | 12/2012 | Karalis et al. |
| 8,334,620 B2 | 12/2012 | Park et al. |
| 8,362,651 B2 | 1/2013 | Hamam et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,441,154 B2 | 5/2013 | Karalis et al. |
| 8,457,547 B2 | 6/2013 | Meskens |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,157 B2 | 7/2013 | Cook et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,552,592 B2 | 10/2013 | Schatz et al. |
| 8,569,914 B2 | 10/2013 | Karalis et al. |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Karalis et al. |
| 8,629,578 B2 | 1/2014 | Kurs et al. |
| 8,643,326 B2 | 2/2014 | Campanella et al. |
| 8,730,016 B2 * | 5/2014 | El Waffaoui ..... G06K 19/07749 340/10.5 |
| 9,124,122 B2 * | 9/2015 | Kim ........................ H02J 5/005 |
| 9,508,488 B2 * | 11/2016 | Vendik .................... H01F 38/14 |
| 9,711,968 B2 * | 7/2017 | Kim ........................ H02J 5/005 |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0160590 A1 | 8/2003 | Schaefer et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0026998 A1 | 2/2004 | Henriott et al. |
| 2004/0090801 A1 | 5/2004 | Chen et al. |
| 2004/0100338 A1 | 5/2004 | Clark |
| 2004/0113847 A1 | 6/2004 | Qi et al. |
| 2004/0130425 A1 | 7/2004 | Dayan et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0021134 A1 | 1/2005 | Opie |
| 2005/0027192 A1 | 2/2005 | Govari et al. |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0116683 A1 | 6/2005 | Cheng et al. |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0135122 A1 | 6/2005 | Cheng et al. |
| 2005/0140482 A1 | 6/2005 | Cheng et al. |
| 2005/0151511 A1 | 7/2005 | Chary |
| 2005/0156560 A1 | 7/2005 | Shimaoka et al. |
| 2005/0189945 A1 | 9/2005 | Reiderman |
| 2005/0194926 A1 | 9/2005 | DiStefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0001509 A1 | 1/2006 | Gibbs |
| 2006/0010902 A1 | 1/2006 | Trinh et al. |
| 2006/0022636 A1 | 2/2006 | Xian et al. |
| 2006/0053296 A1 | 3/2006 | Busboom et al. |
| 2006/0061323 A1 | 3/2006 | Cheng et al. |

(56) References Cited

U.S. PATENT DOCUMENTS

| | | |
|---|---|---|
| 2006/0066443 A1 | 3/2006 | Hall |
| 2006/0090956 A1 | 5/2006 | Peshkovskiy et al. |
| 2006/0132045 A1 | 6/2006 | Baarman |
| 2006/0164866 A1 | 7/2006 | Vanderelli et al. |
| 2006/0181242 A1 | 8/2006 | Freed et al. |
| 2006/0184209 A1 | 8/2006 | John et al. |
| 2006/0184210 A1 | 8/2006 | Singhal et al. |
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0164839 A1 | 7/2007 | Naito |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0257636 A1 | 11/2007 | Phillips et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0036588 A1 | 2/2008 | Iverson et al. |
| 2008/0047727 A1 | 2/2008 | Sexton et al. |
| 2008/0051854 A1 | 2/2008 | Bulkes et al. |
| 2008/0067874 A1 | 3/2008 | Tseng |
| 2008/0132909 A1 | 6/2008 | Jascob et al. |
| 2008/0154331 A1 | 6/2008 | John et al. |
| 2008/0176521 A1 | 7/2008 | Singh et al. |
| 2008/0191638 A1 | 8/2008 | Kuennen et al. |
| 2008/0197710 A1 | 8/2008 | Kreitz et al. |
| 2008/0197802 A1 | 8/2008 | Onishi et al. |
| 2008/0211320 A1 | 9/2008 | Cook et al. |
| 2008/0231120 A1 | 9/2008 | Jin |
| 2008/0238364 A1 | 10/2008 | Weber et al. |
| 2008/0255901 A1 | 10/2008 | Carroll et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0291277 A1 | 11/2008 | Jacobsen et al. |
| 2008/0300657 A1 | 12/2008 | Stultz |
| 2008/0300660 A1 | 12/2008 | John |
| 2009/0010028 A1 | 1/2009 | Baarmen et al. |
| 2009/0015075 A1 | 1/2009 | Cook et al. |
| 2009/0033280 A1 | 2/2009 | Choi et al. |
| 2009/0033564 A1 | 2/2009 | Cook et al. |
| 2009/0038623 A1 | 2/2009 | Farbarik et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0072782 A1 | 3/2009 | Randall |
| 2009/0079268 A1 | 3/2009 | Cook et al. |
| 2009/0079387 A1 | 3/2009 | Jin et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0115628 A1 | 5/2009 | Dicks et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0161078 A1 | 6/2009 | Wu et al. |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0218884 A1 | 9/2009 | Soar |
| 2009/0224608 A1 | 9/2009 | Cook et al. |
| 2009/0224609 A1 | 9/2009 | Cook et al. |
| 2009/0224723 A1 | 9/2009 | Tanabe |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0273318 A1 | 11/2009 | Rondoni et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0322158 A1 | 12/2009 | Stevens et al. |
| 2009/0322280 A1 | 12/2009 | Kamijo et al. |
| 2010/0015918 A1 | 1/2010 | Liu et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |
| 2010/0065352 A1 | 3/2010 | Ichikawa |
| 2010/0066349 A1 | 3/2010 | Lin et al. |
| 2010/0076524 A1 | 3/2010 | Forsberg et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0104031 A1 | 4/2010 | Lacour |

(56) References Cited

U.S. PATENT DOCUMENTS

| | | |
|---|---|---|
| 2010/0109443 A1 | 5/2010 | Cook et al. |
| 2010/0109445 A1 | 5/2010 | Kurs et al. |
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0179384 A1 | 7/2010 | Hoeg et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0181964 A1 | 7/2010 | Huggins et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0188183 A1 | 7/2010 | Shpiro |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201312 A1 | 8/2010 | Kirby et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0234922 A1 | 9/2010 | Forsell |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244767 A1 | 9/2010 | Turner et al. |
| 2010/0244839 A1 | 9/2010 | Yoshikawa |
| 2010/0248622 A1 | 9/2010 | Kirby et al. |
| 2010/0253152 A1 | 10/2010 | Karalis et al. |
| 2010/0253281 A1 | 10/2010 | Li |
| 2010/0256481 A1 | 10/2010 | Mareci et al. |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0314946 A1 | 12/2010 | Budde et al. |
| 2010/0327660 A1 | 12/2010 | Karalis et al. |
| 2010/0327661 A1 | 12/2010 | Karalis et al. |
| 2010/0328044 A1 | 12/2010 | Waffenschmidt et al. |
| 2011/0004269 A1 | 1/2011 | Strother et al. |
| 2011/0012431 A1 | 1/2011 | Karalis et al. |
| 2011/0018360 A1 | 1/2011 | Baarman |
| 2011/0018361 A1 | 1/2011 | Karalis et al. |
| 2011/0025131 A1 | 2/2011 | Karalis et al. |
| 2011/0031928 A1 | 2/2011 | Soar |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049995 A1 | 3/2011 | Hashiguchi |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0215086 A1 | 9/2011 | Yeh |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241438 A1* | 10/2011 | Kim ............... H02J 5/005 307/104 |

(56) References Cited

U.S. PATENT DOCUMENTS

| | | |
|---|---|---|
| 2011/0241618 A1 | 10/2011 | Karalis et al. |
| 2011/0248573 A1 | 10/2011 | Kanno et al. |
| 2011/0254377 A1 | 10/2011 | Wildmer et al. |
| 2011/0254503 A1 | 10/2011 | Widmer et al. |
| 2011/0266878 A9 | 11/2011 | Cook et al. |
| 2011/0278943 A1 | 11/2011 | Eckhoff et al. |
| 2012/0001492 A9 | 1/2012 | Cook et al. |
| 2012/0001593 A1 | 1/2012 | DiGuardo |
| 2012/0007435 A1 | 1/2012 | Sada et al. |
| 2012/0007441 A1 | 1/2012 | John et al. |
| 2012/0025602 A1 | 2/2012 | Boys et al. |
| 2012/0032522 A1 | 2/2012 | Schatz et al. |
| 2012/0038525 A1 | 2/2012 | Monsalve Carcelen et al. |
| 2012/0062345 A1 | 3/2012 | Kurs et al. |
| 2012/0068549 A1 | 3/2012 | Karalis et al. |
| 2012/0086284 A1 | 4/2012 | Capanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0146575 A1 | 6/2012 | Armstrong et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153893 A1 | 6/2012 | Schatz et al. |
| 2012/0161530 A1 | 6/2012 | Urano |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Kesler et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0262000 A1 | 10/2012 | Urano |
| 2012/0267960 A1 | 10/2012 | Low et al. |
| 2012/0280765 A1 | 11/2012 | Kurs et al. |
| 2012/0293118 A1* | 11/2012 | Kim ................ H02J 5/005 320/108 |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0043735 A1 | 2/2013 | Low et al. |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0099587 A1 | 4/2013 | Lou |
| 2013/0154383 A1 | 6/2013 | Kasturi et al. |
| 2013/0154389 A1 | 6/2013 | Kurs et al. |
| 2013/0159956 A1 | 6/2013 | Verghese et al. |
| 2013/0175874 A1 | 7/2013 | Lou et al. |
| 2013/0175875 A1 | 7/2013 | Kurs et al. |
| 2013/0187475 A1* | 7/2013 | Vendik ................ H02J 50/05 307/104 |
| 2013/0187478 A1 | 7/2013 | Bae Su et al. |
| 2013/0200716 A1 | 8/2013 | Kesler et al. |
| 2013/0200721 A1 | 8/2013 | Kurs et al. |
| 2013/0221744 A1 | 8/2013 | Hall et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0300210 A1 | 11/2013 | Hosotani |
| 2013/0300353 A1 | 11/2013 | Kurs et al. |
| 2013/0307349 A1 | 11/2013 | Hall et al. |
| 2013/0320773 A1 | 12/2013 | Schatz et al. |
| 2013/0334892 A1 | 12/2013 | Hall et al. |
| 2014/0002012 A1 | 1/2014 | McCauley et al. |
| 2014/0070764 A1 | 3/2014 | Keeling |
| 2014/0327397 A1 | 11/2014 | Houivet et al. |
| 2015/0051750 A1 | 2/2015 | Kurs et al. |

FOREIGN PATENT DOCUMENTS

| | | | |
|---|---|---|---|
| CN | 102239633 | 11/2011 | |
| CN | 102439669 | 5/2012 | |
| CN | 103329397 | 9/2013 | |
| DE | 38 24 972 | 1/1989 | |
| DE | 100 29147 | 12/2001 | |
| DE | 200 16 655 | 3/2002 | |
| DE | 102 21 484 | 11/2003 | |
| DE | 103 04 584 | 8/2004 | |
| DE | 10 2005 036290 | 2/2007 | |
| DE | 10 2006 044057 | 4/2008 | |
| EP | 1 335 477 | 8/2003 | |
| EP | 1 521 206 | 4/2005 | |
| EP | 1 524 010 | 4/2005 | |
| EP | 2 357 716 | 8/2011 | |
| EP | 2 536 002 | 12/2012 | |
| FR | 2 984 032 | 6/2013 | |
| JP | 02-097005 | 4/1990 | |
| JP | 4-265875 | 9/1992 | |
| JP | H 05-10993 | 1/1993 | ............ G01R 25/08 |
| JP | 6-341410 | 12/1994 | |
| JP | 9-182323 | 7/1997 | |
| JP | 9-298847 | 11/1997 | |
| JP | 10-164837 | 6/1998 | |
| JP | H10 225129 | 8/1998 | |
| JP | 11-75329 | 3/1999 | |
| JP | 11-188113 | 7/1999 | |
| JP | 2001-309580 | 11/2001 | |
| JP | 2002-010535 | 1/2002 | |
| JP | 2003-179526 | 6/2003 | |
| JP | 2004-166459 | 6/2004 | |
| JP | 2004-173472 | 6/2004 | |
| JP | 2004-201458 | 7/2004 | |
| JP | 2004-229144 | 8/2004 | |
| JP | 2005-57444 | 3/2005 | |
| JP | 2005-149238 | 6/2005 | |
| JP | 2006-074848 | 3/2006 | |
| JP | 2007-505480 | 3/2007 | |
| JP | 2007-266892 | 10/2007 | |

(56) References Cited

FOREIGN PATENT DOCUMENTS

| | | | | |
|---|---|---|---|---|
| JP | 2007-537637 | 12/2007 | | |
| JP | 2008-508842 | 3/2008 | | |
| JP | 2008-206231 | 9/2008 | | |
| JP | 2008-206327 | 9/2008 | | |
| JP | 2011-045195 | 3/2011 | | |
| JP | 2011-072074 | 4/2011 | | |
| JP | 2012-504387 | 2/2012 | | |
| JP | 2013-074685 | 4/2013 | ............. | H02J 17/00 |
| JP | 2013-543718 | 12/2013 | | |
| KR | 10-2007-0017804 | 2/2007 | | |
| KR | 10-2008-0007635 | 1/2008 | | |
| KR | 10-2009-0122072 | 11/2009 | | |
| KR | 10-2011-0050920 | 5/2011 | | |
| SG | 112842 | 7/2005 | | |
| WO | WO 92/17929 | 10/1992 | | |
| WO | WO 93/23908 | 11/1993 | | |
| WO | WO 94/28560 | 12/1994 | | |
| WO | WO 95/11545 | 4/1995 | | |
| WO | WO 96/02970 | 2/1996 | | |
| WO | WO 98/50993 | 11/1998 | | |
| WO | WO 00/77910 | 12/2000 | | |
| WO | WO 03/092329 | 11/2003 | | |
| WO | WO 03/096361 | 11/2003 | | |
| WO | WO 03/096512 | 11/2003 | | |
| WO | WO 2004/015885 | 2/2004 | | |
| WO | WO 2004/038888 | 5/2004 | | |
| WO | WO 2004/055654 | 7/2004 | | |
| WO | WO 2004/073150 | 8/2004 | | |
| WO | WO 2004/073166 | 8/2004 | | |
| WO | WO 2004/073176 | 8/2004 | | |
| WO | WO 2004/073177 | 8/2004 | | |
| WO | WO 2004/112216 | 12/2004 | | |
| WO | WO 2005/024865 | 3/2005 | | |
| WO | WO 2005/060068 | 6/2005 | | |
| WO | WO 2005/109597 | 11/2005 | | |
| WO | WO 2005/109598 | 11/2005 | | |
| WO | WO 2006/011769 | 2/2006 | | |
| WO | WO 2007/008646 | 1/2007 | | |
| WO | WO 2007/020583 | 2/2007 | | |
| WO | WO 2007/042952 | 4/2007 | | |
| WO | WO 2007/084716 | 7/2007 | | |
| WO | WO 2007/084717 | 7/2007 | | |
| WO | WO 2008/109489 | 9/2008 | | |
| WO | WO 2008/118178 | 10/2008 | | |
| WO | WO 2009/009559 | 1/2009 | | |
| WO | WO 2009/018568 | 2/2009 | | |
| WO | WO 2009/023155 | 2/2009 | | |
| WO | WO 2009/023646 | 2/2009 | | |
| WO | WO 2009/033043 | 3/2009 | | |
| WO | WO 2009/062438 | 5/2009 | | |
| WO | WO 2009/070730 | 6/2009 | | |
| WO | WO 2009/126963 | 10/2009 | | |
| WO | WO 2009/140506 | 11/2009 | | |
| WO | WO 2009/149464 | 12/2009 | | |
| WO | WO 2009/155000 | 12/2009 | | |
| WO | WO 2010/028092 | 3/2010 | | |
| WO | WO 2010/030977 | 3/2010 | | |
| WO | WO 2010/036980 | 4/2010 | | |
| WO | WO 2010/039967 | 4/2010 | | |
| WO | WO 2010/090538 | 8/2010 | | |
| WO | WO 2010/090539 | 8/2010 | | |
| WO | WO 2010/093997 | 8/2010 | | |
| WO | WO 2010/104569 | 9/2010 | | |
| WO | WO 2011/061388 | 5/2011 | | |
| WO | WO 2011/061821 | 5/2011 | | |
| WO | WO 2011/062827 | 5/2011 | | |
| WO | WO 2011/112795 | 9/2011 | | |
| WO | WO 2012/037279 | 3/2012 | | |
| WO | WO 2012/101907 | 8/2012 | | |
| WO | WO 2012/170278 | 12/2012 | | |
| WO | WO 2013/013235 | 1/2013 | | |
| WO | WO 2013/020138 | 2/2013 | | |
| WO | WO 2013/036947 | 3/2013 | | |
| WO | WO 2013/048034 | 4/2013 | ............. | H02J 17/00 |
| WO | WO 2013/059441 | 4/2013 | | |
| WO | WO 2013/067484 | 5/2013 | | |
| WO | WO 2013/113017 | 8/2013 | | |
| WO | WO 2013/142840 | 9/2013 | | |
| WO | WO 2014/004843 | 1/2014 | | |

OTHER PUBLICATIONS

Japanese Office Action for Japanese Application No. 2016-534850 dated May 8, 2018 (8 pages).
Notification of Reasons for Refusal from the Japanese Patent Office for Japanese Patent Application No. 2016-534850 dated Oct. 9, 2018.
Notification of Reasons for Refusal from the Japanese Patent Office for Japanese Patent Application No. 2016-534850 dated Jun. 4, 2019.
"Intel CTO Says Gap between Humans, Machines Will Close by 2050", *Intel News Release*, (See Intel.com/.../20080821comp.htm?iid=S . . . ) (Printed Nov. 6, 2009).
"Physics Update, Unwired Energy", *Physics Today*, pp. 26, (Jan. 2007) (See http://arxiv.org/abs/physics/0611063.).
"In pictures: A year in technology", *BBC News*, (Dec. 28, 2007).
"Next Little Thing 2010 Electricity without wires", CNN Money (See money.cnn.com/galleries/2009/smallbusiness/0911/gallery.next_little_thing_2010.smb/) (dated Nov. 30, 2009).
Abe et al. "A Noncontact Charger Using a Resonant Converter with Parallel Capacitor of the Secondary Coil". IEEE, 36(2):444-451, Mar./Apr. 2000.
Ahmadian, M. et al., "Miniature Transmitter for Implantable Micro Systems", *Proceedings of the 25th Annual International Conference of the IEEE EMBS Cancun, Mexico*, pp. 3028-3031 (Sep. 17-21, 2003).
Aoki, T. et al., "Observation of strong coupling between one atom and a monolithic microresonator", Nature, vol. 443:671-674 (2006).
Apneseth et al. "Introducing wireless proximity switches" ABB Review Apr. 2002.
Aristeidis Karalis et al., "Efficient Wireless non-radiative mid-range energy transfer", *Annals of Physics*, vol. 323, pp. 34-48 (2008).
Baker et al., "Feedback Analysis and Design of RF Power Links for Low-Power Bionic Systems," *IEEE Transactions on Biomedical Circuits and Systems*, vol. 1(1):28-38 (Mar. 2007).
Balanis, C.A., "Antenna Theory: Analysis and Design," 3rd Edition, Sections 4.2, 4.3, 5.2, 5.3 (Wiley, New Jersey, 2005).
Berardelli, P., "Outlets Are Out", ScienceNOW Daily News, Science Now, http://sciencenow.sciencemag.org/ cgi/content/full/2006/1114/2, (Nov. 14, 2006) 2 pages.
Biever, C., "Evanescent coupling could power gadgets wirelessly", NewScientistsTech.com, http://www. newscientisttech.com/article.ns?id=dn1 0575&print=true, (Nov. 15, 2006) 2 pages.
Borenstein, S., "Man tries wirelessly boosting batteries", (The Associated Press), USA Today, (Nov. 16, 2006) 1 page.
Borenstein, S., "Man tries wirelessly boosting batteries", AP Science Writer, Boston.com, (See http://www.boston.com/business/technology/articles/2006/11/15/man_tries_wirelessly_b . . . ) (Nov. 15, 2006).
Boyle, A., "Electro-nirvana? Not so fast", MSNBC, http:/lcosmiclog.msnbc.msn.com/_news/2007/06/08/4350760- electro-nirvana-not-so-fast, (Jun. 8, 2007) 1 page.
Budhia, M. et al., "A New IPT Magnetic Coupler for Electric Vehicle Charging Systems", IECON 2010—36th Annual Conference on IEEE Industrial Electronics Society, Glendale, AA, pp. 2487-2492 (Nov. 7-10, 2010).
Budhia, M. et al., "Development and evaluation of single sided flux couplers for contactless electric vehicle charging", 2011 IEEE Energy Conversion Congress and Exposition (ECCE), Phoenix, AZ, pp. 614-621 (Sep. 17-22, 2011).
Budhia, M. et al.,"Development of a Single-Sided Flux Magnetic Coupler for Electric Vehicle IPT", *IEEE Transactions on Industrial Electronics*, vol. 60:318-328 (Jan. 2013).
Bulkeley, W. M., "MIT Scientists Pave the Way for Wireless Battery Charging", The Wall Street Journal (See http://online.wsj.com/article/SB118123955549228045.html?mod=googlenews_wsj), (Jun. 8, 2007) 2 pages.

(56) References Cited

OTHER PUBLICATIONS

Burri et al., "Invention Description", (Feb. 5, 2008).
Cass, S., "Air Power—Wireless data connections are common—now scientists are working on wireless power", Sponsored by IEEE Spectrum, http://spectrum.ieee.org/computing/hardware/air-power, (Nov. 2006) 2 pages.
Castelvecchi, Davide, "The Power of Induction—Cutting the last cord could resonate with our increasingly gadget dependent lives", *Science News Online*, vol. 172, No. 3, Jul. 21, 2007, 6 pages.
Chang, A., "Recharging the Wireless Way—Even physicists forget to recharge their cell phones sometimes.", PC Magazine, ABC News Internet Ventures, (Dec. 12, 2006) 1 page.
Chinaview, ,"Scientists light bulb with 'wireless electricity'",www. Chinaview.cn, http://news.xinhuanet.com/english/2007-06/08/content_6215681.htm,Jun. 2007,1 page.
Cooks, G., "The vision of an MIT physicist: Getting rid of pesky rechargers", Boston.com, (Dec. 11, 2006) 1 page.
Derbyshire, D., "The end of the plug? Scientists invent wireless device that beams electricity through your home", Daily Mail, http://www.dailymail.co.uk/pages/live/articles/technology/technology.html?in_article_id=4 . . . ), (Jun. 7, 2007) 3 pages.
Eisenberg, Anne, "Automatic Recharging, From a Distance", The New York Times, (see www.nytimes.com/2012/03/11/business/built-in-wireless-chargeing-for-electronic-devices.html?_r=0) (published on Mar. 10, 2012).
Esser et al., "A New Approach to Power Supplies for Robots", IEEE, vol. 27(5):872-875, (Sep./Oct. 1991).
Fan, Shanhui et al., "Rate-Equation Analysis of Output Efficiency and Modulation Rate of Photomic-Crystal Light-Emitting Diodes", IEEE Journal of Quantum Electronics, vol. 36(10):1123-1130 (Oct. 2000).
Fenske et al., "Dielectric Materials at Microwave Frequencies", Applied Microwave & Wireless, pp. 92-100 (2000).
Fernandez, C. et al., "A simple dc-dc converter for the power supply of a cochlear implant", *IEEE*, pp. 1965-1970 (2003).
Ferris, David, "How Wireless Charging Will Make Life Simpler (and Greener)", Forbes (See forbes.com/sites/davidferris/2012/07/24/how-wireless-charging-will-make-life-simpler-and-greener/print/) (dated Jul. 24, 2012).
Fildes, J., "Physics Promises Wireless Power", (Science and Technology Reporter), BBC News, (Nov. 15, 2006) 3 pages.
Fildes, J., "The technology with impact 2007", BBC News, (Dec. 27, 2007) 3 pages.
Fildes, J., "Wireless energy promise powers up", BBC News, http://news.bbc.co.uk/2/hi/technology/6725955.stm, (Jun. 7, 2007) 3 pages.
Finkenzeller, Klaus, "RFID Handbook—Fundamentals and Applications in Contactless Smart Cards", Nikkan Kohgyo-sya, Kanno Taihei, first version, pp. 32-37, 253 (Aug. 21, 2001).
Finkenzeller, Klaus, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Freedman, D.H., "Power on a Chip", MIT Technology Review, (Nov. 2004).
Gary Peterson, "MIT WiTricity Not So Original After All", *Feed Line No. 9*, (See http://www.tfcbooks.com/articles/witricity.htm) printed Nov. 12, 2009.
Geyi, Wen, "A Method for the Evaluation of Small Antenna Q", IEEE Transactions on Antennas and Propagation, vol. 51(8):2124-2129 (Aug. 2003).
Hadley, F., "Goodbye Wires—MIT Team Experimentally Demonstrates Wireless Power Transfer, Potentially Useful for Power Laptops, Cell-Phones Without Cords", Massachusetts Institute of Technology, Institute for Soldier D Nanotechnologies, http://web.mit.edu/newsoffice/2007/wireless-0607.html, (Jun. 7, 2007) 3 pages.
Haus, H.A., "Waves and Fields in Optoelectronics," Chapter 7 "Coupling of Modes—Resonators and Couplers" (Prentice-Hall, New Jersey, 1984).

Heikkinen et al., "Performance and Efficiency of Planar Rectennas for Short-Range Wireless Power Transfer at 2.45 GHz", Microwave and Optical Technology Letters, vol. 31(2):86-91, (Oct. 20, 2001).
Highfield, R., "Wireless revolution could spell end of plugs-",(Science Editor), Telegraph.co.uk, http://www. telegraph.co.uk/news/main.jhtml?xml=/news/2007/06/07/nwireless1 07.xml, (Jun. 7, 2007) 3 pages.
Hirai et al., "Integral Motor with Driver and Wireless Transmission of Power and Information for Autonomous Subspindle Drive", IEEE, vol. 15(1):13-20, (Jan. 2000).
Hirai et al., "Practical Study on Wireless Transmission of Power and Information for Autonomous Decentralized Manufacturing System", IEEE, vol. 46(2):349-359, Apr. 1999.
Hirai et al., "Study on Intelligent Battery Charging Using Inductive Transmission of Power and Information", IEEE, vol. 15(2):335-345, (Mar. 2000).
Hirai et al., "Wireless Transmission of Power and Information and Information for Cableless Linear Motor Drive", IEEE, vol. 15(1):21-27, (Jan. 2000).
Hirayama, M., "Splashpower—World Leaders in Wireless Power", PowerPoint presentation, Splashpower Japan, (Sep. 3, 2007) 30 pages.
Ho, S. L. et al., "A Comparative Study Between Novel Witricity and Traditional Inductive Magnetic Coupling in Wireless Charging", IEEE Transactions on Magnetics, vol. 47(5):1522-1525 (May 2011).
Infotech Online, "Recharging gadgets without cables", infotech.indiatimes.com, (Nov. 17, 2006) 1 page.
Jackson, J. D., "Classical Electrodynamics", 3rd Edition, Wiley, New York, 1999, pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Jacob, M. V. et al., "Lithium Tantalate—A High Permittivity Dielectric Material for Microwave Communication Systems", *Proceedings of IEEE TENCON—Poster Papers*, pp. 1362-1366, 2003.
Karalis, Aristeidis, "Electricity Unplugged", Feature: Wireless Energy Physics World, physicsworld.com, pp. 23-25 (Feb. 2009).
Kawamura et al., "Wireless Transmission of Power and Information Through One High-Frequency Resonant AC Link Inverter for Robot Manipulator Applications", IEEE, vol. 32(3):503-508, (May/Jun. 1996).
Kurs, A. et al., "Wireless Power Transfer via Strongly Coupled Magnetic Resonances", *Science* vol. 317, pp. 83-86 (Jul. 6, 2007).
Kurs, A. et al., "Simultaneous mid-range power transfer to multiple devices", *Applied Physics Letters*, vol. 96, No. 044102 (2010).
Kurs, A. et al.,"Optimized design of a low-resistance electrical conductor for the multimegahertz range", *Applied Physics Letters*, vol. 98:172504-172504-3 (Apr. 2011).
Lamb, Gregory M. ,"Look Ma—no wires!—Electricity broadcast through the air may someday run your home",The Christian Science Monitor,http://www.csmonitor.com/2006/1116/p14s01-stct.html,Nov. 15, 2006,2 pages.
Lee, "Antenna Circuit Design for RFID Applications," Microchip Technology Inc., AN710, 50 pages (2003).
Lee, "RFID Coil Design," Microchip Technology Inc., AN678, 21 pages (1998).
Liang et al., "Silicon waveguide two-photon absorption detector at 1.5 μm wavelength for autocorrelation measurements," Applied Physics Letters, 81(7):1323-1325 (Aug. 12, 2002).
Markoff, J. ,"Intel Moves to Free Gadgets of Their Recharging Cords", The New York Times—nytimes.com, Aug. 21, 2008, 2 pages.
Mediano, A. et al. "Design of class E amplifier with nonlinear and linear shunt capacitances for any duty cycle", IEEE Trans. Microwave Theor. Tech., vol. 55, No. 3, pp. 484-492, (2007).
Microchip Technology Inc., "microID 13.56 MHz Design Guide—MCRF355/360 Reader Reference Design," 24 pages (2001).
Minkel, J R. ,"Wireless Energy Lights Bulb from Seven Feet Away—Physicists vow to cut the cord between your laptop battery and the wall socket—with just a simple loop of wire",Scientific American,http://www.scientificamerican.com/article.cfm?id=wireless-energy-lights-bulb-from-seven-feet-away,Jun. 7, 2007,1 page.
Minkel, J R. ,"Wireless Energy Transfer May Power Devices at a Distance",Scientific American,Nov. 14, 2006,1 page.

(56) References Cited

OTHER PUBLICATIONS

Morgan, J., "Lab report: Pull the plug for a positive charge", The Herald, Web Issue 2680, (Nov. 16, 2006) 3 pages.
Moskvitch, Katia, "Wireless charging—the future for electric cars?", BBC News Technology (See www.bbc.co.uk/news/technology-14183409) (dated Jul. 21, 2011).
O'Brien et al., "Analysis of Wireless Power Supplies for Industrial Automation Systems", IEEE, pp. 367-372 (Nov. 2-6, 2003).
O'Brien et al., "Design of Large Air-Gap Transformers for Wireless Power Supplies", IEEE, pp. 1557-1562 (Jun. 15-19, 2003).
Pendry, J. B., "A Chiral Route to Negative Refraction", Science, vol. 306:1353-1355 (2004).
Physics Today, "Unwired energy questions asked answered", Sep. 2007, pp. 16-17.
Powercast LLC. "White Paper" Powercast simply wire free, 2003.
PR News Wire, "The Big Story for CES 2007: The public debut of eCoupled Intelligent Wireless Power", Press Release, Fulton Innovation LLC, Las Vegas, NV, (Dec. 27, 2006) 3 pages.
Press Release, ,"The world's first sheet-type wireless power transmission system: Will a socket be replaced by e-wall?",Public Relations Office, School of Engineering, University of Tokyo, Japan,Dec. 12, 2006,4 pages.
PressTV, "Wireless power transfer possible", http://edition.presstv.ir/detail/12754.html, Jun. 11, 2007, 1 page.
Reidy, C. (Globe Staff), "MIT discovery could unplug your iPod forever", Boston.com, http://www.boston.com/ business/ticker/2007/06/mit_discovery_c.html, (Jun. 7, 2007) 3 pages.
Risen, C., "Wireless Energy", The New York Times, (Dec. 9, 2007) 1 page.
Sakamoto et al., "A Novel Circuit for Non-Contact Charging Through Electro-Magnetic Coupling", IEEE, pp. 168-174 (1992).
Scheible, G. et al., "Novel Wireless Power Supply System for Wireless Communication Devices in Industrial Automation Systems", IEEE, pp. 1358-1363, (Nov. 5-8, 2002).
Schneider, D. "A Critical Look at Wireless Power", *IEEE Spectrum*, pp. 35-39 (May 2010).
Schneider, David, "Electrons Unplugged. Wireless power at a distance is still far away", *IEEE Spectrum*, pp. 35-39 (May 2010).
Schuder, J. C. et al., "An Inductively Coupled RF System for the Transmission of 1 kW of Power Through the Skin", *IEEE Transactions on Bio-Medical Engineering*, vol. BME-18, No. 4, pp. 265-273 (Jul. 1971).
Schuder, J. C., "Powering an Artificial Heart: Birth of the Inductively Coupled-Radio Frequency System in 1960", *Artificial Organs*, vol. 26:909-915 (2002).
Schuder, J.C. et al., "Energy Transport Into the Closed Chest From a Set of Very-Large Mutually Orthogonal Coils", Communication Electronics, vol. 64:527-534 (Jan. 1963).
Schutz, J. et al., "Load Adaptive Medium Frequency Resonant Power Supply", IEEE, pp. 282-287 (Nov. 2002).
Sekitani et al. "A large-area wireless power-transmission sheet using printed organic transistors and plastic MEMS switches" www.nature.com/naturematerials. Published online Apr. 29, 2007.
Sekitani et al., "A large-area flexible wireless power transmission sheet using printed plastic MEMS switches and organic field-effect transistors", IEDM '06, International Electron Devices Meeting, (Dec. 11-13, 2006) 4 pages.
Sekiya, H. et al., "FM/PWM control scheme in class DE inverter", IEEE Trans. Circuits Syst. I, vol. 51(7) (Jul. 2004).
Senge, M., "MIT's wireless electricity for mobile phones", Vanguard, http://www.vanguardngr.com/articles/2002/features/gsm/gsm211062007.htm, (Jun. 11, 2007) 1 page.
Sensiper, S., "Electromagnetic wave propogation on helical conductors", Technical Report No. 194 (based on PhD Thesis), Massachusetts Institute of Technology, (May 16, 1951) 126 pages.
Soljacic, M. , "Wireless Non-Radiative Energy Transfer—PowerPoint presentation". Massachusetts Institute of Technology, (Oct. 6, 2005).
Soljacic, M. et al., "Wireless Energy Transfer Can Potentially Recharge Laptops Cell Phones Without Cords", (Nov. 14, 2006) 3 pages.
Soljacic, M. et al., "Photonic-crystal slow-light enhancement of nonlinear phase sensitivity", *J. Opt. Soc. Am B*, vol. 19, No. 9, pp. 2052-2059 (Sep. 2002).
Soljacic, M., "Wireless nonradiative energy transfer", *Visions of Discovery New Light on Physics, Cosmology, and Consciousness*, Cambridge University Press, New York, NY pp. 530-542 (2011).
Someya, Takao. "The world's first sheet-type wireless power transmission system". University of Tokyo, (Dec. 12, 2006).
Staelin, David H. et al., Electromagnetic Waves, Chapters 2, 3, 4, and 8, pp. 46-176 and 336-405 (Prentice Hall Upper Saddle River, New Jersey 1998).
Stark III, Joseph C., "Wireless Power Transmission Utilizing a Phased Array of Tesla Coils", Master Thesis, Massachusetts Institute of Technology (2004).
Stewart, W., "The Power to Set you Free", Science, vol. 317:55-56 (Jul. 6, 2007).
Tang, S.C. et al., "Evaluation of the Shielding Effects on Printed-Circuit-Board Transformers Using Ferrite Plates and Copper Sheets", *IEEE Transactions on Power Electronics*, vol. 17:1080-1088 (Nov. 2002).
Tesla, Nikola, "High Frequency Oscillators for Electro-Therapeutic and Other Purposes", *Proceedings of the IEEE*, vol. 87:1282-1292 (Jul. 1999).
Tesla, Nikola, "High Frequency Oscillators for Electro-Therapeutic and Other Purposes", *The Electrical Engineer*, vol. XXVI, No. 50 (Nov. 17, 1898).
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Valtchev et al. "Efficient Resonant Inductive Coupling Energy Transfer Using New Magnetic and Design Criteria". IEEE, pp. 1293-1298, 2005.
Vandevoorde et al., "Wireless energy transfer for stand-alone systems: a comparison between low and high power applicability", Sensors and Actuators, vol. 92:305-311 (2001).
Vilkomerson, David et al., "Implantable Doppler System for Self-Monitoring Vascular Grafts", *IEEE Ultrasonics Symposium*, pp. 461-465 (2004).
Villeneuve, Pierre R. et al., "Microcavities in photonic crystals: Mode symmetry, tunability, and coupling efficiency", *Physical Review B*, vol. 54:7837-7842 (Sep. 15, 1996).
Yariv, Amnon et al., "Coupled-resonator optical waveguide: a proposal and analysis", *Optics Letters*, vol. 24(11):711-713 (Jun. 1, 1999).
Yates, David C. et al., "Optimal Transmission Frequency for Ultralow-Power Short-Range Radio Links", IEEE Transactions on Circuits and Systems—1, Regular Papers, vol. 51:1405-1413 (Jul. 2004).
Yoshihiro Konishi, *Microwave Electronic Circuit Technology*, Chapter 4, pp. 145-197 (Marcel Dekker, Inc., New York, NY 1998).
Ziaie, Babak et al., "A Low-Power Miniature Transmitter Using a Low-Loss Silicon Platform for Biotelemetry", *Proceedings—19th International Conference IEEE/EMBS*, pp. 2221-2224, (Oct. 30-Nov. 2, 1997) 4 pages.
Zierhofer, Clemens M. et al., "High-Efficiency Coupling-Insensitive Transcutaneous Power and Data Transmission Via an Inductive Link", *IEEE Transactions on Biomedical Engineering*, vol. 37, No. 7, pp. 716-722 (Jul. 1990).
International Search Report and Written Opinion of the International Searching Authority for International Application No. PCT/US2014/051152 dated Mar. 23, 2015 (16 pages).
Invitation to Pay Additional Fees and, Where Applicable, Protest Fee, dated Dec. 8, 2014 for International Application No. PCT/US2014/051152, 5 pages.

\* cited by examiner

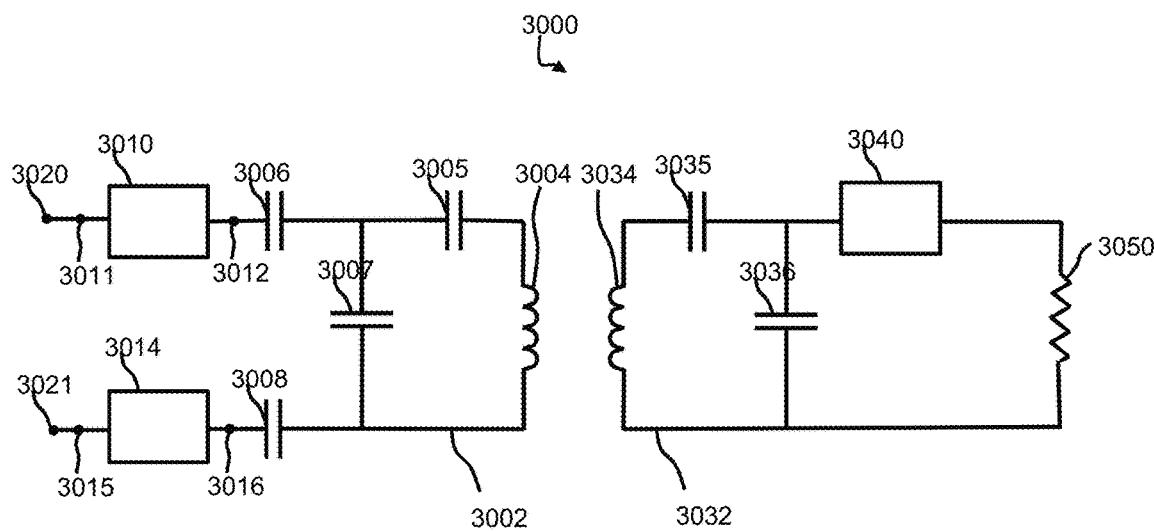
FIG. 13
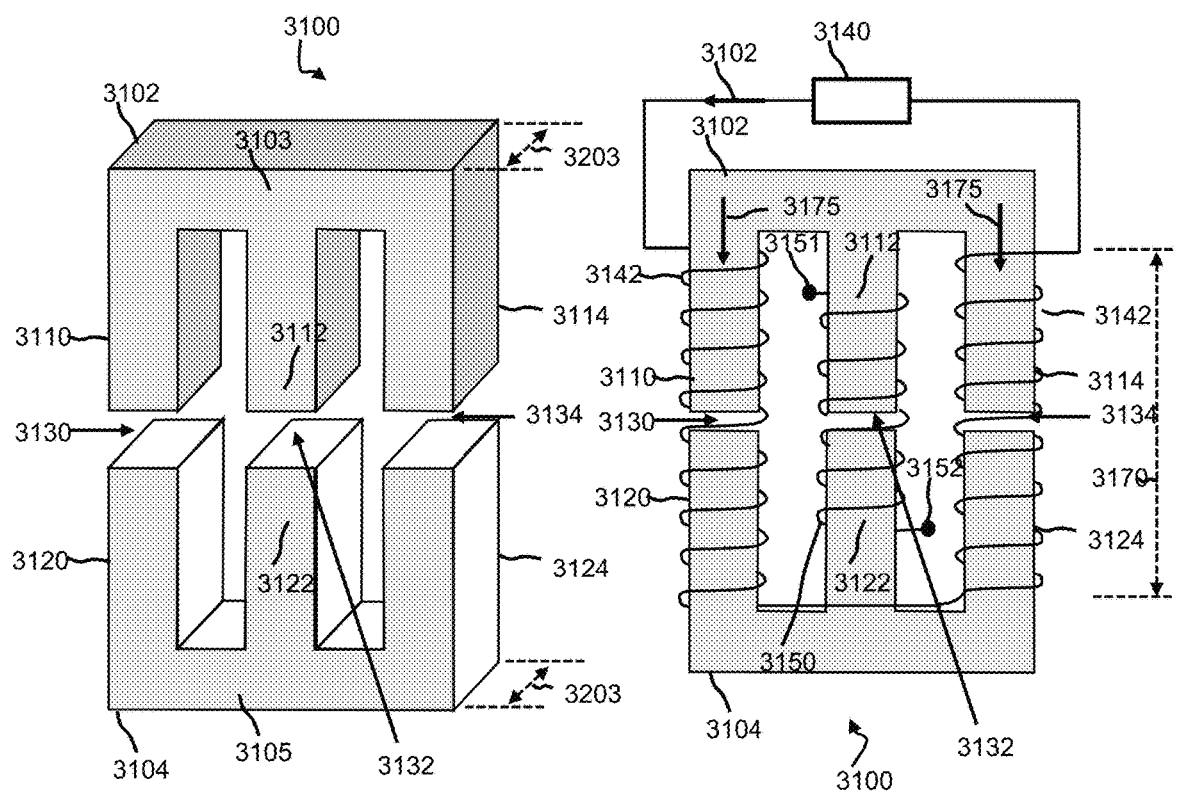
FIG. 14A
FIG. 14B

IMPEDANCE ADJUSTMENT IN WIRELESS POWER TRANSMISSION SYSTEMS AND METHODS

CROSS-REFERENCE TO RELATED APPLICATIONS

This application is a continuation of and claims priority to U.S. application Ser. No. 14/459,870, filed on Aug. 14, 2014, now U.S. Pat. No. 9,857,821, which claims priority to U.S. Provisional Patent Application No. 61/927,452, filed on Jan. 14, 2014, to U.S. Provisional Patent Application No. 61/865,910, filed on Aug. 14, 2013, and to U.S. Provisional Patent Application No. 62/024,993, filed on Jul. 15, 2014, the entire contents of each of which are incorporated herein by reference.

TECHNICAL FIELD

This disclosure relates to wireless power transfer.

BACKGROUND

Energy or power may be transferred wirelessly using a variety of known radiative, or far-field, and non-radiative, or near-field, techniques. For example, radiative wireless information transfer using low-directionality antennas, such as those used in radio and cellular communications systems and home computer networks, may be considered wireless energy transfer. However, this type of radiative transfer is very inefficient because only a tiny portion of the supplied or radiated power, namely, that portion in the direction of, and overlapping with, the receiver is picked up. The vast majority of the power is radiated away in all the other directions and lost in free space. Such inefficient power transfer may be acceptable for data transmission, but is not practical for transferring useful amounts of electrical energy for the purpose of doing work, such as for powering or charging electrical devices.

One way to improve the transfer efficiency of some radiative energy transfer schemes is to use directional antennas to confine and preferentially direct the radiated energy towards a receiver. However, these directed radiation schemes may require an uninterruptible line-of-sight and potentially complicated tracking and steering mechanisms in the case of mobile transmitters and/or receivers. In addition, such schemes may pose hazards to objects or people that cross or intersect the beam when modest to high amounts of power are being transmitted. A known non-radiative, or near-field, wireless energy transfer scheme, often referred to as either induction or traditional induction, does not (intentionally) radiate power, but uses an oscillating current passing through a primary coil, to generate an oscillating magnetic near-field that induces currents in a near-by receiving or secondary coil. Traditional induction schemes have demonstrated the transmission of modest to large amounts of power, however only over very short distances, and with very small offset tolerances between the primary power supply unit and the secondary receiver unit. Electric transformers and proximity chargers are examples of devices that utilize this known short range, near-field energy transfer scheme.

A need exists for a wireless power transfer scheme that is capable of transferring useful amounts of electrical power over mid-range distances or alignment offsets. Such a wireless power transfer scheme should enable useful energy transfer over greater distances and alignment offsets than those realized with traditional induction schemes, but without the limitations and risks inherent in radiative transmission schemes.

SUMMARY

In general, in a first aspect, the disclosure features wireless power transfer systems that include a power transmitting apparatus configured to wirelessly transmit power, a power receiving apparatus connected to an electrical load and configured to receive power from the power transmitting apparatus, and a controller connected to the power transmitting apparatus and configured to receive information about a phase difference between output voltage and current waveforms in a power source of the power transmitting apparatus, and adjust a frequency of the transmitted power based on the measured phase difference.

Embodiments of the systems can include any one or more of the following features.

The power receiving apparatus can be mounted on an electric vehicle. The load can include one or more batteries of an electric vehicle. The load can include an electrical circuit or electrical system of a vehicle.

The controller can be configured to adjust the frequency to minimize the phase difference. The controller can be configured to adjust a bus voltage of the power source based on a target output power of the power transmitting apparatus. The controller can be configured to adjust a phase control of the power source based on the target output power.

The controller can be configured to iteratively adjust the frequency and determine, after each iteration, whether the adjustment to the frequency increases or decreases the phase difference. The controller can be configured to adjust the frequency by a magnitude of at most 5% of a nominal operating frequency of the wireless power transfer system.

Embodiments of the systems can also include any of the other features disclosed herein, including features disclosed in connection with different embodiments, in any combination as appropriate.

In another aspect, the disclosure features methods for wireless power transfer that include using a power transmitting apparatus to wirelessly transfer power at a selected frequency to a power receiving apparatus connected to an electrical load to deliver power to the load, receiving information about a phase difference between output voltage and current waveforms generated by a power source in the power transmitting apparatus, and adjusting the frequency based on the phase difference.

Embodiments of the methods can include any one or more of the following features.

The power receiving apparatus can be mounted on an electric vehicle. The load can include one or more batteries of an electric vehicle. The load can include an electrical circuit or electrical system of a vehicle.

The methods can include adjusting the frequency to determine a minimum value of the phase difference. The methods can include adjusting a bus voltage of a power source of the power transmitting apparatus based on a target output power of the power transmitting apparatus. The methods can include adjusting a phase control value of the power source based on the target output power.

The methods can include iteratively adjusting the frequency and determining, after each iteration, whether the adjustment to the frequency increases or decreases the phase difference. The methods can include adjusting the frequency by a magnitude of at most 5% of a nominal frequency of the power transferred by the wireless power transmitting apparatus.

Embodiments of the methods can also include any of the other steps or features disclosed herein, including steps and features disclosed in connection with different embodiments, in any combination as appropriate.

In a further aspect, the disclosure features detectors for use in a wireless power transfer system, the detectors including a first input terminal configured to receive a first electrical signal, a second input terminal configured to receive a second electrical signal, a first logic unit connected to the first and second input terminals and configured to produce a first output waveform based on the first and second electrical signals, and a second logic unit connected to the first logic unit and configured to produce a second output waveform based on the first output waveform, where the second output waveform includes a pulse having a width that corresponds to a temporal offset between the first and second electrical signals.

Embodiments of the detectors can include any one or more of the following features.

The first electrical signal can correspond to a waveform representing an electrical current in an amplifier of the system. The electrical current can corresponds to an output current of the amplifier.

The second electrical signal can correspond to a waveform representing a voltage in an amplifier of the system. The voltage can correspond to a voltage of a load coupled to the system.

The second output waveform can include a pulse having a width that corresponds to a temporal offset between the electrical current and the voltage waveforms in the amplifier of the system. The pulse can have a square wave profile.

The first logic unit can include an AND gate. The second logic unit can include an XOR gate.

The second logic unit can include a first terminal connected to the first logic unit and a second terminal, where the second logic unit is configured to receive the first output waveform at the first terminal, and the second electrical signal at the second terminal.

The detectors can include a measurement unit featuring a first terminal connected to the second logic unit, where the measurement unit is configured to generate an output value that corresponds to the temporal offset between the first and second electrical signals. The measurement unit can include a second terminal, and the measurement unit can be configured to receive a clock signal featuring a plurality of pulses separated by a constant temporal interval at the second terminal. The output value can correspond to the temporal offset in a multiple of the constant temporal interval.

The measurement unit can be configured to receive the second output waveform at the first terminal of the measurement unit, and the measurement unit can be configured to increment a counter of clock signal pulses when the second output waveform is positively-valued.

Embodiments of the detectors can also include any of the other features disclosed herein, including features disclosed in connection with other embodiments, in any combination, as appropriate.

In another aspect, the disclosure features methods of determining a temporal offset value between current and voltage waveforms in a wireless power transfer system, the method including: performing a first logical operation on the current and voltage waveforms in the wireless power transfer system to generate a first output waveform, where the first logical operation corresponds to an AND operation; performing a second logical operation on the first output waveform and the voltage waveform in the wireless transfer system to generate a second output waveform, where the second logical operation corresponds to an XOR operation; and determining the temporal offset value based on the second output waveform.

Embodiments of the methods can include any one or more of the following features.

The second output waveform can include a square waveform having a width that corresponds to the temporal offset value. The methods can include measuring the width of the square waveform to determine the temporal offset value. Measuring the width of the square waveform can include counting a plurality of signal pulses during an interval that corresponds to the width of the square waveform, and outputting the counted number of signal pulses, where the counted number of signal pulses corresponds to the temporal offset value.

Embodiments of the methods can also include any of the other steps or features disclosed herein, including steps and features disclosed in connection with other embodiments, in any combination, as appropriate.

In a further aspect, the disclosure features methods for assessing an operating condition of a wireless power source, the methods including determining whether the wireless power source is operating in a capacitive mode, and reducing the output power of the power source if the source is operating in a capacitive mode.

Embodiments of the methods can include any one or more of the following features.

The methods can include determining whether the wireless power source is operating in a capacitive mode based on a temporal offset value between current and voltage waveforms in the power source. The current waveform can correspond to an output current of an amplifier of the power source. The voltage waveform can correspond to a voltage of a load coupled to the wireless power source.

The methods can include: (a) determining the temporal offset value; (b) comparing the measured temporal offset value to a first threshold value; and (c) determining that the power source is operating in a capacitive mode if the temporal offset value is less than the first threshold value. The methods can include: repeating steps (a)-(c); determining a count of a number of consecutive determinations that the power source is operating in a capacitive mode; comparing the count of the number of consecutive determinations that the power source is operating in a capacitive mode to a second threshold value; and reducing an output power of the power source if the count exceeds a second threshold value.

Determining the temporal offset value can include: performing a first logical operation on the current and voltage waveforms to generate a first output waveform, where the first logical operation corresponds to an AND operation; performing a second logical operation on the first output waveform and the voltage waveform to generate a second output waveform, where the second logical operation corresponds to an XOR operation; and determining the temporal offset value based on the second output waveform.

The second output waveform can include a square waveform having a width that corresponds to the temporal offset value, and the methods can include measuring the width of the square waveform to determine the temporal offset value. Measuring the width of the square waveform can include counting a plurality of signal pulses during an interval that corresponds to the width of the square waveform. The methods can include selecting the first threshold value based on a load coupled to the wireless power source.

The methods can include determining whether the wireless power source is operating in a reactive mode, and reducing the output power of the power source if the source is operating in a reactive mode. The methods can include determining whether the wireless power source is operating in a reactive mode based on a temporal offset value between current and voltage waveforms in the power source. The methods can include determining whether the wireless power source is operating in a reactive mode based on a magnitude of an output current of an amplifier of the power source when a voltage generated by the amplifier changes polarity. The methods can include determining whether the wireless power source is operating in a reactive mode based on a bus voltage in the amplifier.

The methods can include: determining the temporal offset value; determining a magnitude of the output current when the voltage generated by the amplifier changes polarity; determining a bus voltage of the amplifier; comparing the temporal offset value to a first threshold value; comparing the magnitude of the output current to a second threshold value; comparing the bus voltage to a third threshold value; and determining that the power source is operating in a reactive mode if the temporal offset value, the magnitude of the output current when the voltage generated by the amplifier changes polarity, and the bus voltage of the amplifier exceed the first, second, and third threshold values, respectively.

Determining the temporal offset value can include: performing a first logical operation on the current and voltage waveforms to generate a first output waveform, where the first logical operation corresponds to an AND operation; performing a second logical operation on the first output waveform and the voltage waveform to generate a second output waveform, where the second logical operation corresponds to an XOR operation; and determining the temporal offset value based on the second output waveform. The second output waveform can include a square waveform having a width that corresponds to the temporal offset value, and the methods can include measuring the width of the square waveform to determine the temporal offset value.

Embodiments of the methods can also include any of the other steps or features disclosed herein, including steps and features disclosed in connection with other embodiments, in any combination, as appropriate.

In another aspect, the disclosure features methods of transferring power between a source resonator and a receiver resonator, the methods including: setting an impedance and an output power level for the source resonator; determining whether the source resonator is operating in a capacitive mode; reducing the output power level if the source resonator is operating in a capacitive mode; determining an efficiency of power transfer between the source resonator and the receiver resonator; comparing the efficiency of power transfer to a threshold efficiency value; and adjusting an impedance of the source resonator if the efficiency of power transfer is less than the threshold efficiency value.

Embodiments of the methods can include any one or more of the following features.

The methods can include determining whether the source resonator is operating in a reactive mode, and reducing the output power level if the source resonator is operating in a reactive mode. Adjusting the impedance of the source resonator can include electrically changing an inductance of a tunable inductor. Adjusting the impedance of the source resonator can include mechanically changing an inductance of a tunable inductor.

The methods can include transferring 1 kW or more (e.g., 3.3 kW or more) of power between the source resonator and the receiver resonator.

Determining whether the source resonator is operating in a capacitive mode can include: determining a temporal offset value between current and voltage waveforms in the source resonator; comparing the measured temporal offset value to a first threshold value; and determining that the source resonator is operating in a capacitive mode if the temporal offset value is less than the first threshold value. Determining the temporal offset value can include: performing a first logical operation on the current and voltage waveforms to generate a first output waveform, where the first logical operation corresponds to an AND operation; performing a second logical operation on the first output waveform and the voltage waveform to generate a second output waveform, where the second logical operation corresponds to an XOR operation; and determining the temporal offset value based on the second output waveform.

The second output waveform can include a square waveform having a width that corresponds to the temporal offset value, and the methods can include measuring the width of the square waveform to determine the temporal offset value.

Determining whether the source resonator is operating in a reactive mode can include: determining a temporal offset value between current and voltage waveforms in the source resonator; determining a magnitude of an output current of an amplifier in the source resonator when a voltage generated by the amplifier changes polarity; determining a bus voltage of the amplifier; comparing the temporal offset value to a first threshold value; comparing the magnitude of the output current to a second threshold value; comparing the bus voltage to a third threshold value; and determining that the power source is operating in a reactive mode if the temporal offset value, the magnitude of the output current when the voltage generated by the amplifier changes polarity, and the bus voltage of the amplifier exceed the first, second, and third threshold values, respectively.

Embodiments of the methods can also include any of the other steps or features disclosed herein, including steps and features disclosed in connection with other embodiments, in any combination, as appropriate.

In a further aspect, the disclosure features wireless power transfer systems that include any of the detectors disclosed herein, a source resonator featuring a coil having at least one loop of conducting material, and an amplifier configured to generate an electrical current, where during operation, the systems are configured to transfer 2 kW of power or more (e.g., 4 kW of power or more) to a receiver resonator.

Embodiments of the systems can include any one or more of the following features.

During operation, the systems can be configured to transfer power to a receiver resonator positioned in a vehicle to charge a battery coupled to the receiver resonator.

Embodiments of the systems can also include any of the other features disclosed herein, including features disclosed in connection with other embodiments, in any combination, as appropriate.

In another aspect, the disclosure features wireless power transfer systems that include: a source resonator featuring a coil, where the source resonator is configured to transfer power to a receiving resonator; a current generator coupled to the source resonator and configured to generate an electrical current in the coil; a detector featuring a first input terminal configured to receive a first waveform corresponding to the electrical current generated by the current generator, a second input terminal configured to receive a second waveform corresponding to a voltage within the system, and at least one logic unit, where the at least one logic unit is configured to generate an output waveform that includes a pulse having a width that corresponds to a temporal offset between the first and second waveforms; and an electronic processor connected to the detector, where during operation, the electronic processor receives the output waveform and is configured to determine whether the source resonator is operating in a capacitive mode based on the output waveform.

Embodiments of the systems can include any one or more of the features disclosed herein, including features disclosed in connection with any of the embodiments disclosed herein, in any combination, as appropriate.

In the embodiments disclosed herein, a magnetic resonator can include a combination of inductors and capacitors. Additional circuit elements such as capacitors, inductors, resistors, switches, and the like, may be inserted between a magnetic resonator and a power source, and/or between a magnetic resonator and a power load. In this disclosure, the conducting coil of the resonator may be referred to as the inductor and/or the inductive load. The inductive load may also refer to the inductor when it is wirelessly coupled (through a mutual inductance) to other system or extraneous objects. In this disclosure, circuit elements other than the inductive load may be referred to as being part of an impedance matching network (IMN). In this disclosure, all, some, or none of the elements that are referred to as being part of an impedance matching network may be part of the magnetic resonator. Which elements are part of the resonator and which are separate from the resonator will depend on the specific magnetic resonator and wireless energy transfer system design.

In the wireless energy transfer systems described herein, power can be exchanged wirelessly between at least two resonators. Resonators can supply, receive, hold, transfer, and distribute energy. Sources of wireless power can be referred to as sources or supplies, and receivers of wireless power can be referred to as devices, receivers and/or power loads. A resonator can be a source, a device, or both simultaneously, and/or may vary from one function to another in a controlled manner. Resonators configured to hold or distribute energy that do not have wired connections to a power supply or power drain can be called repeaters.

The resonators of the wireless energy transfer systems disclosed herein are able to transfer power over distances that are large compared to the size of the resonators. That is, if the resonator size is characterized by the radius of the smallest sphere that could enclose the resonator structure, the wireless energy transfer systems disclosed herein can transfer power over distances greater than the characteristic size of the resonator. The systems are able to exchange energy between resonators where the resonators have different characteristic sizes and where the inductive elements of the resonators have different sizes, different shapes, and/or are formed of different materials.

The wireless energy transfer systems disclosed herein can include more than two resonators that can each be coupled to a power source, a power load, both, or neither. Wirelessly supplied energy can be used to power electric or electronic equipment, recharge batteries, and/or charge energy storage units. Multiple devices can be charged or powered simultaneously, or power delivery to multiple devices can be serialized such that one or more devices receive power for a period of time after which power delivery is switched to other devices. In some embodiments, multiple devices can share power from one or more sources simultaneously, or in a time multiplexed manner, or in a frequency multiplexed manner, or in a spatially multiplexed manner, or in an orientation multiplexed manner, or in any combination of time and/or frequency and/or spatial and orientation multiplexing. Multiple devices can share power with one another, with at least one device being reconfigured continuously, intermittently, periodically, occasionally, or temporarily, to operate as a wireless power source.

In some embodiments, systems adapted for wireless power transfer can include a tunable resonant amplifier circuit provided for driving an inductive load and having a varying impedance. The circuit can include a switching amplifier with a variable duty cycle, an inductive load, a connection between the inductive load and the switching amplifier with at least one tunable component, and a feedback loop for adjusting the at least one tunable component and the duty cycle of the amplifier. The feedback loop can adjust the duty cycle of the amplifier and the at least one tunable component to maintain substantially zero voltage switching and zero current switching at the output of the amplifier under different load conditions of the inductive load. The at least one tunable component can include a tunable capacitor and/or tunable inductor. The tunable capacitor and/or inductor can be in series or in parallel with the inductive load. The connection between the inductive load and the switching amplifier can include more than one tunable component. The switching amplifier can use a variable switching frequency. A bus voltage of the switching amplifier can be variable and used to control an amount of power delivered to the inductive load.

The feedback loop can include an impedance measuring facility. The feedback loop can include a processor configured to monitor an impedance at an output of the switching amplifier and to compute an adjustment to the variable duty cycle of the switching amplifier such that zero voltage switching is substantially maintained. The processor may be configured to compute a second adjustment to at least one tunable component such that zero current switching is substantially maintained. The inductive load may include a high-Q magnetic resonator. The circuit may be used as a source in a wireless power transmission system.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

FIG. 13 is a schematic diagram of a portion of a wireless power transfer system.

FIGS. 14A and 14B are schematic diagrams of a tunable inductor.

Like reference symbols in the various drawings indicate like elements.

DETAILED DESCRIPTION

Introduction—Wireless Power Transfer Systems

Figure 1:
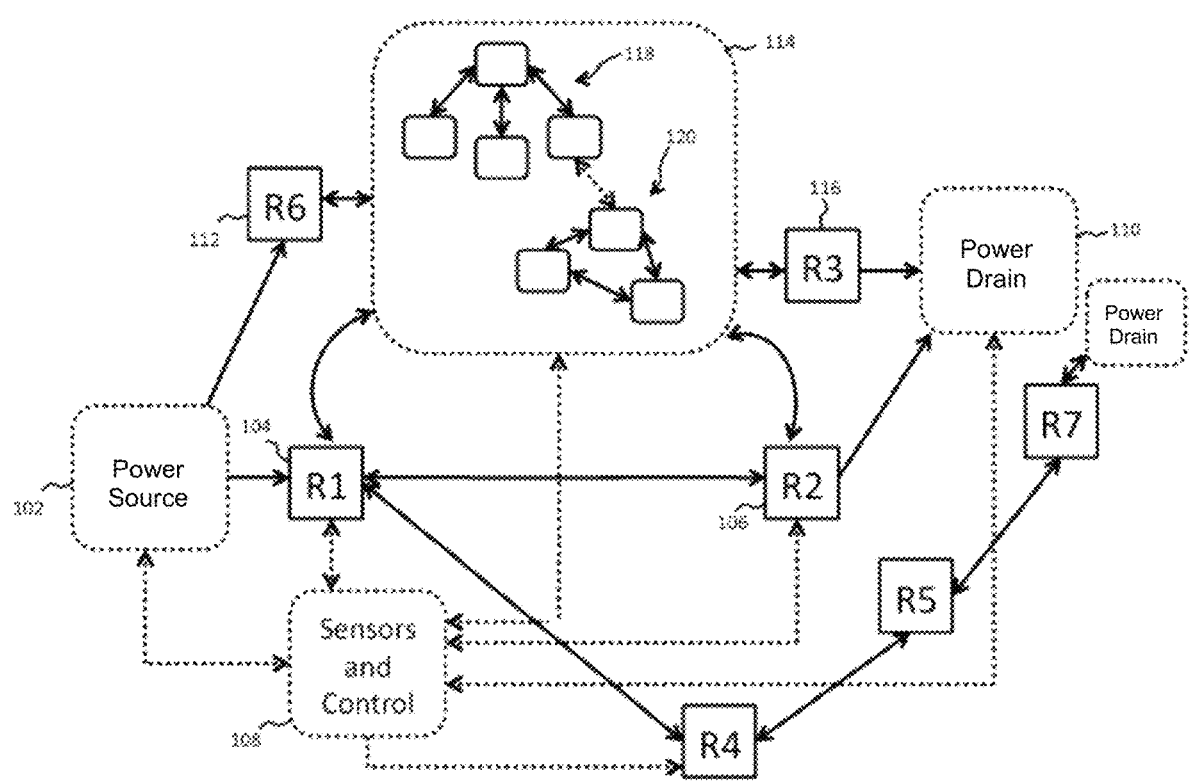
FIG. 1 is a schematic diagram of a wireless power transfer system.

This disclosure relates to wireless power transfer using coupled electromagnetic resonators. Important considerations for resonator-based power transfer include resonator efficiency and resonator coupling. Factors affecting wireless power transfer including, e.g., coupled mode theory (CMT), coupling coefficients and factors, quality factors (also referred to as Q-factors), and impedance matching are discussed, for example, in U.S. Patent Application Publication Nos. 2010/0237709, 2010/0181843, and 2012/0119569, the entire contents of each of which are incorporated herein by reference.

For purposes of this disclosure, a resonator may be defined as a resonant structure that can store energy in at least two different forms, where the stored energy oscillates between the two forms. The resonant structure has a specific oscillation mode with a resonant (modal) frequency, f, and a resonant (modal) field. The angular resonant frequency, ω, may be defined as ω=2πf, the resonant period, T, may be defined as T=1/f=2π/ω, and the resonant wavelength, λ, may be defined as λ=c/f, where c is the speed of the associated field waves (light, for electromagnetic resonators). In the absence of loss mechanisms, coupling mechanisms or external energy supplying or draining mechanisms, the total amount of energy stored by the resonator, W, would stay fixed, but the form of the energy would oscillate between the two forms supported by the resonator, where one form would be maximum when the other is minimum and vice versa.

For example, a resonator can be constructed such that the two forms of stored energy are magnetic energy and electric energy. Further, the resonator can be constructed such that the electric energy stored by the electric field is primarily confined within the structure while the magnetic energy stored by the magnetic field is primarily in the region surrounding the resonator. In other words, the total electric and magnetic energies would be equal, but their localization is different. Using such structures, energy exchange between at least two structures can be mediated by the resonant magnetic near-field of the at least two resonators. These types of resonators may be referred to as magnetic resonators.

An important parameter of resonators used in wireless power transmission systems is the Quality Factor, or Q-factor, or Q, of the resonator, which characterizes the energy decay and is inversely proportional to energy losses of the resonator. It may be defined as Q=ω*W/P, where P is the time-averaged power lost at steady state. That is, a resonator with a high-Q has relatively low intrinsic losses and can store energy for a relatively long time. Since the resonator loses energy at its intrinsic decay rate, 2Γ, its Q, also referred to as its intrinsic Q, is given by Q=ω/2Γ. The quality factor also represents the number of oscillation periods, T, it takes for the energy in the resonator to decay by a factor of e. Note that the quality factor or intrinsic quality factor or Q of the resonator is that due only to intrinsic loss mechanisms. The Q of a resonator connected to, or coupled to a power generator, g, or load, l, may be called the "loaded quality factor" or the "loaded Q". The Q of a resonator in the presence of an extraneous object that is not intended to be part of the energy transfer system may be called the "perturbed quality factor" or the "perturbed Q".

Resonators having substantially the same resonant frequency, coupled through any portion of their near-fields, may interact and exchange energy. By way of example, but not limitation, imagine a source resonator with $Q_s$, and a device resonator with $Q_d$. High-Q wireless energy transfer systems may utilize resonators that are high-Q. The Q of each resonator may be high. The geometric mean of the resonator Q's, $\sqrt{Q_s Q_d}$, may also or instead be high.

The coupling factor, k, is a number between 0≤k≤1, and it may be independent (or nearly independent) of the resonant frequencies of the source and device resonators, when those are placed at sub-wavelength distances. Rather, the coupling factor k may be determined mostly by the relative geometry and the distance between the source and device resonators, where the physical decay-law of the field mediating their coupling is taken into account. The coupling coefficient used in CMT, $\kappa = k\sqrt{\omega_s \omega_d}/2$, may be a strong function of the resonant frequencies, as well as other properties of the resonator structures.

In applications for wireless energy transfer utilizing the near-fields of the resonators, it is desirable to have the size of the resonator be much smaller than the resonant wavelength, so that power lost by radiation is minimized. In some embodiments, high-Q resonators are sub-wavelength structures. In some embodiments, high-Q resonator structures are designed to have resonant frequencies higher than 50 kHz. In certain embodiments, the resonant frequencies may be less than 1 GHz. For example, in certain applications such as car charging, the resonant frequencies are between 50 KHz and 500 KHz. In other applications, such as charging consumer electronics, the resonant frequencies are, for example, between 1 MHz and 1 GHz.

The power radiated into the far-field by sub-wavelength resonators can be further reduced in some embodiments by lowering the resonant frequency of the resonators and the operating frequency of the system. In certain embodiments, the far field radiation can be reduced by arranging for the far fields of two or more resonators to interfere destructively in the far field.

In wireless power transfer systems, a resonator can be used as a wireless power source, a wireless power capture device, a repeater or a combination thereof. In some embodiments, a resonator can alternate between transferring power, receiving power, and/or relaying power. In wireless power transfer systems, one or more magnetic resonators may be coupled to a power source and be energized to produce an oscillating magnetic near-field. Other resonators that are within the oscillating magnetic near-fields can capture these fields and convert the power into electrical energy that may be used to power or charge a load thereby enabling wireless transfer of useful power.

The so-called "useful" power in a useful power exchange is the power that is delivered to a device to power or charge it at an acceptable rate. The transfer efficiency that corresponds to a useful power exchange may be system or application-dependent. For example, high power vehicle charging applications that transfer kilowatts of power may need to be at least 80% efficient to supply useful amounts of power resulting in a useful energy exchange sufficient to recharge a vehicle battery without significantly heating up various components of the transfer system. In some consumer electronics applications, a useful power exchange can include any power transfer efficiencies greater than 10%, or any other amount acceptable to keep rechargeable batteries "topped off" and running for long periods of time. In implanted medical device applications, a useful power exchange can be any exchange that does not harm the patient but that extends the life of a battery or wakes up a sensor or monitor or stimulator. In such applications, 100 mW of power or less may be useful. In distributed sensing applications, power transfer of microwatts may be useful, and transfer efficiencies may be well below 1%.

In the embodiments disclosed herein, resonators may be referred to as source resonators, device resonators, first resonators, second resonators, repeater resonators, and the like. Embodiments can include three or more resonators. For example, a single source resonator can transfer power to multiple device resonators and/or multiple devices. Power can be transferred from a first device to a second, and then from the second device to the third, and so forth. Multiple sources can transfer power to a single device or to multiple devices connected to a single device resonator or to multiple devices connected to multiple device resonators.

Resonators can serve alternately or simultaneously as sources, devices, and/or they may be used to relay power from a source in one location to a device in another location. Intermediate electromagnetic resonators can be used to extend the distance range of wireless power transfer systems and/or to generate areas of concentrated magnetic near-fields. Multiple resonators can be daisy-chained together, exchanging power over extended distances and with a wide range of sources and devices. For example, a source resonator can transfer power to a device resonator via several repeater resonators. Energy from a source can be transferred to a first repeater resonator, the first repeater resonator can transfer the power to a second repeater resonator and the second to a third, and so on, until the final repeater resonator transfers its power to a device resonator. In this respect, the range or distance of wireless power transfer may be extended and/or tailored by adding repeater resonators. High power levels may be split between multiple sources, transferred to multiple devices, and/or recombined at a distant location.

FIG. 1 shows a schematic diagram of an example embodiment of a wireless power transfer system. The system includes at least one source resonator (R1) 104 (and optionally, another source resonator R6, 112) coupled to a power source 102 and optionally to a sensor and control unit 108. Power source 102 can be a source of any type of power capable of being converted into electrical energy that can be used to drive the source resonator 104. The power source can be a battery, a solar panel, the electrical mains, a wind or water turbine, an electromagnetic resonator, and/or a generator. The electrical power used to drive the magnetic resonator is converted into oscillating magnetic fields by the resonator. The oscillating magnetic fields can be captured by other resonators which can be device resonators (R2) 106, (R3) 116 that are optionally coupled to a power drain 110.

The oscillating fields can be optionally coupled to repeater resonators (R4, R5) that are configured to extend or tailor the wireless power transfer topology. Device resonators can capture the magnetic fields in the vicinity of source resonator(s), repeater resonators and other device resonators and convert them into electrical power that may be used by a power drain. The power drain 110 can be an electrical, electronic, mechanical or chemical device and the like configured to receive electrical energy. Repeater resonators can capture magnetic fields in the vicinity of source, device, and repeater resonator(s) and may transfer the power on to other resonators.

Wireless power transfer systems can include a single source resonator 104 coupled to a power source 102 and a single device resonator 106 coupled to a power drain 110. In some embodiments, wireless power transfer systems can include multiple source resonators coupled to one or more power sources and can include multiple device resonators coupled to one or more power drains.

Power can be transferred directly between source resonator 104 and device resonator 106. Alternatively, power can be transferred from one or more source resonators 104, 112 to one or more device resonators 106, 116 via any number of intermediate resonators which may be device resonators, source resonators, and/or repeater resonators. Power can be transferred via a network or arrangement of resonators 114 that can include sub-networks 118, 120 arranged in any combination of topologies such as, for example, token ring, mesh, and ad hoc.

In some embodiments, the wireless power transfer system can include a centralized sensing and control system 108. Parameters of the resonators, power sources, power drains, network topologies, and operating parameters can be monitored and adjusted using one or more processors in control system 108 to meet specific operating criteria of the system. For example, one or more central control processors can adjust parameters of individual components of the system to optimize global power transfer efficiency, and/or to optimize the amount of power transferred.

In some embodiments, the wireless power transfer system can have a distributed sensing and control system in which sensing and control can be incorporated into each resonator or group of resonators, power sources, and power drains. The distributed sensing and control system can be configured to adjust the parameters of the individual components in the group to maximize the power delivered and/or to maximize power transfer efficiency in that group, for example.

In certain embodiments, components of the wireless power transfer system can have wireless or wired data communication interfaces and/or links to other components such as devices, sources, repeaters, power sources, and resonators. The components can transmit and/or receive data using the links and/or interfaces that can be used to enable distributed or centralized sensing and control. Wireless communication channels can be separate from wireless energy transfer channels, or the same channel can be used to perform both functions. In some embodiments, resonators used for power exchange can also be used to exchange information. For example, information can be exchanged by modulating a component in a source or device circuit and sensing that change with port parameter or other monitoring devices. Resonators can signal each other by tuning, changing, varying, dithering, and the like, the resonator parameters such as the impedance of the resonators which may affect the reflected impedance of other resonators in the system. The systems and methods disclosed herein enable the simultaneous transmission of power and communication signals between resonators in wireless power transmission systems, and enable the transmission of power and communication signals during different time periods and/or at different frequencies using the same magnetic fields that are used during wireless power transfer. In certain embodiments, wireless communication between components of the systems disclosed herein can occur via a separate wireless communication channel, examples of which include WiFi, Bluetooth, and infrared channels.

Impedance Matching in Wireless Power Transfer Systems

A variety of factors influence the amount of power that can be transferred wirelessly and the efficiency with which power is transferred from one resonator to another. In particular, the efficiency of power transfer between coupled high-Q magnetic resonators is impacted by how closely matched the resonators are in resonant frequency and how well their impedances are matched to the power supplies and power consumers (i.e., power drains) in the system. Because a variety of external factors including the relative positions of extraneous objects and/or other resonators in the system, and the changing of those relative positions, can alter the resonant frequency and/or input impedance of a high-Q magnetic resonator, wireless power transfer systems can include tunable components for adjusting the impedance of resonators in the system to maintain target levels of power transmission in various environments or operating scenarios.

Impedance tuning in systems that provide for wireless power transfer can be accomplished by adjusting inductive elements of the systems. For purposes of the present discussion, an inductive element can be any coil or loop structure (the "loop") of a conducting material, with or without a core made of magnetic material (gapped or ungapped), which may also be coupled inductively or in any other contactless way to other systems. The element is inductive because its impedance has positive reactance, X, and resistance, R.

As an example, consider an external circuit, such as a driving circuit or a driven load or a transmission line, to which an inductive element is connected. The external circuit (e.g. a driving circuit) can deliver power to the inductive element and the inductive element can deliver power to the external circuit (e.g., a driven load). The efficiency and amount of power delivered between the inductive element and the external circuit at a desired frequency can depend on the impedance of the inductive element relative to the properties of the external circuit. Impedance-matching networks and external circuit control techniques can be used to regulate the power delivery between the external circuit and the inductive element, at a desired frequency, f.

In general, maximum power is delivered from a source to a receiver (e.g., a load) when the impedance of the source, $Z_o$, is the complex conjugate of the impedance of the receiver, $Z_o^*$. However, achieving maximum efficiency of power transfer does not require conjugate matching of the impedances of the source and receiver. Typically, for example, power sources such as switching amplifiers that are used for wireless power transfer have very low impedance.

Accordingly, in many applications, an impedance matching network connected to an inductive element is used to adjust the input impedance so that the efficiency of the amplifier is high, and the amplifier delivers a target amount of power to an external circuit (e.g., a receiver). That is, the impedance matching network adjusts $Z_o$ so that the amplifier (e.g., an amplifier of class A, B, C, D, DE, E, F and the like) efficiently transfers a target amount of power to a receiver (e.g., a receiving resonator). The amount of power delivered can be controlled by adjusting the complex ratio of the impedance of the combination of the impedance matching network and the inductive element at the power transfer frequency.

In general, impedance matching networks connected to inductive elements can form magnetic resonators. For some applications, such as wireless power transfer using strongly-coupled magnetic resonators, a high Q may be desired for the resonators. Therefore, the inductive element may be configured to have low losses (e.g., high X/R). Since the matching circuit can include additional sources of loss inside the resonator, the components of the matching circuit can also be chosen to have low losses. Furthermore, in high-power applications and/or due to the high resonator Q, large currents may be present during operation in parts of the resonator circuit and large voltages may be present across some circuit elements within the resonator. Such currents and voltages can exceed the specified tolerances for particular circuit elements and may be too high for particular components to withstand. In some cases, it may be difficult to find or implement components, such as tunable capacitors for example, with size, cost and performance (loss and current/voltage-rating) specifications sufficient to realize high-Q and high-power resonator designs for certain applications. However, suitably configured impedance matching networks can preserve the high Q for magnetic resonators, while also reducing the component requirements for low loss and/or high current/voltage-rating.

For example, impedance matching circuit topologies can be implemented to reduce or even minimize the loss and current-rating requirements on some of the elements of the matching circuit. The topology of a circuit matching a low-loss inductive element to a target impedance, $Z_o$, can be implemented so that some of its components lie outside the associated high-Q resonator by being in series with the external circuit. The requirements for low series loss or high current ratings for these components can therefore be reduced. Relieving the low series loss and/or high-current-rating requirements on a circuit element may be particularly useful when the element is variable and/or has a large voltage rating.

As another example, impedance matching circuit topologies can be implemented to reduce or even minimize the voltage rating requirements on some of the elements of the matching circuit. The topology of a circuit matching a low-loss inductive element to a target impedance, $Z_o$, may be chosen so that some of its components lie outside the associated high-Q resonator by being in parallel with $Z_o$. As a result, the requirements for low parallel loss and/or high voltage-rating for these components may be reduced. Relieving the low parallel loss and/or high-voltage requirement on a circuit element may be particularly useful when the element needs to be variable and/or to have a large current-rating and/or low series loss.

The topology of the circuit matching a low-loss inductive element to a particular target impedance, $Z_o$, may be chosen so that the field pattern of the associated resonant mode and thus its high Q are preserved upon coupling of the resonator to the external impedance. Otherwise, inefficient coupling to the desired resonant mode may occur (potentially due to coupling to other undesired resonant modes), resulting in an effective lowering of the resonator Q.

For applications where the low-loss inductive element or the external circuit may exhibit variations, dynamic adjustment of the matching circuit can be performed to match the inductive element to a target impedance $Z_o$ at the desired frequency f. Since there may typically be two tuning objectives, matching or controlling both the real and imaginary part of the impedance, $Z_o$, at the desired frequency, f, there may be two variable elements in the matching circuit. For inductive elements, the matching circuit may need to include at least one variable capacitive element.

In some embodiments, a low-loss inductive element may be matched by topologies using two variable capacitors, or two networks of variable capacitors. A variable capacitor may, for example, be a tunable butterfly-type capacitor having, e.g., a center terminal for connection to a ground or other lead of a power source or load, and at least one other terminal across which a capacitance of the tunable butterfly-type capacitor can be varied or tuned, or any other capacitor having a user-configurable, variable capacitance.

In certain embodiments, a low-loss inductive element may be matched by topologies using one, or a network of, variable capacitor(s) and one, or a network of, variable inductor(s). In some embodiments, a low-loss inductive element may be matched by topologies using one, or a network of, variable capacitor(s) and one, or a network of, variable mutual inductance(s), which transformer-couple the inductive element either to an external circuit or to other systems.

In some embodiments, it may be difficult to find or implement tunable lumped elements with size, cost, and performance specifications sufficient to realize high-Q, high-power, and potentially high-speed, tunable resonator designs. The topology of the circuit matching a variable inductive element to an external circuit may be designed so that some of the variability is assigned to the external circuit by varying the frequency, amplitude, phase, waveform, duty cycle, and the like, of the drive signals applied to transistors, diodes, switches and the like, in the external circuit.

In certain embodiments, variations in resistance, R, and inductance, L, of an inductive element at the resonant frequency may be only partially compensated or not compensated at all. Adequate system performance may thus be preserved by tolerances designed into other system components or specifications. Partial adjustments, realized using fewer tunable components or less capable tunable components, may be sufficient.

In some embodiments, impedance matching circuit architectures are implemented that achieve the desired variability of the impedance matching circuit under high-power conditions, while minimizing the voltage/current rating requirements on its tunable elements and achieving a finer (i.e. more precise, with higher resolution) overall tunability. The topology of the circuit matching a variable inductive element to a target impedance, $Z_o$, can include appropriate combinations and placements of fixed and variable elements, so that the voltage/current requirements for the variable components can be reduced and the desired tuning range can be covered with finer tuning resolution. In this manner, the voltage/current performance requirements can be reduced on components that are not variable.

In general, impedance matching network architectures can be implemented to achieve a variety of objectives, including:

(1) to increase or even maximize the power delivered to, and/or to reduce or even minimize impedance mismatches between, the source low-loss inductive elements (and any other systems wirelessly coupled to them) from the power source(s) (e.g., power driving generators);

(2) to increase or even maximize the power delivered from, and/or to reduce or even minimize impedance mismatches between, the device low-loss inductive elements (and any other systems wirelessly coupled to them) and the power driven loads;

(3) to deliver a controlled amount of power to, or to achieve a certain impedance relationship between, the source low-loss inductive elements (and any other systems wirelessly coupled to them) and the power driving generators; and (4) to deliver a controlled amount of power from, or to achieve a certain impedance relationship between, the device low-loss inductive elements (and any other systems wirelessly coupled to them) to the power driven loads.

As explained above, a wireless power source can include at least one resonator coil coupled to a power supply, which may be a switching amplifier, such as a class-D amplifier or a class-E amplifier, or a combination thereof. In such an arrangement, the resonator coil is effectively a power load to the power supply. In some embodiments, a wireless power device can include at least one resonator coil coupled to a power load, which may be a switching rectifier, such as a class-D rectifier or a class-E rectifier, or a combination thereof. In such an arrangement, the resonator coil is effectively a power supply for the power load, and the impedance of the load directly relates also to the work-drainage rate of the load from the resonator coil.

In general, in any of these configurations, the efficiency of power transmission between a power supply and a power load is impacted by how closely matched the input impedance of the power load is to an impedance that the power source can efficiently drive. Designing and/or adjusting the power supply and/or power load impedance to obtain maximum power transmission efficiency is typically referred to as "impedance matching," and corresponds to optimizing the ratio of useful-to-lost power in a wireless power transfer system.

As explained above, impedance matching can be performed by adding networks or sets of elements such as capacitors, inductors, transformers, switches, resistors, and the like, to form impedance matching networks between a power supply and a power load. Impedance matching can then be achieved via mechanical adjustments and changes in element positioning. For varying loads, impedance matching networks can include variable components that are dynamically adjusted to ensure that the impedance at the power supply terminals looking towards the load and the characteristic impedance of the power supply remain substantially complex conjugates of each other, even in dynamic environments and operating scenarios.

More generally, a variety of different adjustments can be performed to achieve impedance matching between a power supply and a load. In some embodiments, for example, impedance matching can be accomplished by tuning one or more of the duty cycle, the phase, and the frequency of the driving signal of the power supply. In certain embodiments, impedance matching can be achieved by tuning a physical component within the power supply, such as a capacitor. Such a tuning mechanism may be advantageous because it may allow impedance matching between a power supply and a load without the use of a tunable impedance matching network, or with a simplified tunable impedance matching network, such as one that has fewer tunable components, for example. Tuning the duty cycle and/or frequency and/or phase of the driving signal to a power supply can yield a dynamic impedance matching system with an extended tuning range or precision, with higher power, voltage and/or current capabilities, with faster electronic control, and/or with fewer external components.

In addition to providing for impedance matching between a power load and power supply at the time a wireless power transfer system is designed or set up, impedance tuning permits dynamic adjustment of the system's impedance characteristics to account for changes in impedance that occur during operation of the system. For example, in some wireless power transfer systems, parameters of resonators such as the inductance may be affected by environmental conditions such as surrounding objects, temperature, orientation, and number and position of other resonators. Changes in operating parameters of the resonators may change certain system parameters, such as the efficiency with which power is transferred between resonators. As an example, high-conductivity materials located near a resonator may shift the resonant frequency of a resonator and detune it from other resonant objects. To allow the system to respond to such environmental changes, a resonator feedback mechanism can be implemented that corrects the resonant frequency of the resonator by changing a reactive element (e.g., an inductive element or capacitive element).

Active tuning circuits that include tunable components and that monitor the operating environment and operating parameters of certain system components can be integrated into certain wireless power transfer systems. Monitoring circuits can generate signals to actively compensate for changes in parameters of components. For example, temperature measurements can be used to calculate expected changes in, or to indicate previously measured values of, the capacitance of the system allowing compensation by switching in other capacitors or tuning capacitors to maintain the desired capacitance over a range of temperatures. In certain embodiments, RF amplifier switching waveforms can be adjusted to compensate for component value or load changes in the system. In some embodiments, changes in parameter values for certain components can be compensated with active cooling, heating, active environment conditioning, and the like.

Figure 2A:
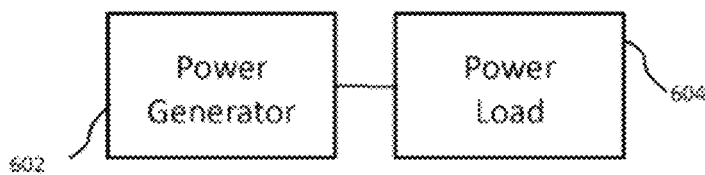
FIG. 2A is a schematic diagram of a wireless power transfer system that does not include an impedance matching network.
Figure 2B:
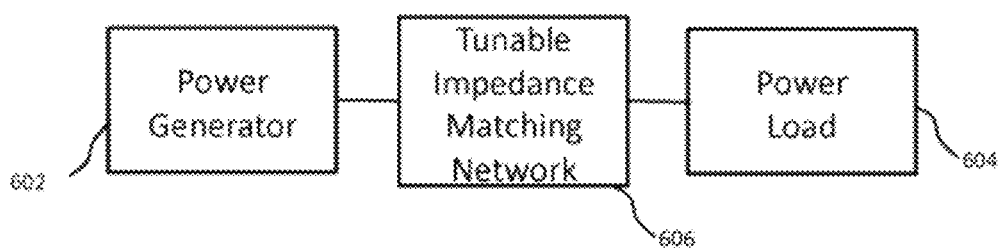
FIG. 2B is a schematic diagram of a wireless power transfer system that includes an impedance matching network.

The concepts discussed above are illustrated schematically in FIGS. 2A-2C. As described, the efficiency of power transmission between a power generator and a power load can be impacted by how closely matched the input impedance of the load is to the desired impedance of the generator (e.g., an impedance at which the generator delivers power with high, or even maximal, efficiency). In the example embodiment of a wireless power transfer system shown in FIG. 2A, power can be transferred from power generator 602 to power load 604 at a maximum possible efficiency when the input impedance of load 604 is equal to the desired impedance of the power generator 602 (which can also be a power amplifier). Impedance matching between power generator 602 and power load 604 can be performed by inserting a tunable impedance matching network 606 (which can include one or more sub-networks and/or sets of elements such as capacitors, resistors, inductors, transformers, switches and the like) between the power generator and the power load, as shown in FIG. 2B.

Figure 2C:
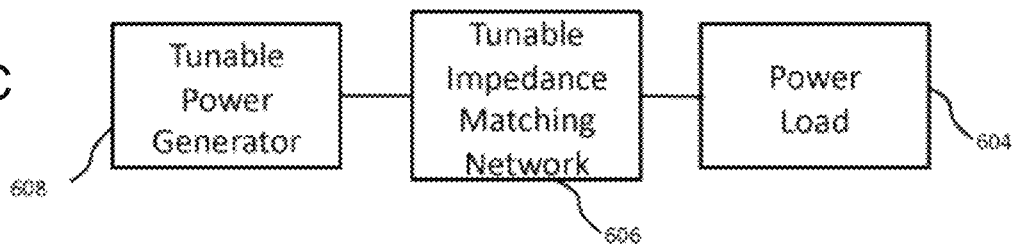
FIG. 2C is a schematic diagram of a wireless power transfer system that includes a tunable power generator and an impedance matching network.

In some embodiments, as explained further above, mechanical adjustments and/or changes in element positioning can be used to achieve impedance matching. The impedance matching network 606 can include variable components that are dynamically adjusted in this manner to ensure that the impedance at the generator terminals looking towards the power load remain substantially equal to the desired impedance of the power generator, even in dynamic environments and operating scenarios. Dynamic impedance matching can be accomplished by tuning the duty cycle and/or the phase and/or the frequency of the driving signal of a tunable power generator 608, as shown in FIG. 2C, and/or by tuning a physical component within the tunable power generator. Where a tunable power generator 608 is implemented as shown in FIG. 2C, impedance matching can be performed with or without a tunable impedance matching network 606 between the power generator and power load. Where an impedance matching network is present, the impedance matching network can, in certain embodiments, be simplified relative to the tunable impedance matching network in FIG. 2B, e.g., by including fewer tunable components. Further, tuning the duty cycle and/or frequency and/or phase of the driving signal to a power generator may yield a dynamic impedance matching system with an extended tuning range or precision, with higher power, voltage and/or current capabilities, with faster electronic control, and/or with fewer external components.

A number of other considerations can be important for impedance matching in wireless power transfer systems. In such systems, low loss inductive element is typically the coil of a source resonator coupled to one or more device resonators or other resonators, such as repeater resonators, for example. The impedance of the inductive element, $R+j\omega L$, can include the reflected impedances of the other resonators on the coil of the source resonator. Variations of R and L of the inductive element can occur due to external perturbations in the vicinity of the source resonator and/or the other resonators, and/or thermal drift of components. Variations of R and L of the inductive element can also occur during normal use of the wireless power transmission system due to relative motion of the devices and other resonators with respect to the source. The relative motion of these devices and other resonators with respect to the source, or relative motion or position of other sources, can lead to varying coupling (and thus varying reflected impedances) of the devices to the source. Furthermore, variations of R and L of the inductive element can also occur during normal use of the wireless power transmission system due to changes within the other coupled resonators, such as changes in the power draw of their loads. The methods and systems disclosed herein are capable of compensating for such variations by implementing dynamic impedance matching of between the inductive element and the external circuit driving it.

Consider, for example, a source resonator that includes a low-loss source coil which is inductively coupled to the device coil of a device resonator driving a resistive load. In some embodiments, dynamic impedance matching can be achieved at the source circuit. In certain embodiments, dynamic impedance matching can also be achieved at the device circuit. The effective resistance of the source inductive element (namely the resistance of the source coil $R_s$ plus the reflected impedance from the device) depends on the mutual inductance of the coils. Similarly, the effective resistance of the device inductive element also depends on the mutual inductance. Dynamic variation of the mutual inductance between the coils due to motion results in a dynamic variation of the effective impedances. Therefore, when both source and device are dynamically tuned, the variation of mutual inductance is seen from the source circuit side as a variation in the source inductive element resistance R. Note that in this type of variation, the resonant frequencies of the resonators may not change substantially, since L may not be changing. Thus, the methods and systems disclosed herein for dynamic impedance matching can be used for the source circuit of the wireless power transmission system.

Note that the possible wireless power transmission efficiency also increases with U. To achieve an approximately constant level of power transmitted to the device, the output power of the source may need to decrease as U increases. If dynamic impedance matching is implemented by tuning some of the amplifier parameters, the output power of the amplifier may vary accordingly. In some embodiments, the automatic variation of the output power is preferred to be monotonically decreasing with R, so that it matches the constant device power requirement. In embodiments where the output power level is accomplished by adjusting the DC driving voltage of the power generator, using an impedance matching set of tunable parameters which leads to monotonically decreasing output power vs. R allows constant power to be maintained at the power load in the device with only a moderate adjustment of the DC driving voltage. In embodiments where adjustment of the output power level occurs via adjustment of the duty cycle DC or the phase of a switching amplifier or a component within an impedance matching network, using an impedance matching set of tunable parameters that leads to monotonically decreasing output power vs. R allows constant power to be maintained at the power load in the device with only a moderate adjustment of duty cycle or phase.

Figure 3:
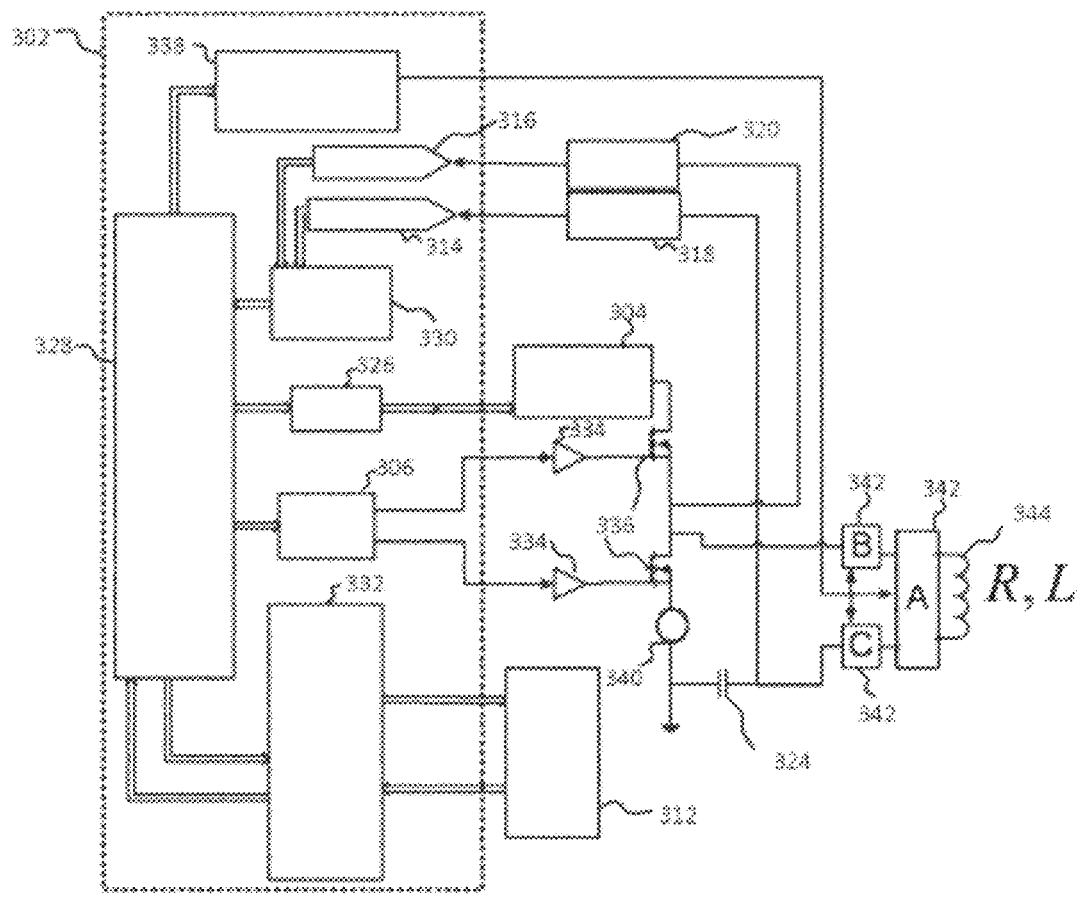
FIG. 3 is a schematic diagram of a power source that includes a half-bridge switching power amplifier.
Figure 4:
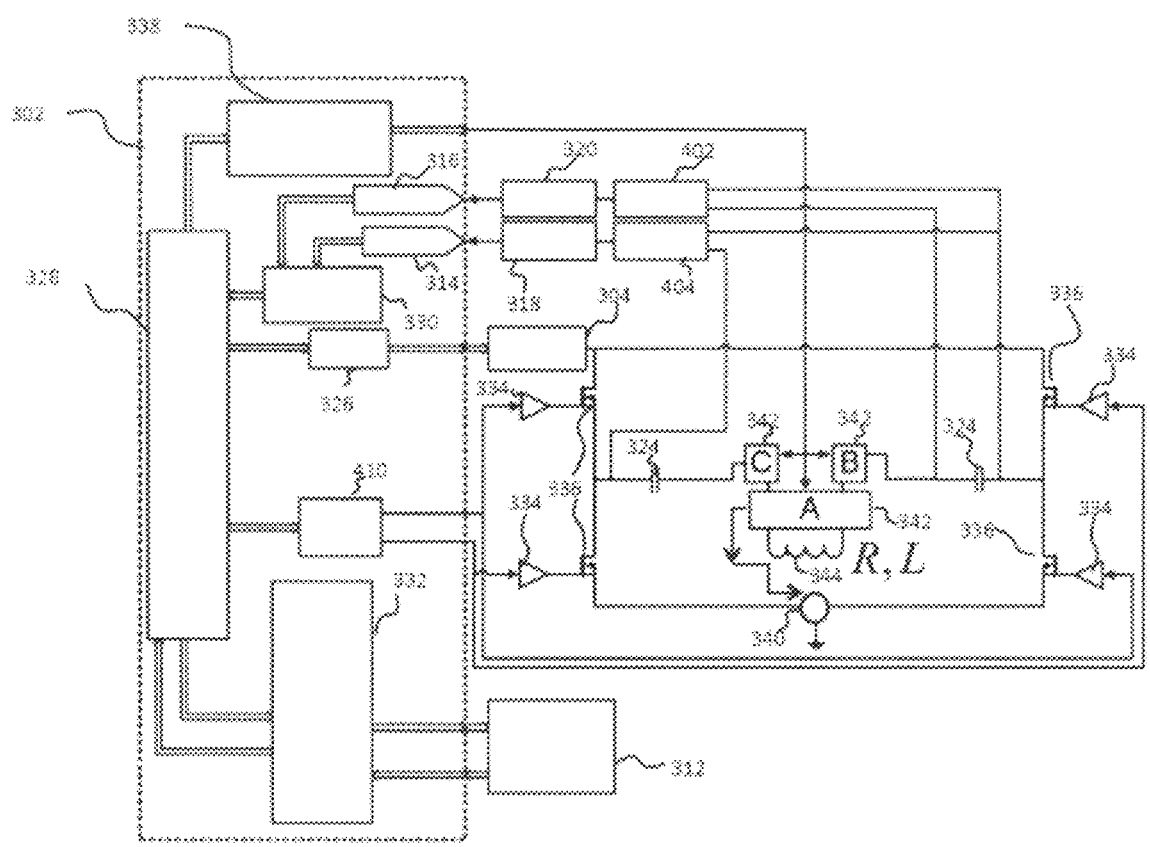
FIG. 4 is a schematic diagram of a power source that includes a full-bridge switching amplifier.

FIG. 3 is a block diagram of a power source that includes a half-bridge switching power amplifier and associated measurement, tuning, and control circuitry. FIG. 4 is a block diagram of a power source that includes a full-bridge switching amplifier and associated measurement, tuning, and control circuitry. The half bridge system topology depicted in FIG. 3 includes a processing unit 328 that executes one or more control algorithms. Processing unit 328 can be a micro controller, an application specific circuit, a field programmable gate array, a processor, a digital signal processor, and the like. The processing unit can be a single device or it can be implemented as a network of devices. The control algorithm(s) can run on any portion of the processing unit. The algorithm(s) can be customized for certain applications and can include a combination of analog and digital circuits and signals. The algorithm(s) can measure and adjust voltage signals and levels, current signals and levels, signal phases, digital count settings, and the like.

The system shown in FIG. 3 also includes an optional source/device and/or source/other resonator communication controller 332 coupled to wireless communication circuitry 312. The optional source/device and/or source/other resonator communication controller 332 can be part of the same processing unit that executes the control algorithm(s), it can be part of a circuit within a micro controller 302, it can be external to the wireless power transmission modules, and it can be substantially similar to communication controllers used in wire powered or battery powered applications but adapted to include new and/or different functionality to enhance or support wireless power transmission.

The system includes a pulse-width modulation (PWM) generator 306 coupled to at least two transistor gate drivers 334 and controlled by the control algorithm implemented on processing unit 328. The two transistor gate drivers 334 are coupled directly or via gate drive transformers to two power transistors 336 that drive the source resonator coil 344 through impedance matching network components 342. The power transistors 336 can be coupled and powered with an adjustable DC supply 304 and the adjustable DC supply 304 can be controlled by a variable bus voltage, Vbus. The Vbus controller 326 may be controlled by the control algorithm and may be part of, or integrated into, microcontroller 302 or other integrated circuits. Vbus controller 326 controls the voltage output of adjustable DC supply 304, which in turn controls the power output of the amplifier and the power delivered to the resonator coil 344.

The system shown in FIG. 3 also includes optional sensing and measurement circuitry including signal filtering and buffering circuits 318, 320 that can shape, modify, filter, process, and buffer signals prior to their input to processors and/or converters such as analog to digital converters (ADC) 314, 316, for example. The processors and converters such as ADCs 314, 316 can be integrated into microcontroller 302 or can be implemented as separate circuits that can be coupled to a processing core 330. Based on measured signals, the control algorithm can generate, limit, initiate, extinguish, control, adjust, and/or modify the operation of any of PWM generator 306, communication controller 332, Vbus control 326, source impedance matching controller 338, filtering/buffering elements 318 and 320, converters 314 and 316, and resonator coil 344. The impedance matching networks 342 and resonator coils 344 can include electrically controllable, variable, and/or tunable components such as capacitors, switches, and/or inductors, and these components can have their component values or operating points adjusted according to signals received from the source impedance matching controller 338.

Components can be tuned to adjust the operation and characteristics of the resonator including the power delivered to and by the resonator, the resonant frequency of the resonator, the impedance of the resonator, the Q of the resonator, and any other coupled systems. The resonator can be any of a variety of different types or structures of resonator including a capacitively loaded loop resonator, a planar resonator with a magnetic material, and combinations thereof.

The full bridge system topology shown in FIG. 4 can include a processing unit 328 that executes a master control algorithm. Processing unit 328 can be a microcontroller, an application specific circuit, a field programmable gate array, a processor, a digital signal processor, and the like. The system can include a source/device and/or source/other resonator communication controller 332 coupled to wireless communication circuitry 312. The source/device and/or source/other resonator communication controller 332 can be part of the same processing unit that executes the master control algorithm, or part of a circuit within a micro controller 302, or external to the wireless power transmission modules, and may be substantially similar to communication controllers used in wire powered or battery powered applications but adapted to include new and/or different functionality to enhance or support wireless power transmission.

The system in FIG. 4 includes PWM generator 410 with at least two outputs coupled to at least four transistor gate drivers 334 that can be controlled by signals generated from the master control algorithm. The four transistor gate drivers 334 can be coupled to four power transistors 336 directly or via gate drive transformers that can drive source resonator coil 344 through impedance matching networks 342. The power transistors 336 can be coupled and powered with an adjustable DC power supply 304, and power supply 304 is controlled by Vbus controller 326, which is in turn controlled by the master control algorithm. Vbus controller 326 adjusts the voltage output of the adjustable DC power supply 304, which controls the power output of the amplifier and power delivered to the resonator coil 344.

The system of FIG. 4 can optionally include sensing and measurement circuitry including signal filtering and buffering circuits 318, 320 and differential/single ended conversion circuitry 402, 404 that can shape, modify, filter, process, and buffer signals prior to being input to processors and/or converters such as analog to digital converters (ADC) 314, 316. The processors and/or converters, such as ADCs 314 and 316, can be integrated into microcontroller 302, or can be implemented as separate circuits that are coupled to processing core 330.

Based on measured signals, the master control algorithm can generate, limit, initiate, extinguish, control, adjust, and/or modify the operation of any of PWM generator 410, communication controller 332, Vbus controller 326, source impedance matching controller 338, filtering/buffering elements 318 and 320, differential/single ended conversion circuitry 402 and 404, converters 314 and 316, and resonator coil 344.

Impedance matching networks 342 and resonator coils 344 can include electrically controllable, variable, and/or tunable components such as capacitors, switches, and inductors, and these components can have their component values or operating points adjusted according to signals received from source impedance matching controller 338. Components can be tuned to enable tuning of the operation and characteristics of the resonator including the power delivered to and by the resonator, the resonant frequency of the resonator, the impedance of the resonator, the Q of the resonator, and any other coupled systems. The resonator can be any of a variety of different types or structures of resonator, including a capacitively loaded loop resonator, a planar resonator with a magnetic material, and combinations thereof.

Referring to FIGS. 3 and 4, impedance matching networks 342 can include fixed value components such as capacitors, inductors, and networks of such components. Portions of the impedance matching networks can include inductors, capacitors, transformers, and series and parallel combinations of such components. In some embodiments, portions of the impedance matching networks can be empty (i.e., short-circuited).

The full bridge topology shown in FIG. 4 can allow operation at higher output power levels, relative to the half-bridge topology shown in FIG. 3, using the same DC bus voltage. The half-bridge topology of FIG. 3 can provide a single-ended drive signal, while the full bridge topology of FIG. 4 can provide a differential drive signal to source resonator 308. In some wireless power transfer applications, the driven load may have an impedance that is very different from the desired impedance of the external driving circuit to which it is connected. Furthermore, the driven load may not be a resonant network. Impedance matching networks 342 in FIGS. 3 and 4 regulate the impedance at the input of the network consisting of the impedance matching network (IMN) circuit and the load. An IMN circuit can achieve this regulation by creating a resonance close to the driving frequency. Since such an IMN circuit accomplishes some or even all conditions needed to increase or even maximize the power transmission efficiency from the generator to the load (resonance and impedance matching—ZVS and ZCS for a switching amplifier), the IMN circuit can be used between the driving circuit and the load.

Where the load is variable and/or the inductance of the resonators in the system varies due to environmental factors such as variations in the relative positions of the resonators, the presence of other components that perturb the resonators, and changes in physical conditions such as temperature that change the material properties of the resonators, impedance matching between the load and the external driving circuit, such as a linear or switching power amplifier, can be achieved by using adjustable/tunable components in the IMN circuit that may be adjusted in response to the varying load and/or changing resonator properties. To adjust both the real and imaginary parts of the impedance, two (or, more generally, more than one, such as two or more) tunable/variable elements in the IMN circuit can be used.

In some embodiments, the load may be inductive (such as a resonator coil) with impedance $R+j\omega L$, so the two tunable elements in the IMN circuit may be two tunable capacitance networks, or one tunable capacitance network and one tunable inductance network, or one tunable capacitance network and one tunable mutual inductance network.

Further, in some embodiments, impedance matching for a linear or switching power amplifier can be achieved by using adjustable/tunable components or parameters in the amplifier circuit that may be adjusted to match the desired impedance of the amplifier to the varying input impedance of the network consisting of the IMN circuit and the load (IMN+load). As shown in FIG. 2C, the IMN circuit can also be tunable. To match both the real and imaginary parts of the impedance, a total of two tunable/variable elements or parameters in the amplifier and the IMN circuit can be used. As explained above, the number of tunable/variable elements in the IMN circuit can be reduced or even completely eliminated by incorporating such elements in the amplifier. For example, one tunable element in the power amplifier and one tunable element in the IMN circuit can be used for impedance matching. As another example, two tunable elements in the power amplifier (and none in the IMN circuit) can be used for impedance matching. Tunable elements or parameters in the power amplifier can include the frequency, amplitude, phase, waveform, and duty cycle of the drive signals applied to transistors, switches, diodes, and other circuit elements.

Figure 5:
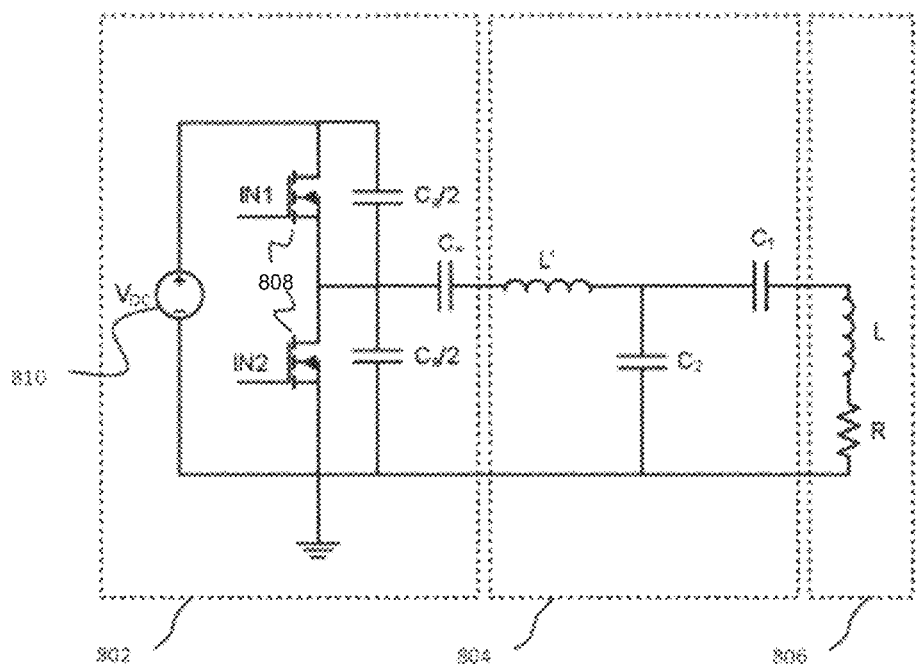
FIG. 5 is a schematic diagram of a class D power amplifier.

FIG. 5 shows a simplified circuit diagram of a class D power amplifier 802, impedance matching network 804, and an inductive load 806. Switching amplifier 804 includes a power source 810, switching elements 808, and capacitors. The impedance matching network 804 includes inductors and capacitors, and the load 806 is represented as an inductor and a resistor. Amplifier 802 can correspond to either a half-bridge or full bridge class-D amplifier operating at switching frequency f and driving a low-loss inductive element $R+j\omega L$ via IMN 804.

In some embodiments, L'—the inductance of the inductive element in IMN 804—can be tunable. L' can be tuned, for example, via a variable tapping point on the inductor or by connecting a tunable capacitor in series or in parallel to the inductor. In some embodiments, $C_o$ can be tunable. For the half-bridge topology, $C_o$ can be tuned by varying either one or both capacitors as only the parallel sum of these capacitors matters for the amplifier operation. For the full bridge topology, $C_o$ can be tuned by varying one, two, three, or all capacitors as only their combination (series sum of the two parallel sums associated with the two halves of the bridge) matters for the amplifier operation.

Figure 6:
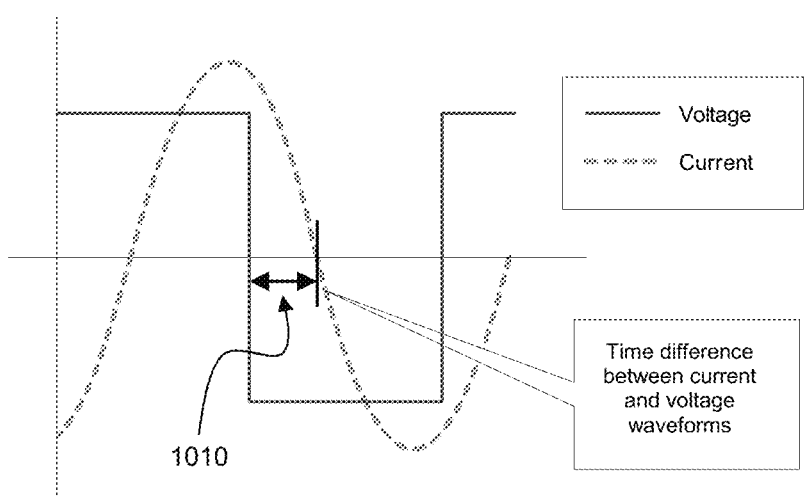
FIG. 6 is a plot showing current and voltage waveforms and a measurement of an offset between the waveforms.

In some embodiments, two of the components IMN 804 can be tunable. For example, both L' and $C_2$ can be tuned. FIG. 6 shows values of L' and $C_2$ that can be used to achieve impedance matching as functions of the varying R and L of the inductive element, and the associated variation of the output power (at given DC bus voltage) of the amplifier, for f=250 kHz, dc=40%, $C_o$=640 pF, and $C_1$=10 nF. Since IMN 804 always adjusts to the fixed desired impedance of the amplifier, the output power is constant as the inductive element is varying.

Capacitive and Reactive Operational Modes

Impedance tuning can be particularly important in wireless power transfer applications where the positions of the source and receiver resonators vary with respect to one another. One such application is wireless transfer of power for vehicle charging. Although the receiver resonator in a vehicle is positioned in approximately the same location with respect to a source resonator configured for power transfer to the vehicle, the relative positions of the source and receiver resonators still vary each time they are aligned with respect to one another (e.g., when the vehicle's operator parks the vehicle over the source resonator). These variations in relative position between the source and receiver resonators can lead to an impedance mismatch between the source and receiver resonators.

To understand the origin of the impedance mismatch, consider that when the vehicle's wireless power transfer system is initially designed, the design assumes a particular separation and relative orientation between the source and receiver resonators. The impedance of the source and receiver are matched based on this assumption. During operation, if the relative orientations of the source and receiver resonators differ from the assumed orientation, the efficiency with which power is transferred between them can be reduced.

Other factors can also contribute to reduced power transfer efficiency between the source and receiver resonators. In vehicle charging applications, debris may be located in the general vicinity of the source and receiver resonators, which can alter the impedance of the resonators. Further, variations in environmental conditions (e.g., variations in temperature, humidity) can lead to changes in the properties of materials from which the source and receiver resonators are formed, which in turn can lead to changes in the impedances of the resonators. Still further, variations in the load represented by the receiver resonator can occur, e.g., as batteries in the vehicle are close to capacity after a period of charging, such that power transfer efficiency between the source and receiver resonators is reduced during charging, even when efficiency was higher the onset of charging.

The systems and methods for impedance matching disclosed herein are particularly useful for achieving a target impedance within the source to yield efficient wireless power transfer between the source and receiver resonators. By achieving higher efficiency, the amount of power that can be transferred in a particular period of time also increases.

Transferring large amounts of power efficiently is an important consideration for many applications, including vehicle charging applications. Vehicle batteries have high capacities relative to the batteries found in most conventional electronic devices. Moreover, consumer preferences and use patterns typically demand that even when substantially depleted, vehicle batteries are recharged within a relatively brief period of time. The systems and methods for impedance matching disclosed herein allow for wireless power transfer in high power applications such as vehicle charging by permitting even large amounts of power to be transferred at high efficiency between source and receiver resonators.

Another aspect that affects the efficiency and amount of wireless power transfer between source and receiver resonators, particularly in high power applications such as vehicle charging, is the mode in which the source and/or receiver resonators are operating. The following discussion will focus on the source resonator, but it should be appreciated that the aspects and features discussed are also applicable to the receiver resonator in a wireless power transfer system.

As the impedance of a resonator (e.g., a source resonator) is tuned, particularly in high power applications such as vehicle charging, e.g., where the amount of power transferred is 1 kW or more (e.g., 2 kW or more, 3.3 kW or more, 4.5 kW or more, 5.5 kW or more, 6.4 kW or more), impedance matching to achieve a particular target impedance is not the only criterion that affects efficient transfer of large amounts of power between the source and receiver resonators. The impedance mode can also significantly affect power transfer between the source and receiver resonators.

In general, as the coupling between source and receiver resonators increases, the real component of the complex impedance of the source resonator increases, while the imaginary component of the complex impedance decreases. When the imaginary component is greater than zero, the source resonator operates in an "inductive" or "reactive" mode; conversely, when the imaginary component is less than zero, the source resonator operates in a "capacitive" mode.

For high power wireless power transfer applications, operating the source resonator (e.g., an amplifier) in a capacitive mode can lead to certain problems. In particular, prolonged operation of the source resonator in a capacitive mode can lead to excessive switching losses and/or possible component failures, in particular, failure of inverter power switches. Potential catastrophic damage to the source resonator can result from such component failures.

Conversely, operating the source resonator in a mode that is too inductive or reactive can also lead to inefficient power transfer. Reactive mode operation can occur when the relative positions of source and receiver coils lead to large circulating currents in the source (e.g., amplifier) output circuitry. These large currents can lead to excessive power dissipation in the amplifier, significantly reducing the amount of power that is transferred to the receiver resonator.

To ensure that the source resonator does not operate in a capacitive mode, the systems disclosed herein detect possible capacitive mode operation during start-up of the source resonator (e.g., during start-up of the power amplifier). In general, a variety of different methods can be used to detect capacitive mode operation. In some embodiments, to detect capacitive mode operation, the systems include a mode detector that measures a time difference between the output voltage and current waveforms of the power amplifier. If the voltage and current waveforms are too close together (e.g., if their phase offset is not large enough), the source resonator is determined to be operating in capacitive mode.

FIG. 6 is a schematic diagram showing output voltage and current waveforms from a power amplifier. In the systems and methods disclosed herein, a mode detector is used to measure the time difference 1010 (or, equivalently, the phase difference) between the current and voltage waveforms. Capacitive mode operation can then be detected based on the measured time difference. In particular, in FIG. 6, if the time difference 1010 between the current and voltage waveforms is too small, the power amplifier is determined to be operating in capacitive mode.

Figure 7:
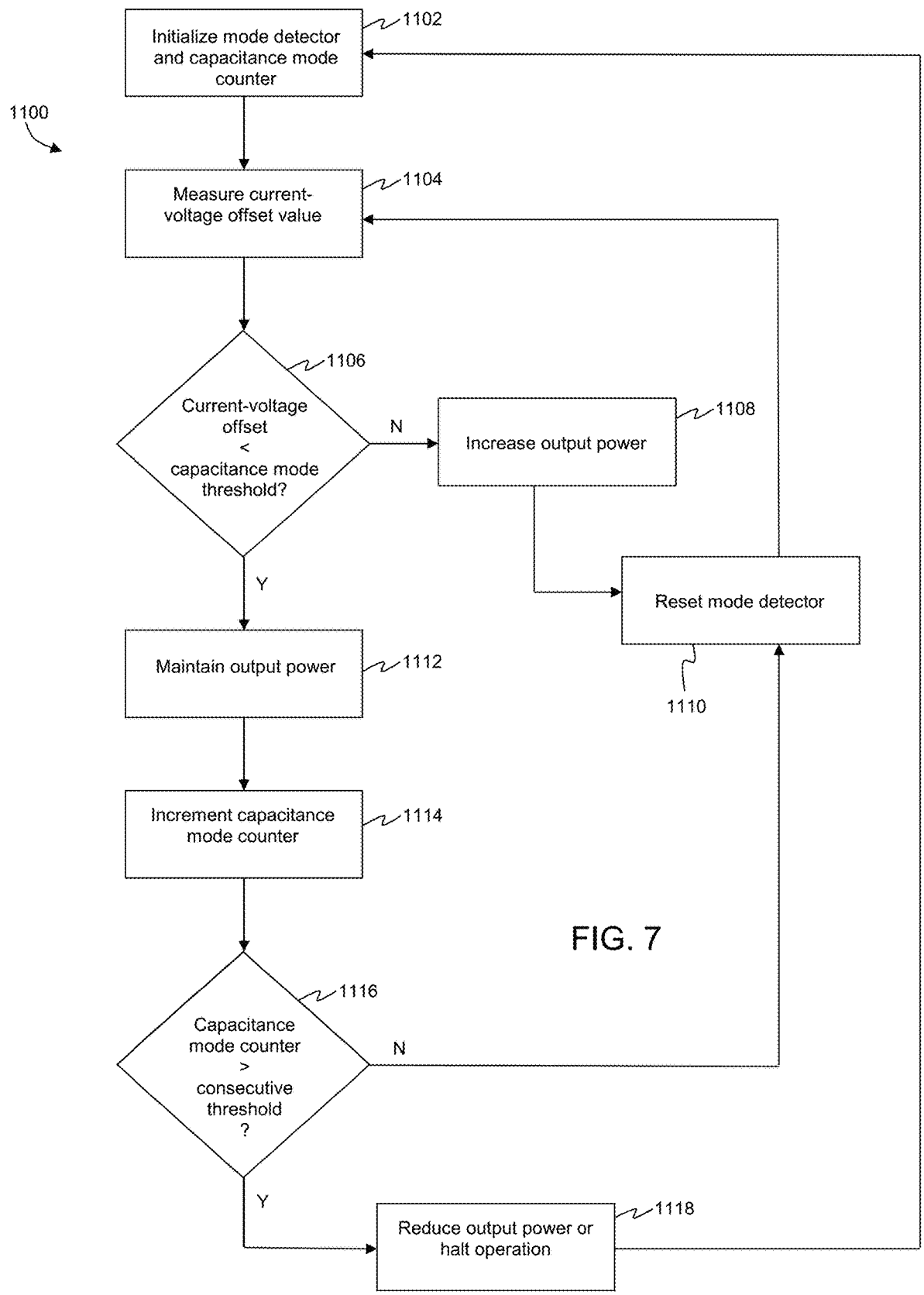
FIG. 7 is a flow chart showing a series of steps for detecting capacitive mode operation in a source resonator.

FIG. 7 is a flow chart 1100 showing a series of steps for detecting capacitive mode operation in a source resonator such as a power amplifier. In step 1102, a mode detector in the system is initialized to prepare for measurement of the voltage-current time difference. In some embodiments, for example, initialization can be performed by setting (or re-setting) the value of a counter to zero. The counter is then used to determine the voltage-current time difference, e.g., the offset between the voltage and current waveforms can be measured in terms of counter increments, each of which represents a time interval.

Also in step 1102, the value of a capacitive mode counter is set to zero. The capacitive mode counter counts the number of times that capacitive mode operation of the source resonator is detected.

Next, in step 1104, the mode detector is used to determine the offset between the voltage and current output waveforms in the source resonator (e.g., power amplifier). The offset can be measured in a variety of ways; examples of methods and components for measuring the offset will be discussed in a later section. It should be noted, however, that the offset can be measured in various forms. In some embodiments, as discussed above, the offset can be measured in increments of a counter, where each counter increment corresponds to a particular time period (e.g., an internal clock cycle of the source resonator). In certain embodiments, the offset can be measured in units of time, either by direct measurement of the offset, or by multiplying the offset in counter increments by the period of time corresponding to a single counter increment. In some embodiments, the offset can be measured in angular units, e.g., as a phase angle difference between the current and voltage waveforms.

In step 1106, the measured offset is compared to a threshold offset value that indicates capacitive operation. The threshold value is expressed in the same units (e.g., counter increments, units of time, phase angle difference) as the measured offset. If the offset value is greater than the threshold offset value, then it is determined that because the current and voltage waveforms are far enough offset from one another, the source resonator is not operating in a capacitive mode. Control passes to optional step 1108, where the output power of the source resonator (e.g., the power that is transferred wirelessly to the receiver resonator) can be increased. Next, the mode detector is reset at step 1110 (e.g., the offset value is reset to zero), and control returns to step 1104 for another measurement of the current-voltage offset.

If the offset value is smaller than the threshold offset value in step 1106, then it is determined that because the current and voltage waveforms are offset from one another by only a relatively small amount, the source resonator is operating in a capacitive mode. Control passes to step 1112, where the output of the source resonator is maintained. Then, in step 1114, the value of the capacitive mode counter is incremented. As explained above, the capacitive mode counter counts the number of times that capacitive mode operation of the source resonator has been detected.

Next, in step 1116, the value of the capacitive mode counter is compared to a consecutive capacitive mode threshold value. The consecutive capacitive mode threshold value represents a limit on the number of times that capacitive mode operation of the source resonator can be detected before operation of the source resonator is modified. If the capacitive mode counter value exceeds the consecutive capacitive mode threshold value (e.g., the number of consecutive times that capacitive operation of the source resonator has been detected exceeds the threshold value represented by the consecutive capacitive mode threshold), then the output power of the source resonator is reduced in step 1118, or operation of the source resonator is halted. If the output power is merely reduced without halting operation of the source resonator, control can optionally return to step 1102.

Alternatively, if the capacitive mode counter value is less than the consecutive capacitive mode threshold value in step 1116, then control passes to step 1110 where the mode detector is reset, and then to step 1104 for another measurement of the voltage-current offset.

In step 1116 of flow chart 1110, the source resonator is evaluated for capacitive mode operation by comparing the voltage-current offset to the capacitive mode threshold value. In some embodiments, the capacitive mode threshold value remains fixed for different operating conditions of the source and receiver resonators. More generally, however, the capacitive mode threshold value can be varied depending upon one or operating parameters or conditions of the wireless power transfer system. For example, in certain embodiments, the capacitive mode threshold value can vary based on the load voltage (e.g., the voltage maintained by the source resonator across a device connected to the receiver resonator. Table 1 provides a list of example capacitive mode threshold values as a function of the load voltage.

TABLE 1

| Load Voltage (V) | Capacitive Mode Threshold Value (ns) |
|---|---|
| <300 | 342.8 |
| 300-340 | 314.3 |
| 340-370 | 285.7 |
| 370-400 | 257.1 |
| >400 | 257.1 |

The wireless power transfer systems disclosed herein can detect reactive mode operation of a source resonator (e.g., power amplifier). Detection of reactive mode operation can occur in systems that also detect capacitive mode operation, or alternatively, in systems where detection of capacitive mode operation does not occur. As discussed above, when the source resonator of a wireless power transfer system operates in a mode that is too reactive (e.g., too inductive), excessive power dissipation can occur in the source resonator, which significantly reduces the efficiency of wireless power transfer from the source resonator to the receiver resonator.

Figure 8:
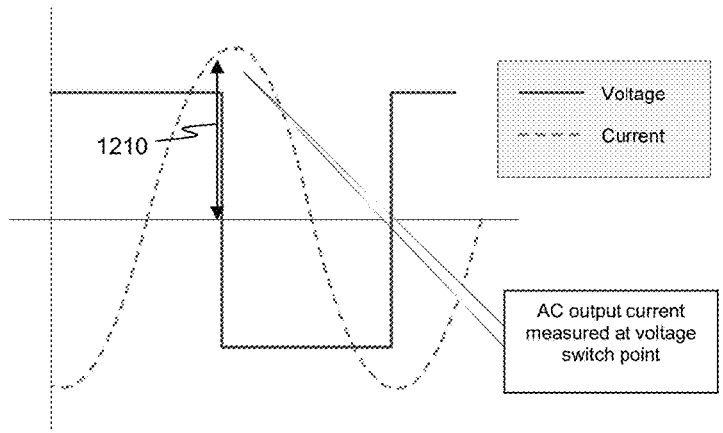
FIG. 8 is a plot showing current and voltage waveforms and measurement of the output current at the voltage switching time.

FIG. 8 is a schematic diagram showing output voltage and current waveforms from a power amplifier. The same mode detector that measures the time difference (or phase difference) between the current and voltage waveforms for purposes of detecting capacitive mode operation can also be used to measure the source resonator (e.g., amplifier) output current at the voltage switching time, 1210. The current-voltage offset, the output current at the voltage switching time 1210, and the source resonator (e.g., amplifier) bus voltage can then be used to detect reactive mode operation of the source resonator.

Figure 9:
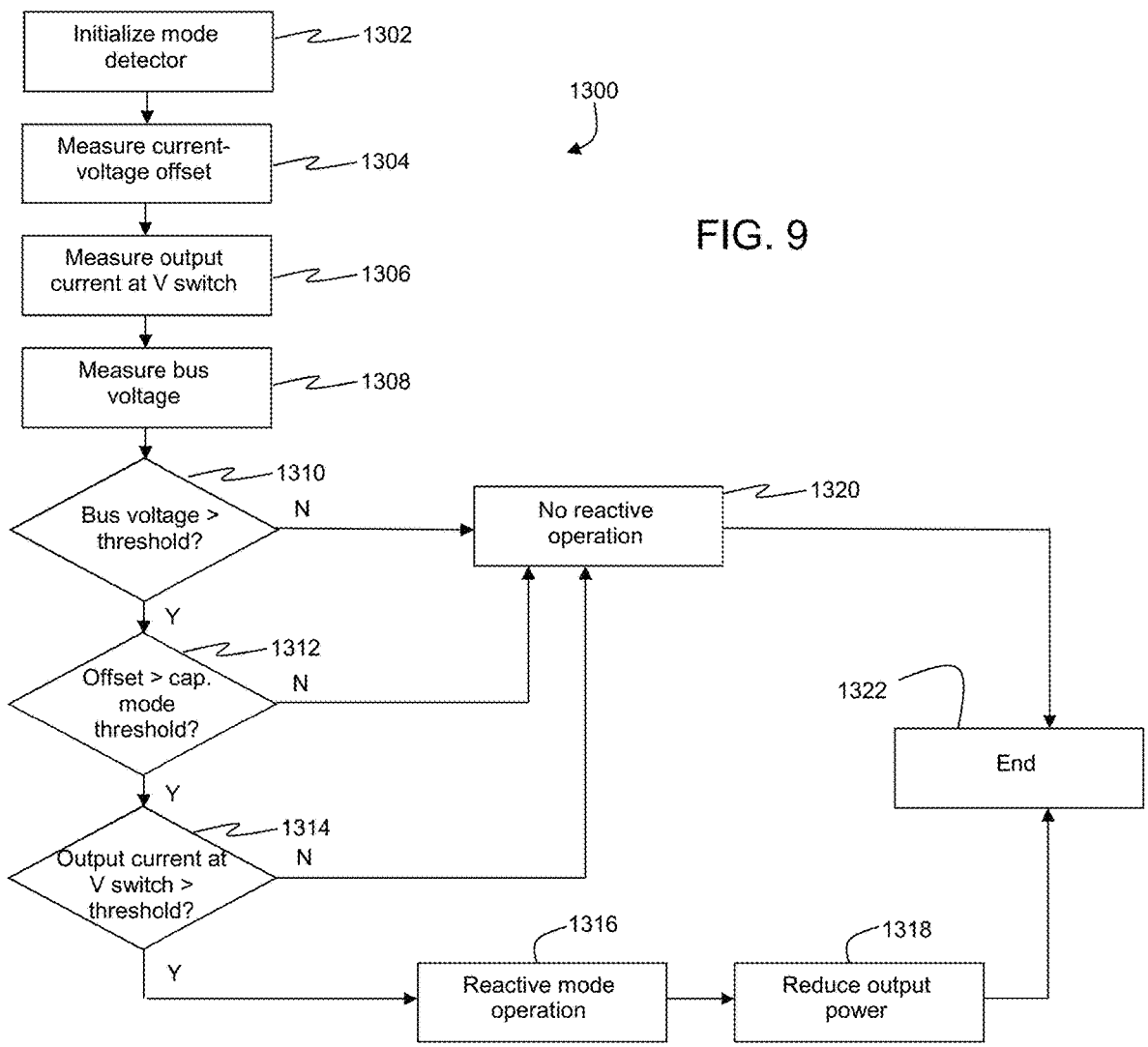
FIG. 9 is a flow chart showing a series of steps for detecting reactive mode operation in a source resonator.

FIG. 9 is a flow chart 1300 showing a series of steps for detecting reactive mode operation in a source resonator such as a power amplifier. In step 1302, the mode detector is initialized as described above in connection with FIG. 7. Next, in step 1304, the mode detector is used to measure the offset (e.g., phase difference) between the output current and voltage waveforms of the source resonator (e.g., power amplifier). In general, the offset is measured in step 1304 in the same manner as in step 1104 of FIG. 7.

In step 1306, the output current at the voltage switching time is measured by the mode detector, or by another sensor in the system. Referring to FIG. 8, the voltage switching time is the time at which the sign of the voltage switches. The mode detector or other sensors measures the output current at the time when the voltage polarity changes.

Returning to FIG. 9, in step 1308, bus voltage of the source resonator (e.g., power amplifier) is measured by the mode detector or by another sensor or element in the system.

To determine whether the source resonator is operating in a reactive mode (e.g., a mode where the inductance is so high that significant power dissipation occurs), the measured bus voltage is compared to a threshold bus voltage value in step 1310. If the measured bus voltage is less than the bus voltage threshold value, then it is determined that the source resonator is not operating in a reactive mode in step 1320, and the procedure terminates at step 1322. Alternatively, if the measured bus voltage is greater than the bus voltage threshold value, then it is possible that the source resonator is operating in a reactive mode, and control passes to step 1312.

In step 1312, the measured current-voltage offset is compared to a capacitance mode detection threshold value. If the current-voltage offset is less than the capacitance mode detection threshold value, then it is determined that the source resonator is not operating in a reactive mode in step 1320, and the procedure terminates at step 1322. However, if the current-voltage offset is greater than the capacitance mode detection threshold value, then it is possible that the source resonator is operating in a reactive mode, and control passes to step 1314.

In step 1314, the measured output current at the voltage switching time is compared to a threshold value for the output current at the voltage switching time. If the measured output current is smaller than the threshold current value, then it is determined that the source resonator is not operating in a reactive mode in step 1320, and the procedure terminates at step 1322. However, if the measured output current at the voltage switching time is larger than the threshold value in step 1314 (which also implies that the measured bus voltage is larger than the threshold bus voltage in step 1310, and the measured current-voltage offset is larger than the capacitance mode detection threshold value in step 1312), then the source resonator (e.g., power amplifier) is determined to be operating in a reactive mode in step 1316.

In optional step 1318, the output power of the source resonator can be reduced so that the source resonator operates in a mode that is less reactive. The procedure then terminates at step 1322.

Values for the threshold bus voltage, capacitance mode detection threshold, and threshold output current at the voltage switching time can be obtained in various ways. In some embodiments, for example, threshold values can be hard-coded into the system's logic processor(s). In certain embodiments, some or all of the threshold values can be stored in a storage unit and retrieved when the system is powered on. In some embodiments, some or all of the threshold values can be supplied by an operator of the system.

In general, each of the thresholds can have a variety of values based on factors such as the tolerances and operating limits of the components of the system, the operating environment of the system, and the wireless power transfer application. Further, as discussed above, each of the thresholds can have multiple values according to certain operating parameters such as the load voltage, output power, etc. As an example, in some embodiments, the source resonator is determined to be operating in a reactive mode if the bus voltage exceeds a threshold value of 400 V, if the current-voltage offset exceeds a capacitance mode detection threshold value of 857.1 ns, and the output current at the voltage switching time exceeds a threshold value of 20 A.

Capacitive mode detection and/or reactive mode detection can be incorporated into control algorithms for a variety of wireless power transfer systems, including the systems disclosed herein. In general, detection of capacitive and/or reactive mode operation occurs during or after impedance tuning to simultaneously ensure that the impedance between the source and receiver resonators is matched as closely as possible, while at the same time ensuring that operation in a mode that is either too capacitive or too reactive is avoided. By performing impedance tuning in conjunction with capacitive and/or reactive mode detection, power can be wirelessly transferred between the source and receiver resonators at high efficiency, and at the same time, failure of components of the source resonator (e.g., inverter switches) can be avoided.

Figure 10:
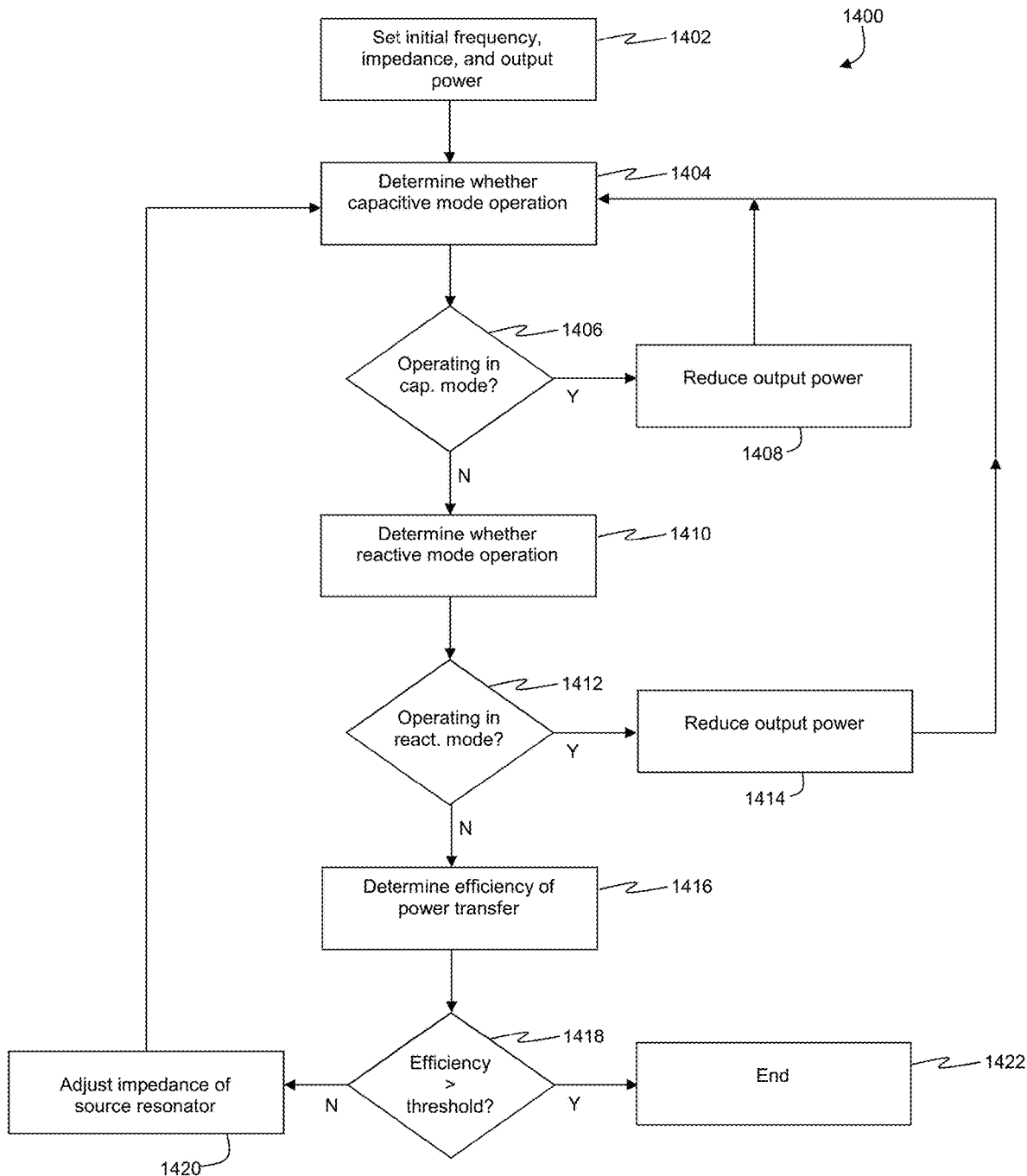
FIG. 10 is a flow chart showing a series of steps for performing impedance tuning of a source resonator in a wireless power transfer system.

FIG. 10 is a flow chart 1400 showing a series of steps for performing impedance tuning of a source resonator in a wireless power transfer system. In the first step 1402, the initial frequency, impedance, and output power of the source resonator are set. Initial values for each of these operating parameters can be set according to stored information (e.g., stored values of the parameters) and/or according to user input, for example.

Next, in optional step 1404, the system determines whether the source resonator is operating in a capacitive mode. Some or all of the steps disclosed in connection with FIG. 7 can be used to make this determination, including measuring the current-voltage offset value and comparing the measured offset value to a capacitance mode detection threshold value.

In step 1406, if the system determines that the source resonator is operating in a capacitive mode, then control passes to step 1408, where the system reduces the output power of the source resonator to ensure that failure of resonator components such as inverter switches does not occur. Control then returns to step 1404, where the system determines whether the source resonator is still operating in a capacitive mode at lower output power.

If the system determines that the source resonator is not operating in a capacitive mode, then control passes to optional step 1410, where the system determines whether the source resonator is operating in a reactive mode. Some or all of the steps disclosed in connection with FIG. 9 can be used to make this determination, including measuring the current-voltage offset value, measuring the output current at the voltage switching point, and measuring the bus voltage, and using the measured values of these operating parameters to determine whether the source resonator is operating in a reactive mode.

In step 1412, if the system determines that the source resonator is operating in a reactive mode, then control passes to step 141, where the system reduces the output power of the source resonator so that the resonator represents a smaller inductive load. Control then returns to step 1404, where the system determines whether the source resonator operates in a capacitive mode (and a reactive mode) at lower output power.

If the system determines that the source resonator is not operating in a reactive mode (nor in a capacitive mode), then in step 1416, the system determines the efficiency of power transfer between the source resonator and the receiver resonator. The efficiency can be determined in various ways. In some embodiments, for example, the receiver resonator transmits a signal to an electronic processor or the system that includes information about the amount of power received by the receiver resonator. The electronic processor can use this information, along with information about the output power of the source resonator, to determine an efficiency of power transfer.

In step 1418, the efficiency of power transfer is compared to a transfer efficiency threshold value. If the efficiency of power transfer is greater than the threshold value, then power transfer is occurring at a suitable efficiency, and the procedure terminates at step 1422. If the efficiency of power transfer is smaller than the threshold value, then the impedance of the source resonator is adjusted in step 1420 (e.g., to better match a target impedance value that leads to greater power transfer efficiency) to improve the power transfer efficiency. Control then returns to step 1404, and the system determines whether the source resonator is operating in a capacitive or reactive mode at the adjusted impedance value.

In some embodiments, the target impedance value discussed herein is known beforehand from design specifications and/or calibration of the wireless power transfer system for a variety of operating conditions and geometries. In certain embodiments, the target impedance value is not known, and is instead achieved by iteratively adjusting the system based on feedback criteria such as power transfer efficiency. In either circumstance, the impedance of the system is adjusted to match the target impedance for efficient transfer of power from the source (e.g., a power amplifier) to a receiver (e.g., a receiver resonator).

Mode Detectors

In the foregoing discussion, a mode detector is used to measure operating parameters such as the current-voltage offset value to allow the system to determine whether the source resonator is operating in a capacitive mode or a reactive mode. In general, a variety of different mode detectors can be used for this purpose, and in principle, any mode detector that provides an accurate, rapid measurement of the current-voltage offset can be used.

Figure 11:
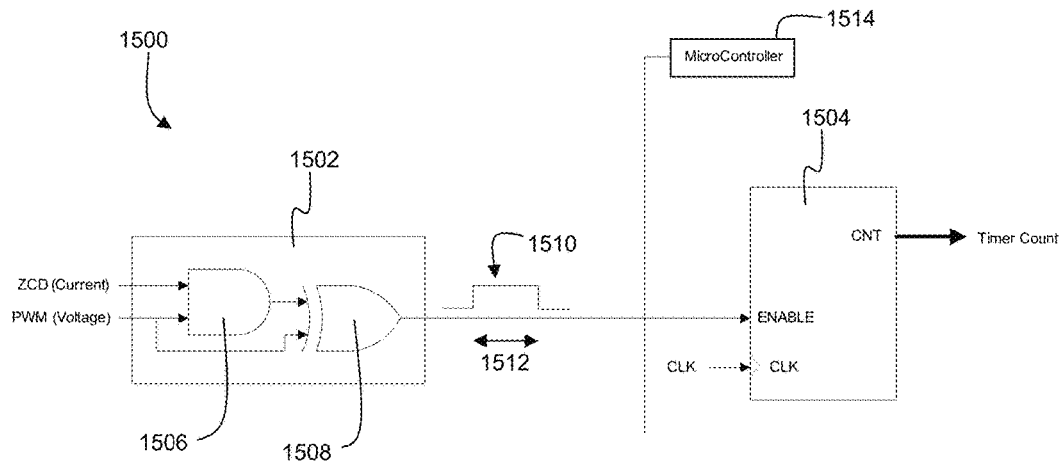
FIG. 11 is a schematic diagram of a mode detector.

FIG. 11 shows a schematic diagram of one example of a mode detector 1500. Mode detector 1500 includes a signal processing unit 1502 and an offset measurement unit 1504. Signal processing unit 1502 includes a first input terminal that receives a current waveform from a detector or circuit such as a zero crossing detector (ZCD), and a second input terminal that receives a voltage waveform from a detector or circuit such as a pulse-width modulation (PWM) detector. The current and voltage waveforms are provided to an AND logic gate 1506, which produces an output signal that is provided to one input terminal of an XOR logic gate 1508. The voltage waveform is provided to the other input terminal of XOR gate 1508. The output waveform 1510 from XOR gate 1508 is a positive-only square waveform with a temporal width 1512 that corresponds to a temporal offset between the current and voltage waveforms that are provided to the input terminals of AND gate 1506.

Waveform 1510 is provided to one input terminal of offset measurement unit 1504. A clock signal is provided to another input terminal of offset measurement unit 1504. The clock signal consists of a series of pulses spaced at a regular temporal interval, and can be provided by a signal generator, by a microcontroller such as microcontroller 1514, by other logic units or circuits within the system, or by a system controller.

Offset measurement unit 1504 implements an internal counter CNT that increments as each additional clock signal pulse is received at the second input terminal of offset measurement unit 1504. Waveform 1510 functions as the on-off gate signal during which counter CNT is incremented. To measure the temporal offset between the current and voltage waveforms, which corresponds to the temporal width 1512 of waveform 1510, the value of CNT is initially reset to zero by offset measurement unit 1504. The value of CNT remains at zero until the leading edge of waveform 1510 is detected at the first input terminal of offset measurement unit 1504, at which time measurement of the width of waveform 1510 is initiated. During measurement of the width of waveform 1510, each time a clock signal pulse is detected at the second input terminal of offset measurement unit 1504, the value of CNT is incremented. Accumulation in CNT continues until the trailing edge of waveform 1510 is detected at the first input terminal, at which time measurement of the width of waveform 1510 terminates. The value of CNT, which corresponds to the temporal offset between the current and voltage waveforms in units of clock cycles, is provided at the output terminal of offset measurement unit 1504. The temporal offset in units of time can be obtained by performing a subsequent multiplication operation (e.g., within offset measurement unit 1504 or in another logic unit such as an electronic processor) in which CNT is multiplied by the constant temporal interval between clock cycles.

Figure 12:
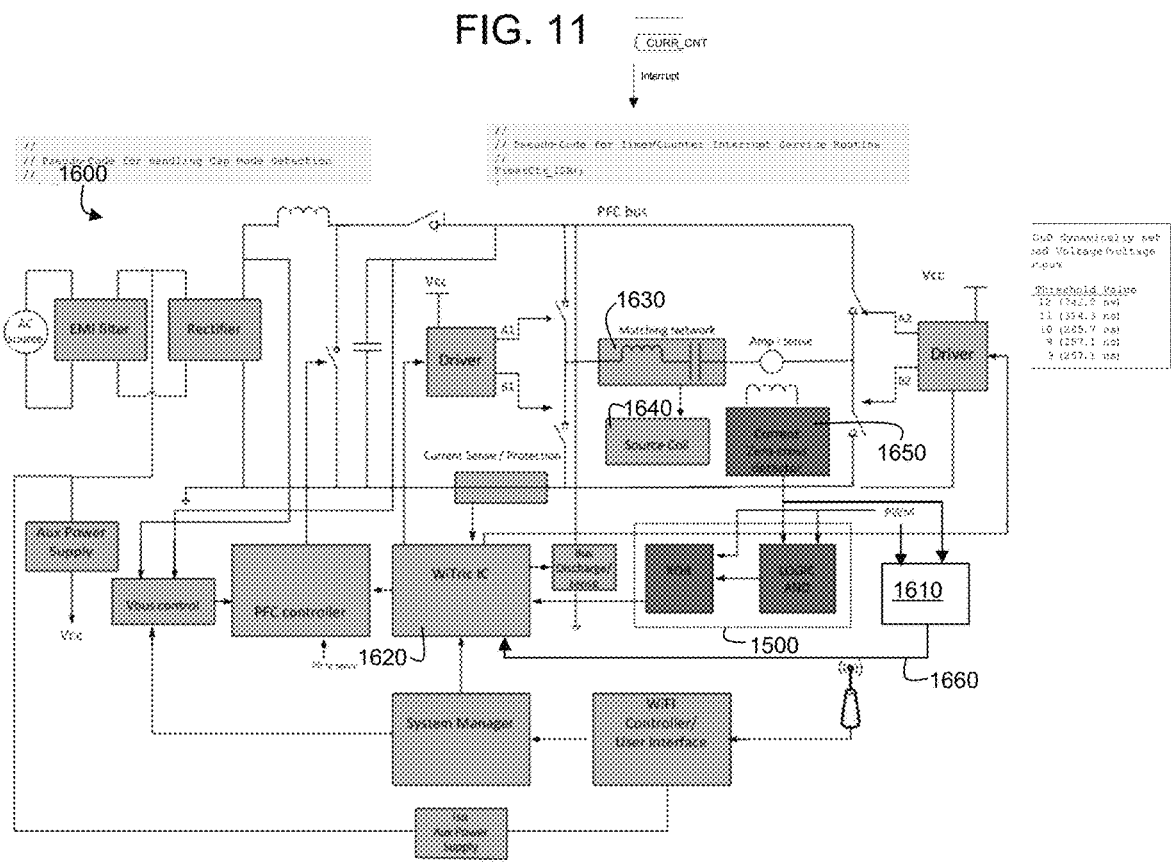
FIG. 12 is a schematic diagram of a power amplifier that includes a mode detector.

In general, mode detector 1500 is positioned within the source resonator (e.g., power amplifier). A variety of different arrangements of the mode detector within the source resonator can be used. FIG. 12 is a schematic diagram of an example of a power amplifier 1600 that includes mode detector 1500. In FIG. 12, an integrated controller 1620 controls a variety of different functions of amplifier 1600. In particular, controller 1620 adjusts the impedance of source coil 1640 using impedance matching network 1630. Zero crossing detector 1650 measures the current waveform corresponding to the output current, and a pulse wave modulation detector (indicated schematically as "PWM") measures the voltage waveform. The current and voltage waveforms are provided to input terminals of mode detector 1500. The AND and XOR logic gates, 1506 and 1508 respectively, are shown in FIG. 12.

In FIG. 11, output waveform 1510 from XOR gate 1508 is provided to offset measurement unit 1504, which is part of mode detector 1500. In some embodiments, however, mode detector 1500 does not include an offset measurement unit. FIG. 12 shows such an embodiment. In FIG. 12, output waveform 1510 is provided directly to integrated controller 1620. Integrated controller 1620 also receives a clock signal (not shown in FIG. 12) and uses output waveform 1510 as a gate signal to measure the temporal offset between the current and voltage waveforms measured by zero crossing detector 1650 and the PWM detector, respectively, in a manner similar to the procedure described above for offset measurement unit 1504.

As shown in FIG. 12, amplifier 1600 can also include a current sensor 1610. Sensor 1610 receives, on two input terminals, the current waveform measured by zero crossing detector 1650, and the voltage waveform measured by the PWM detector. Current sensor 1610 produces an output signal 1660 that corresponds to the output current at the voltage switching point. This signal is provided to integrated controller 1620.

FIG. 12 shows one example of the measurement of current and voltage signals to provide input waveforms to mode detector 1500. Current and/or voltage signals can also be measured at other points in a source resonator to provide input waveforms to a mode detector. For example, in both the single-ended and differential amplifier topologies (shown in FIGS. 3 and 4, respectively), the input current to the impedance matching networks 342 driving the resonator coils 344 can be obtained by measuring the voltage across a capacitor 324, or via a current sensor of some type. For the exemplary single-ended amplifier topology in FIG. 3, the current may be sensed on the ground return path from the impedance matching network 342. For the exemplary differential power amplifier depicted in FIG. 4, the input current to the impedance matching networks 342 driving the resonator coils 344 may be measured using a differential amplifier across the terminals of capacitor 324 or via a current sensor of some type. In the differential topology of FIG. 4, capacitor 324 can be duplicated at the negative output terminal of the source power amplifier.

In both topologies, after single-ended signals representing the input voltage and current to the source resonator and impedance matching network are obtained, the signals can be filtered to obtain desired portions of the signal waveforms. For example, the signals can be filtered to obtain the fundamental component of the signals. The types of filtering that can be performed include, for example, low pass, bandpass, and notch. Filter topologies can include elliptical, Chebyshev, and Butterworth, for example.

Tunable Circuit Elements

A variety of different tunable circuit elements can be used in impedance matching networks to adjust the impedance of a source and/or receiver resonator. FIG. 13 is a schematic diagram showing a portion of a wireless power transfer system 3000. System 3000 includes a power transmitting apparatus and a power receiving apparatus. In FIG. 13, portions of the power transmitting apparatus and the power receiving apparatus are schematically drawn as a source-side circuit 3002 and a receiver side circuit 3032, respectively.

The source-side circuit 3002 can include an inductor 3004 and capacitors 3005-3008. The inductance of inductor 3004 can correspond to the inductance of a source resonator of the power transmitting apparatus in system 3000. In some embodiments, any of the capacitors 3005-3008 can be variable capacitors which are used for tuning an impedance of the source-side circuit 3002.

In certain embodiments, the source-side circuit 3002 can also include tunable inductors 3010 and 3014. Tunable inductor 3010 is connected to the source-side circuit 3002 by terminals 3011 and 3012 of the tunable inductor. Tunable inductor 3014 is connected to the source-side circuit 3002 by terminals 3015 and 3016 of the tunable inductor. In the example shown in FIG. 13, the tunable inductors 3010 and 3014 are connected to the source-side circuit 3002 in a series connection. In other embodiments, tunable inductors 3010 and 3014 can be connected to the source-side circuit 3002 in a parallel connection.

The receiver-side circuit 3032 can include inductor 3034 and capacitors 3035-3036. The inductance of inductor 3034 can correspond to inductance of a receiver resonator of the power receiving apparatus in system 3000. In some embodiments, any of the capacitors 3035-3036 can be variable capacitors used for tuning an impedance of the receiver-side circuit 3032. In certain embodiments, the receiver-side circuit 3032 can include a tunable inductor 3040, which is used to tune the impedance of the receiver side circuit 3032.

Terminals 3020 and 3021 of the source-side circuit 3002 can be connected to a power circuit (not shown) so that the source-side circuit 3002 can receive AC voltages and currents from the power circuit. In some embodiments, the power circuit can include a power amplifier. The received AC voltages and currents can generate alternating electromagnetic fields via inductor 3004, where the alternating fields are used to transfer power to the receiver-side circuit 3032 through the inductor 3034.

Generally, the source-side circuit 3002 and the receiver-side circuit 3032 can include resistors and other circuit elements, which are not shown in FIG. 13 for clarity. Furthermore, although one arrangement of capacitors and inductors in source-side circuit 3002 and receiver-side circuit 3032 is shown in FIG. 13, more generally, both source-side circuit 3002 and receiver-side circuit 3032 can include other arrangements of capacitors and inductors.

While both tunable capacitors and tunable inductors can be used to adjust the impedance of source and receiver resonators in the systems and methods disclosed herein, tunable inductors can provide certain advantages in high power applications. For example, when large amounts of power are transferred wirelessly, tuning impedance using capacitors can involve switching among banks of capacitors to provide suitable tuning ranges. However, switching among banks of capacitors frequently leads to power losses that are not insignificant. For low power applications, such power losses can be tolerable. For high power applications, such power losses can be more important, as they have a greater effect on the amount of time required for delivery of power. As an example, switching among banks of capacitors may cause power losses that are unacceptable when delivering power for charging vehicle batteries.

Switching among capacitor banks at high power levels can also lead to inefficient coupling. In particular, it can be difficult to maintain high Q operation of source and receiver resonators and, at the same time, operate under high voltage and current levels, when switching among capacitor banks to provide impedance tuning. Switches used for selecting different capacitor banks can also be prone to failure at high power transfer rates.

Tunable inductors provide an alternative to tunable capacitors for purposes of impedance matching in wireless power transfer systems. Moreover, certain types of tunable inductors, due to their structures, are particularly well suited for operation at high power transfer rates. These inductors are therefore well suited for high power applications such as vehicle charging, where tunable capacitors and other types of tunable inductors have certain shortcomings. In the following section, a variety of different tunable inductors are disclosed, each of which is suitable for inclusion in impedance matching circuits and networks, and each of which is particularly well suited to high power applications involving wireless power transfer.

FIGS. 14A and 14B are schematic diagrams showing an example of a tunable inductor 3100, which can be used as tunable inductors 3010 and 3014 described in relation to FIG. 13. For example, each of the tunable inductors 3010 and 3014 can correspond to tunable inductor 3100.

In the example described in FIGS. 14A and 14B, the inductance of the tunable inductor 3100 can be electrically tuned over a wide range. FIG. 14A schematically depicts the structure of magnetic materials of the tunable inductor 3100. Other elements (e.g., conducting wire) of the tunable inductor 3100 are not shown. In this example, the tunable inductor 3100 includes two magnetic materials 3102 and 3104. Each of the magnetic materials 3102 and 3104 has an "E-shaped" structure. The magnetic material 3102 includes portions 3110, 3112 and 3114, which protrude as "legs" from base 3103 of the magnetic material 3102 so that the magnetic material 3102 has an E-shape. Similarly, the magnetic material 3104 includes portions 3120, 3122 and 3124, which protrude as legs from base 3105 of the magnetic material 3104.

The portions 3110 and 3120 face each other to form gap 3130. Similarly, portions 3112 and 3122 face each other to form gap 3132, and portions 3114 and 3124 face each other to form gap 3134. In some embodiments, any of the gaps 3112, 3132 and 3134 can include air to form an "air gap." In certain embodiments, any of the gaps 3112, 3132 and 3134 can include one or more dielectric materials such as paper. The gaps act as an impedance to magnetic field flux generated within the magnetic materials 3102 and 3104. Such impedance can affect the inductance value of the tunable inductor 3100. Thus, the type of material provided within gaps 3112, 3132 and 3134 can be selected based on the desired impedance value. For example, the material can be selected to provide an inductance value corresponding to a value in the middle of the range of the tunable inductance range for inductor 3100.

In some embodiments, tunable inductor 3100 can include a support to hold magnetic materials 3102 and 3104 relative to each other with gaps 3130, 3132 and 3134. For example, a support structure (not shown) can be used to hold the legs protruding from base 3103 and 3105 while maintaining the gaps 3130, 3132 and 3134.

FIG. 14B is a schematic diagram of another view of tunable inductor 3100 shown in FIG. 14A. The tunable inductor 3100 includes a coil 3150, which is wound around portions 3112, 3122 and gap 3132. When tunable inductor 3100 is introduced into the source-side circuit 3002 of FIG. 13, terminals 3151 and 3152 of coil 3150 can be connected to terminals 3011 and 3012, respectively, or to terminals 3015 and 3016, respectively. Accordingly, the inductance of coil 3150 in the tunable inductor 3100 can correspond to the inductance value of the tunable inductor 3010 or that of the tunable inductor 3014.

Referring to FIG. 14B, a control circuit 3140 is connected to coil 3142, which may be referred as an "excitation coil" in this disclosure. The coil 3142 is wound around portions 3110, 3120 and gap 3130. In this example, the coil 3142 is further wound around portions 3114, 3124 and gap 3134, and then connected to the control circuit 3140. The control circuit 3140 can be configured to provide a DC bias on the magnetic materials 3102 and 3014 by sending a DC current through coil 3142. For example, the control circuit 3140 can send DC current 3102 in the direction shown in FIG. 14B, at a given time. The DC current 3102 flowing through coil 3142 generates magnetic fields in directions 3175, which change an effective permeability of the magnetic materials 3102 and 3104 at the operating frequency of power transfer. Because the inductance of the coil 3150, which is wound around portions 3112, 3122 and gap 3132, depends on the effective permeability of the magnetic materials 3102 and 3104, a change in the effective permeability leads to a change of the inductance of the coil 3150 in the tunable inductor 3100. The magnitude of changes of the effective permeability and the inductance depends on the magnitude of the DC current 3102. Thus, current 3102 can be used to magnetize the magnetic materials 3102 and 3104 and thereby to adjust inductance of tunable inductor 3100. The magnitude of current 3102 can be determined from change in inductance desired to achieve a particular rate of power transfer, given factors such as the relative positions of the source and receiver resonators, as discussed previously.

Moreover, because the coil 3142 is also wound around portions 3114, 3124 and gap 3134, the change of effective permeability and the inductance can be twice compared to the case where the coil 3142 is wound only around portions 3112, 3122 and gap 3132. In some embodiments, the voltage applied to coil 3142 can be clamped or regulated to control the change of inductance. In certain embodiments, coil 3142 can include multiple taps to provide higher resolution of tuning and lesser current levels.

In general, the size of gaps 3130, 3132, and 3134 are selected based on the current levels within the windings and the saturation of materials 3102 and 3104. In some embodiments, for example, the gaps are between 1 mm and 10 mm.

The tunable inductors 3010 and 3104 can be connected in series or parallel to the source-side circuit. The control circuit 3140 can be configured to electrically tune the inductances of the tunable inductors 3010 and 3014 at the same time. Phases of voltages applied to the tunable inductors 3010 and 3014 for tuning can be arranged such that voltage across coil 3142 cancels to minimize the voltage ratings of the control circuit 3140.

In some embodiments, the control circuit 3140 can be connected to the coil 3142 by way of a shorting switch. When tuning is not needed, the switch can be opened so that control circuit 3140 does not pass current through coil 3142. When tuning is needed, the switch can be closed and the control circuit 3130 can provide current through coil 3142.

Figure 14C:
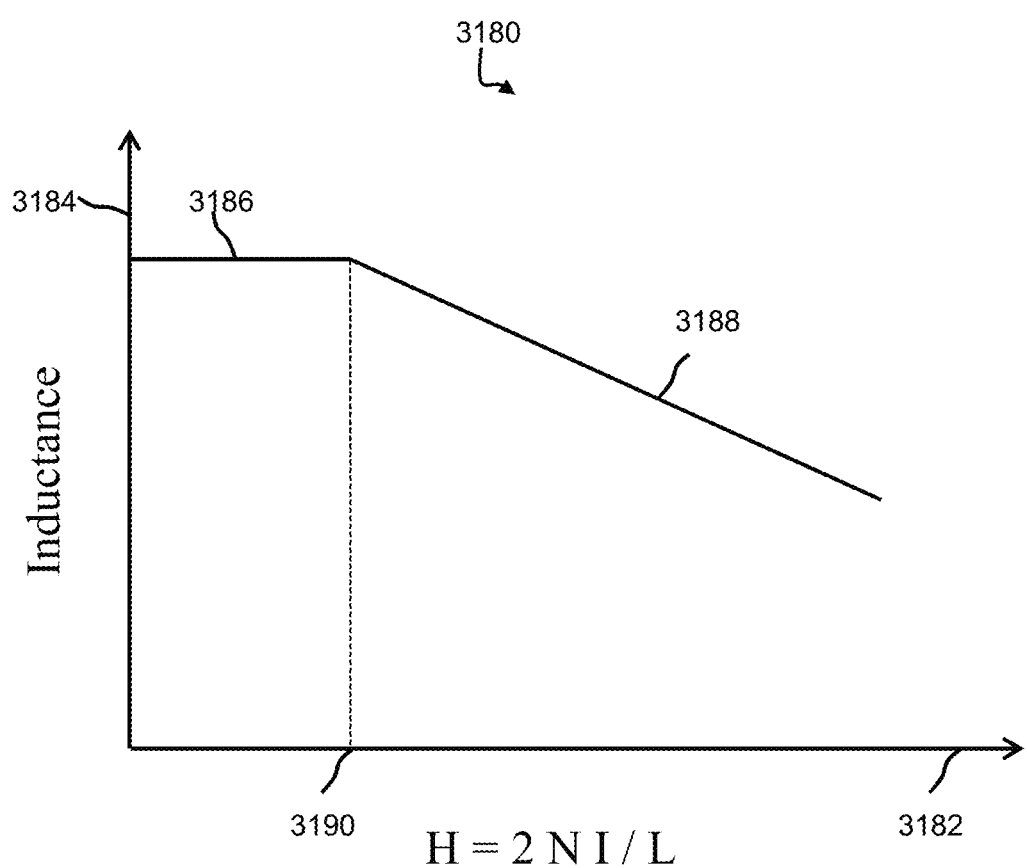
FIG. 14C is a schematic plot showing the inductance of the coil of FIG. 14B.

FIG. 14C is a schematic plot 3180 showing the inductance of the coil 3150 as a function of H (amperes-turn/cm) of the example shown in FIG. 14B. In this example, H can be expressed as $H=(2NI)/L$, where N is the number of turns wound around portions 3110, 3120 and gap 3130, and L is the length of the magnetic flux path. I is the magnitude of current 3102 and L is the length 3170 of the winding of coil 3142. The factor of 2 arises due to the fact that the number of turns N of coil 3142 is the same for portions 3110, 3120, gap 3130 and portions 3114, 3124, gap 3134. In some embodiments, the number of turns N can be 9 or more (e.g., 15 or more, 25 or more, 35 or more, 45 or more). The ratio of number of turns N to the winding turns of coil 3150 can be 1:1. In certain embodiments, a larger number of turns N can lead to a larger coupling between coil 3142 and 3150 which can provide a larger inductance change compared to embodiments with fewer turns.

Axis 3182 of plot 3180 is H (amperes-turn/cm). Axis 3184 of plot 3180 is the inductance of coil 3150. Below threshold 3190 of H, the inductance can be substantially flat as shown in line 3186 compared to line 3188 above the threshold 3190. A linear dependence of line 3188 indicates that the inductance of coil 3150 and power can be adjusted linearly.

More generally, for certain tunable inductors, lines 3186 and 3188 may not be perfectly straight, but can instead be curved.

As illustrated in the FIG. 14C, the inductance of coil 3150 can be tuned by adjusting a magnitude of current 3102 (I) using the control circuit 3140. In particular, the inductance can be effectively tuned above threshold 3190. In this approach, the inductance of the tunable inductor 3100 can be electrically tuned by adjusting the amount of current provided by the control circuit 3140.

Referring back to FIG. 13, system 3000 includes two tunable inductors 3010 and 3014. In some embodiments, the inductances of the tunable inductors 3010 and 3014 can be tuned so that their respective inductance values are substantially the same. In certain embodiments, the inductances of the tunable inductors 3010 and 3014 can be tuned so that their respective inductance values are within 1% (e.g., within 3%, within 5%, within 10%) of one another with respect to the larger value. By having the inductance values of the tunable inductors 3010 and 3014 to be substantially the same, the impedance tuning of the source-side circuit 3002 can be balanced. Such balance can reduce electromagnetic interference (EMI) generated by the source-side circuit 3002 because electromagnetic induction or electromagnetic radiation generated by tunable inductors 3010 and 3014 may cancel out each other. The EMI may affect wireless communication between the source-side circuit 3002 and receiver-side circuit 3032.

In some embodiments, the inductances of tunable inductors 3010 and 3014 can be tuned using separate control circuits 3140. Alternatively, in some other embodiments, a single control circuit 3140 can connect to tunable inductors 3010 and 3014. For example, the single control circuit 3140 can provide currents flowing through a coil 3142 in the tunable inductor 3010 along to a coil 3142 in the tunable inductor 3014. In this approach, one end of coil 3142 in the tunable inductor 3010 is connected to one end of coil 3142 of the tunable inductor 3014. This approach can be advantageous by using one control circuit 3140 to control the inductance of both tunable inductors 3010 and 3014. Because the current flowing through tunable inductors 3010 and 3014 may be the same, the changes of the inductances of the tunable inductors 3010 and 3014 can be the same, and balanced tuning can be achieved.

Balanced tuning of both inductors using a single control winding in series and a single control circuit 3140 can be particularly advantageous for certain applications. In particular, by using the same current excitation in both inductors while the inductors are tuned, balanced tuning of the inductors is guaranteed, without the possibility of a mismatch in inductance during tuning.

In certain embodiments, the control circuit 3140 can also send DC current 3102 in an opposite direction than shown in FIG. 14B. Such bi-polar direction of DC current 3102 may provide a wider range of tuning of inductance compared to the case when DC current is sent in only one direction.

Generally, tunable inductors 3010 and 3014 can be used in the receiver-side circuit 3032 to tune impedance of the receiver-side circuit 3032 in a balanced manner.

Figures 15A, 15B:
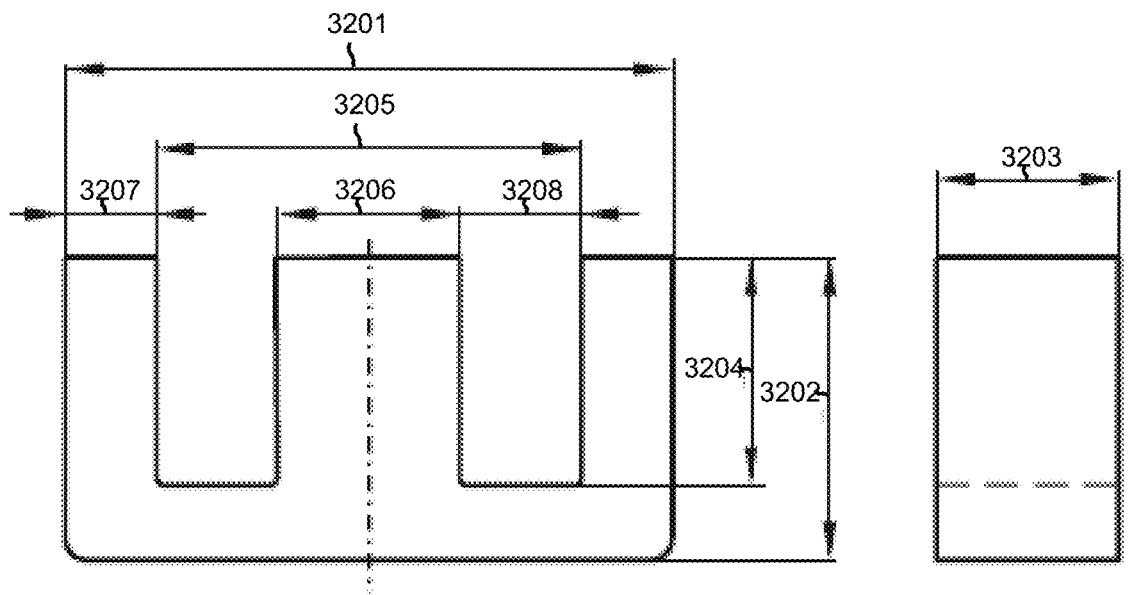
FIGS. 15A and 15B are schematic diagrams showing an example of magnetic material in a tunable inductor.

FIGS. 15A and 15B are schematic diagrams showing an example of magnetic material having an E-shaped structure, which can be used in the tunable inductor 3100 described in relation to FIGS. 14A-C. In some embodiments, dimensions 3201-3208 can be 56.2 mm, 27.6 mm, 24.61 mm, 18.5 mm, 37.5 mm, 17.2 mm, 9.35 mm and 10.15 mm, respectively. Dimension 3203 is the thickness of a magnetic material as indicated in FIG. 15A. In some embodiments, dimensions 3201-3208 can be 56.1 mm, 23.6 mm, 18.8 mm, 14.6 mm, 38.1 mm, 18.8 mm, 9.5 mm and 9.03 mm, respectively. The magnetic material can include ferrites such as Fe and Ni, and other soft ferrite materials that are designed for power applications. The magnetic material can be used for wireless power transfer of 1 kW or more (e.g., 2 kW or more, 3.3 kW or more, 4.5 kW or more, 5.5 kW or more, 6.4 kW or more).

Figure 16A:
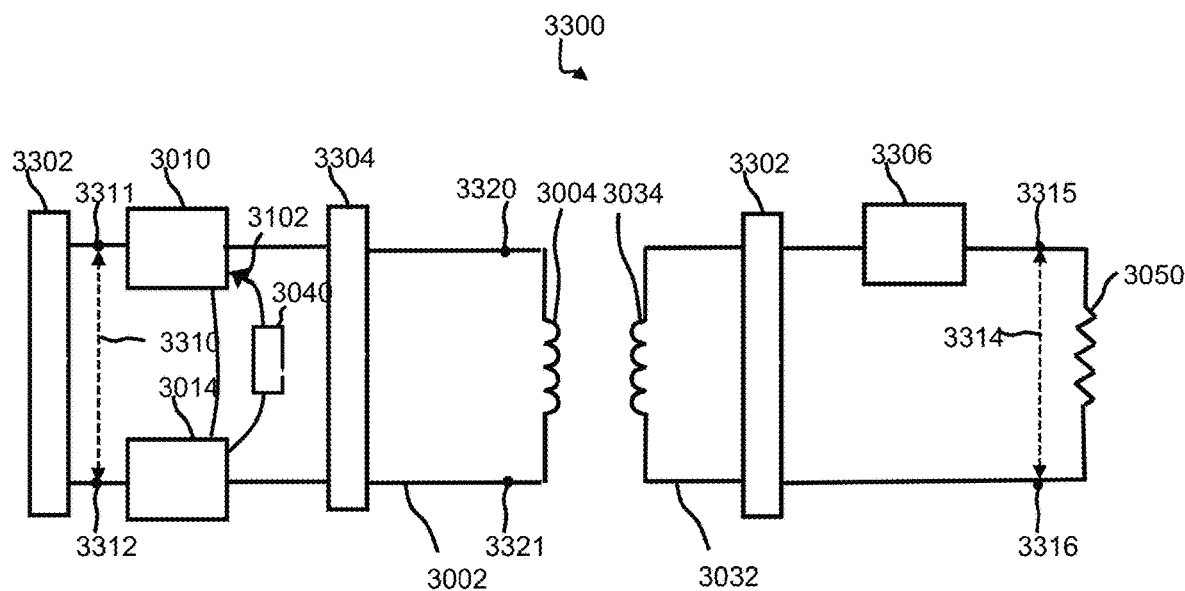
FIG. 16A is a schematic diagram showing another view of the wireless power transfer system of FIG. 13.

FIG. 16A is another schematic diagram showing power transfer system 3000 described in relation to FIG. 13. In FIG. 16A, some of the capacitors (e.g., variable capacitors) and inductors of the system 3000 are schematically depicted as matching circuit 3304 and 3302. Source-side circuit 3002 is connected to a power circuit 3302 which can include a switch-mode power supply for generating alternating electromagnetic fields through inductor 3004. The power circuit 3302 can be connected to tunable inductors 3010 and 3014 by terminals 3311 and 3312, respectively. In this disclosure, the voltage 3314 across terminals 3315 and 3316 of load 3050 can be referred to as a load voltage (Vload). Further, the bus voltage (Vbus) is typically the input voltage to the amplifier or the voltage that is generated from the power factor corrector, while the root-mean-square voltage 3310 across terminals 3311 and 3312 is the output voltage of the amplifier.

Figure 16B:
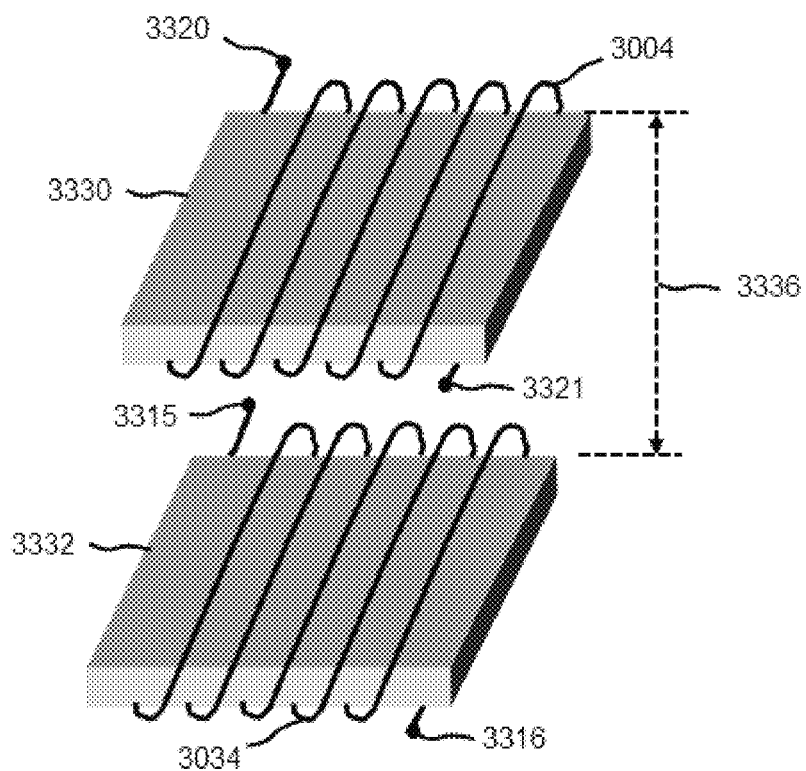
FIG. 16B is a schematic diagram of a portion of the wireless power transfer system shown in FIG. 16A.

FIG. 16B is a schematic diagram showing a portion of the power transfer system 3000 depicted in FIG. 16A. For the source-side circuit 3002, inductor 3004 (e.g., a coil) having terminals 3320 and 3321 is wound around a magnetic material 3330. For the receiver-side circuit 3032, inductor 3034 (e.g., a coil) having terminals 3315 and 3316 is wound around a magnetic material 3332. In this example, magnetic materials 3330 and 3332 are planar magnetic materials, and inductors 3004 and 3035 can generate magnetic dipole moments in a plane of the planar magnetic materials, respectively. In this disclosure, distance 3336 between the magnetic materials 3330 and 3332 is referred as a "z distance."

FIGS. 17A-D are images showing an example of the operation of the system 3000, in which the inductance of tunable inductors 3010 and 3014 is tuned to adjust impedance matching conditions; distance 3336 is 12 cm. In one measurement, the power circuit 3302 delivered 2.5 kW to the load 3050 while adjusting voltage 3314. The adjustment of voltage 3314 changed the impedance of the receiver-side circuit 3032. For example, such changes can simulate voltage changes of a battery load when being charged over time. In this measurement, the voltage 3314 was adjusted between 250 V and 360 V while operating the load 3050 in voltage mode rather than in current mode.

Tunable inductors 3010 and 3014 were electrically tuned to optimize the impedance matching between source-side circuit 3002 and receiver-side circuit 3032 while the impedance of the receiver-side circuit 3032 changed due to the adjustment of voltage 3314. The tuning of inductors 3010 and 3014 allowed power transfer to be about 2.5 kW±10% for the range of 240 V-380 V of voltage 3314. In contrast, without tuning inductances, the load voltage range over which approximately constant power delivery is possible is approximately 60 V. Accordingly, the range of voltages 3314 over which a substantial change in power transfer rate did not occur (e.g., the power transfer rate was maintained at 2.5 kW±10%) was larger by a factor of about 2.5 than the range of voltages over which the power transfer rate would have been maintained without tuning the tunable inductors 3010 and 3014.

In another measurement, power transfer of 3 kW with less than 10% variation was achieved when adjusting voltage 3314 between 240 V and 380 V. The voltage 3310 was about 290 V. Voltage 3310 can be increased by increasing the input impedance of the tunable inductors 3010 and 3014 so that they will operate within the operating range of the power factor corrector (PFC).

Figure 17A:
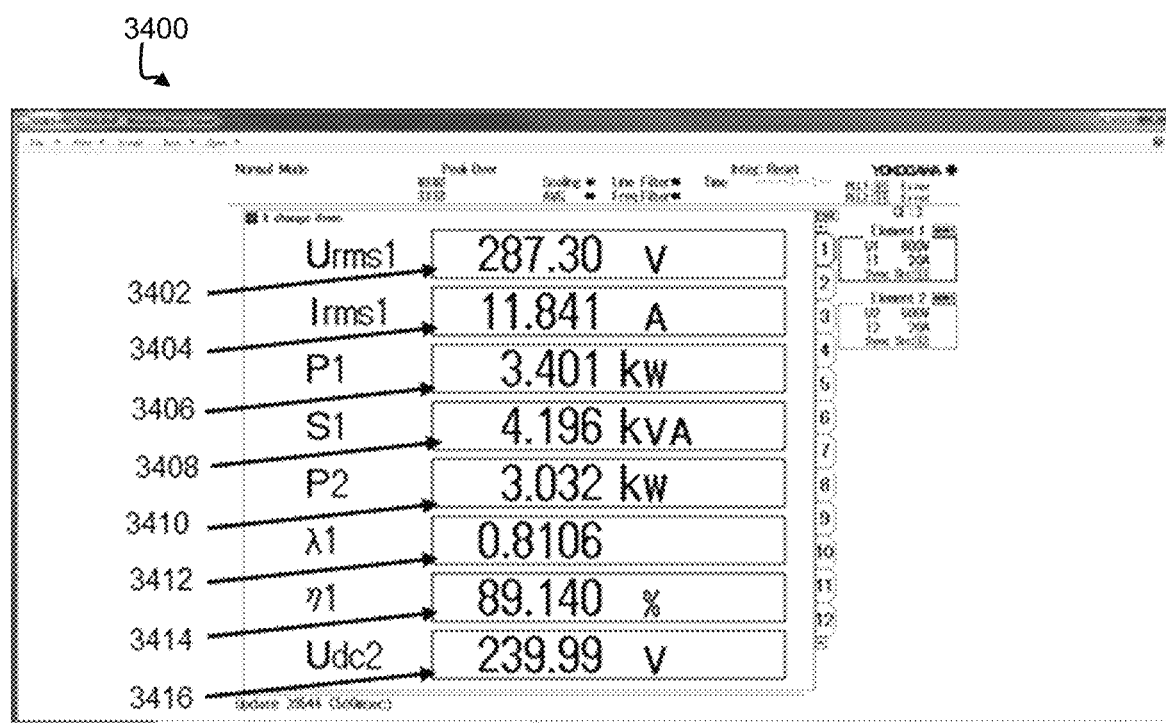
FIGS. 17A-17D are images demonstrating impedance tuning of the wireless power transfer system of FIG. 13.

FIG. 17A is an image showing the measured parameters of the system 3000 during the foregoing measurement. Display 3402, which is labeled as "Urms1," indicates the root-mean-square voltage 3310 across terminals 3311 and 3312 of power circuit 3302. Display 3404, which is labeled as "Irms1," indicates root-mean-square current passing terminal 3311. Such a current can be measured by a current sensor. Display 3406, which is labeled as "P1," indicates the power provided by the power circuit 3302. Display 3408, which is labeled as "S1," indicates the a voltage-current product (e.g., 4196 VA). For an AC source, the voltage-current product is a measure of how much power a source has to provide for a given load. Display 3410, which is labeled as "P2," indicates the power received by load 3050. Display 3412, which is labeled as "λ1," indicates the power factor. Display 3414, which is labeled as "η1," indicates the percentage ratio of P2 to P1. Display 3416, which is labeled as "Udc2," indicates voltage 3314 across load 3050.

Figure 17B:
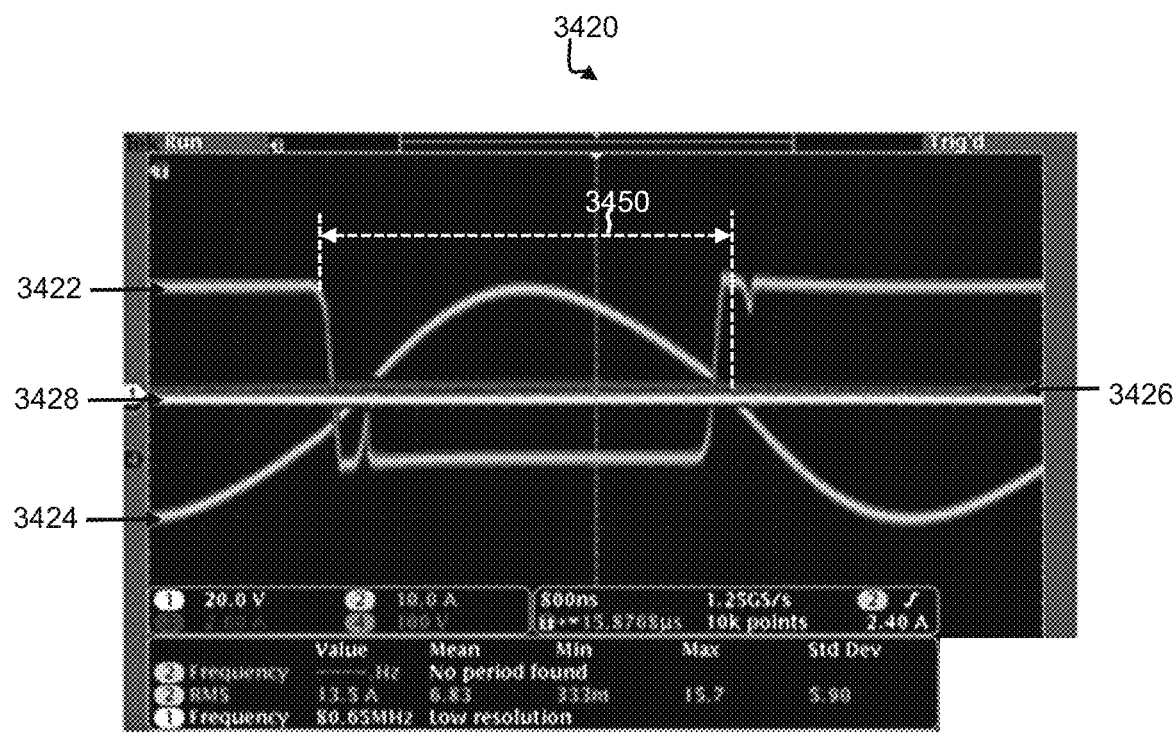

In the measurement shown in FIG. 17A, control circuit 3040 did not apply current to tunable inductors 3010 and 3014. FIG. 17B is an image 3320 showing observed voltages and currents using an oscilloscope during this measurement. Trace 3422 indicates the trace of voltage 3422, and trace 3424 indicates the trace of current Irms1 displayed by display 3404. The phase difference 3450 between trace 3422 and trace 3424 indicates that system 3000 is operating close to capacitive operation. Trace 3426 indicates the trace of current provided by control circuit 3040 to the tunable inductors 3010 and 3014. Trace 3428 indicates the trace of voltage provided by control circuit 3040 to the tunable inductors 3010 and 3014.

Figure 17C:
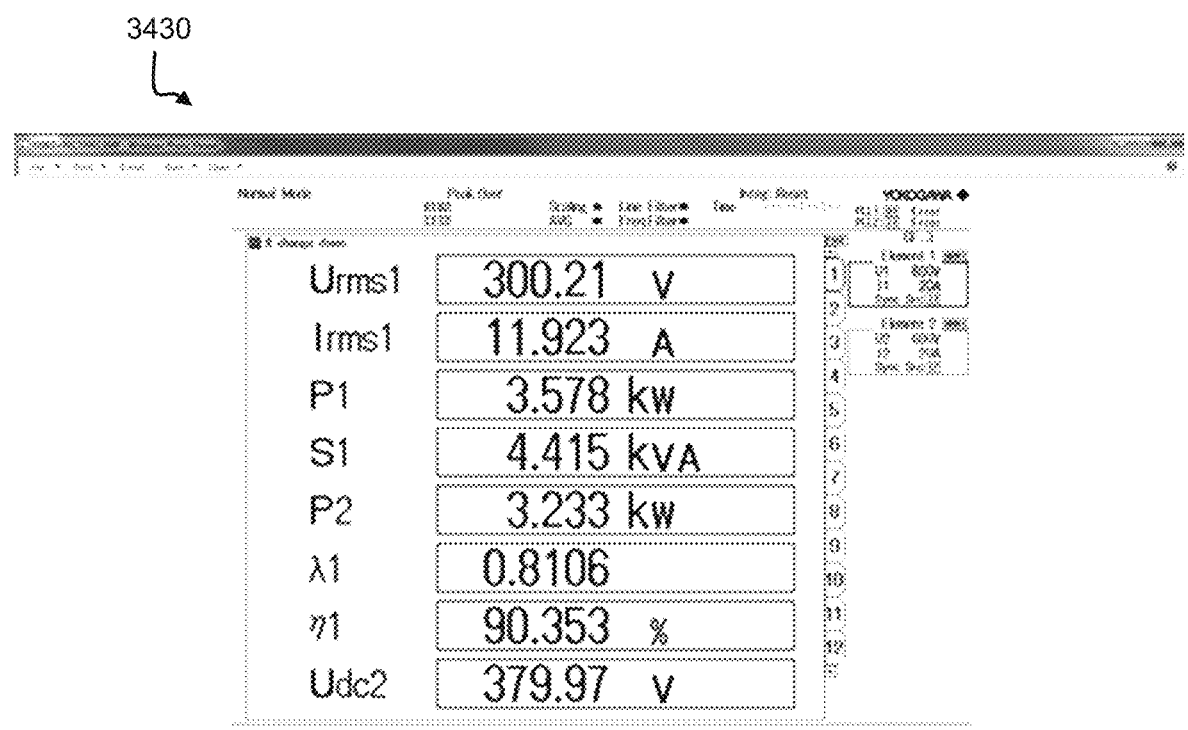

FIG. 17C is an image 3330 showing measured parameters of the system 3000 in another operating condition. The power provided by the power circuit 3302 was increased to about 3.6 kW compared to that of the operation shown in FIGS. 17A and 17B. Accordingly, display 3406 indicates the power provided by the power circuit 3302 to be about 3.6 kW. Display 3410 indicates the power received by load 3050 to be about 3.2 kW. Display 3416 indicates voltage 3314 across load 3050 to be about 380 V. During this operation, control circuit 3040 applied currents to the tunable inductors 3010 and 3014 to electrically tuning the inductances of the tunable inductors 3010 and 3014. The tunable inductors 3010 and 3014 were tuned to optimize the impedance matching between source-side circuit 3002 and receiver-side circuit 3032 so that ill of display 3414 was maintained to be about 90% while the P1 was changed from 3 kW to 3.6 kW and Udc2 was changed from 240 V to 380 V. These measurement results demonstrated that impedance changes due to changes in Udc2 can be matched by tuning the tunable inductors 3010 and 3014. The voltage 3314 presented by Udc2 was extended by 140V without adjusting voltage 3310 by more than 5%. In certain embodiments, the voltage 3310 can be adjusted to provide an increase of voltage 3314.

Figure 17D:
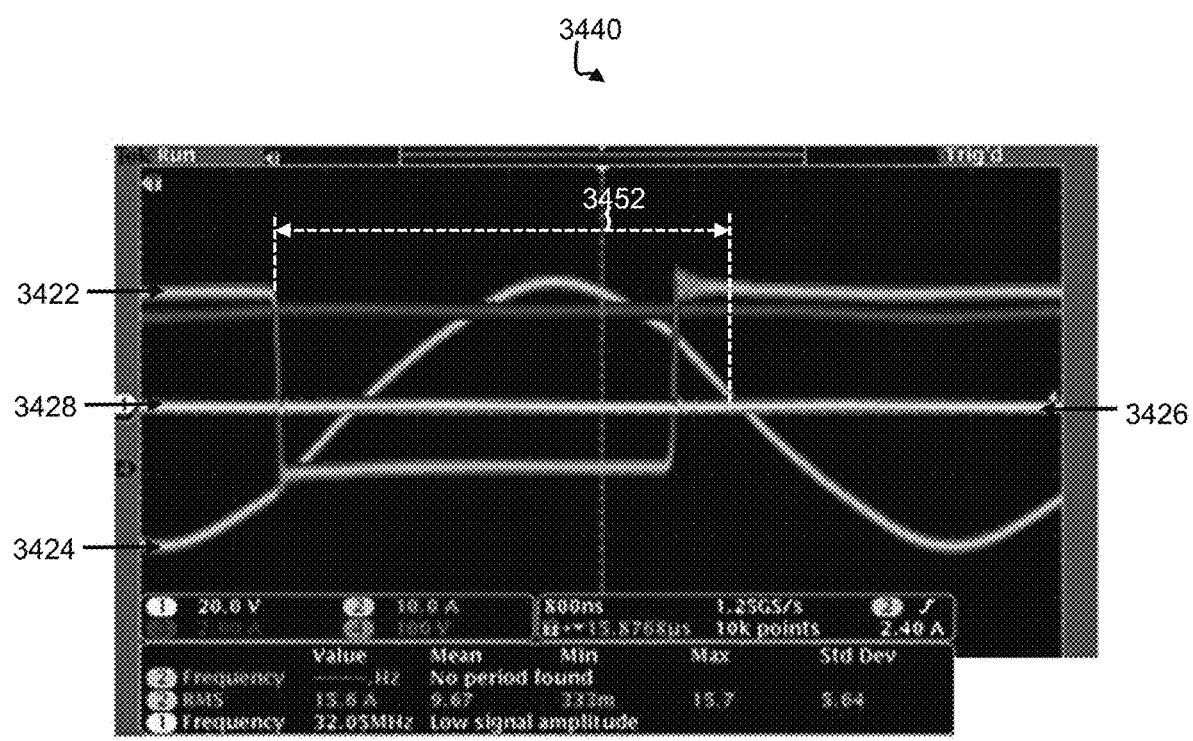

In the measurement shown in FIG. 17C, control circuit 3040 applied currents to tunable inductors 3010 and 3014 for tuning the inductance of the inductors. FIG. 17D is an image 3440 showing observed voltages and currents using an oscilloscope during this measurement. Phase difference 3452 between trace 3422 and trace 3424 indicates that while the amplifier load was inductive, it was tuned to be less inductive than it otherwise would have been without tuning. Trace 3426 indicates that currents were provided by control circuit 3040 to the tunable inductors 3010 and 3014. The currents were about 3 A. The currents can be reduced by increasing the number of turns N of the excitation coil. Trace 3428 was close to zero. In the above measurements, when current 3102 was varied from 0 to 4 A, the inductance of tunable inductors 3010 and 3104 varied from about 33 µH to about 22 µH.

The measurements described in relation to FIGS. 17A-D demonstrate that high power transfer can be achieved for a wide range of load voltages 3314 by tuning the inductance of tunable inductors 3310 and 3314. The measurement results were achieved without varying the operational frequency of power transfer. In some embodiments, control circuit 3040 can be a simple circuit to provide adjustable currents or voltages to excitation windings of the tunable inductors 3310 and 3314. A single control circuit 3040 can tune both tunable inductors 3310 and 3314. In certain embodiments, the control circuit 3040 can tune the tunable inductors 3310 and 3314 when impedance matching conditions change due to a change in relative position (e.g., x-offset, y-offset, z-offset) and/or orientation (rotation, tilt) between inductors 3004 and 3034.

In certain embodiments, variable frequency operation, where the operational frequency of the power transfer is adjusted, can be utilized along with tuning of tunable inductors in system 3000. The above approaches may be implemented along with adjusting Vbus so that a wide range (e.g., 180 V, 200 V) of load voltages is acceptable. In addition, the above approaches can be implemented without using special magnetic materials, which are used for magnetic amplifiers. In some embodiments, magnetic materials such as ferrites, including iron oxide, can be used.

Figure 18:
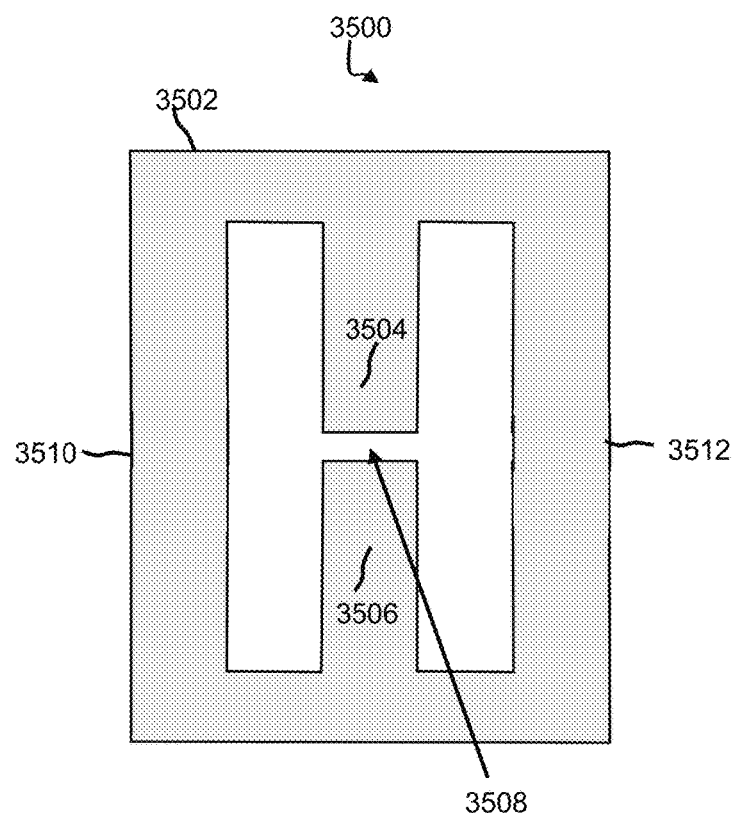
FIG. 18 is a schematic diagram of another embodiment of a tunable inductor.

FIG. 18 is a schematic diagram of another example of a tunable inductor 3500 that can be used for tunable inductors 3010 and 3014 described above. In this example, the tunable inductor 3500 includes a magnetic material 3502 which is shaped as two E-shaped portions facing each other. The magnetic material 3502 include leg portions 3504 and 3506 facing each other and forming a gap 3508. Similar to tunable inductor 3100 described in FIG. 14B, coil 3150 (not shown) is wound around portions 3504, 3506 and gap 3508. Coil 3142 (not shown), which is connected to a control circuit 3140 (not shown), is wound around portions 3510 and 3520, in a manner similar to tunable inductor 3100.

In some embodiments, a tunable inductor can include a toroid-shaped magnetic material with a gap (e.g., an air gap). A coil 3150 can be wound around the gap in a similar while a coil 3142 can be wound around the toroid-shaped magnetic material to adjust its effective permeability in a similar manner described in relation to FIG. 14B.

The tunable inductors 3010 and 3014 can have smaller inductance values than that of matching circuit 3304. In some embodiments, additional small inductors can be connected in series to the tunable inductors 3010 and 3014 for impedance matching.

In certain embodiments, electrically tuning the inductance values can be advantageous over mechanically tuning the inductance values because mechanically tuning can be more vulnerable to vibration and contamination, and thus be less robust in certain applications. In addition, for mechanical tuning, a magnetic flux variation in a gap region of a magnetic material may reduce performance. For example, when the gap size is mechanically varied to have a larger size, turnings of the wire may provide a significant magnetic flux so as to generate heating of the wire and magnetic material. The heating can lead to shorting or damage of the tunable inductor.

Figures 19A, 19B:
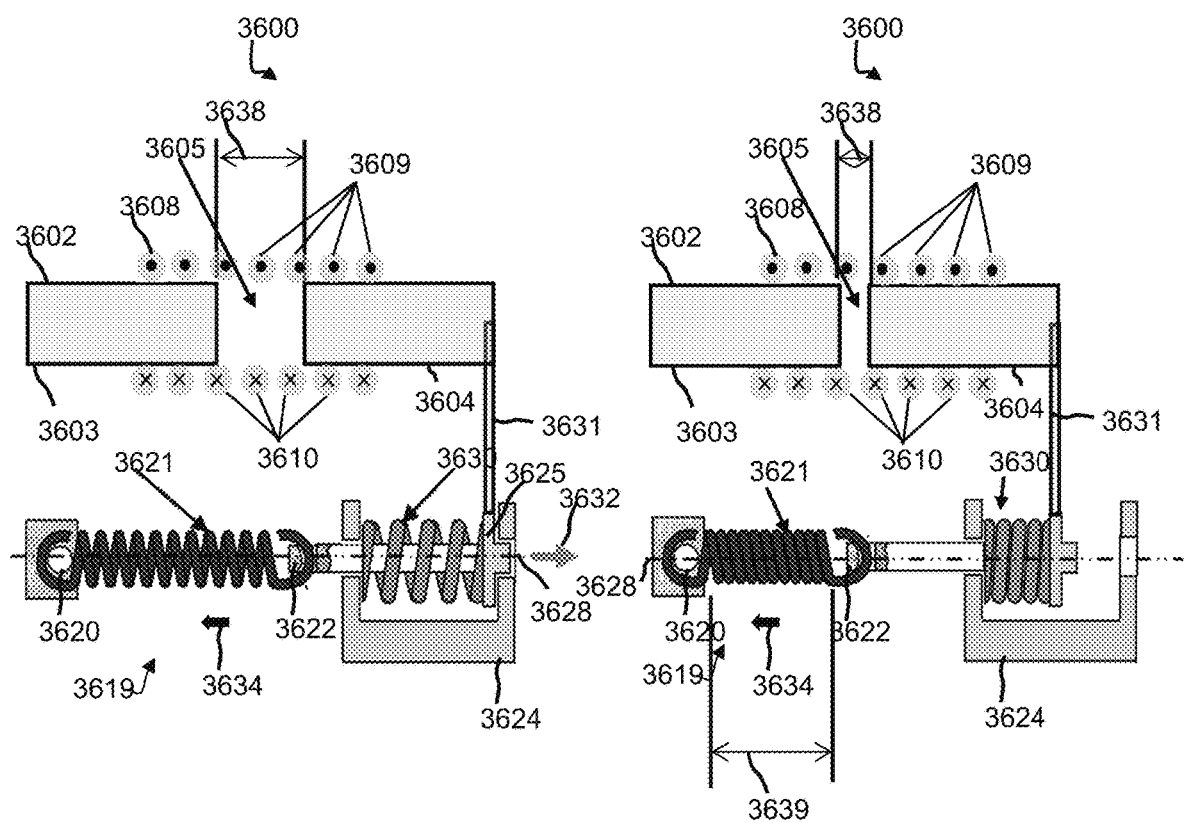
FIGS. 19A and 19B are schematic diagrams of a further embodiment of a tunable inductor.

Nonetheless, in some embodiments, mechanically-tuned inductors can be used for impedance matching in wireless power transfer systems. FIGS. 19A and 19B are schematic diagrams of another example of a tunable inductor 3600, which can be used for tunable inductors 3010 and 3014. Referring to FIG. 19A, the tunable inductor 3600 can include a coil 3608 wound around a magnetic material 3602. The magnetic material includes two portions 3603 and 3604 which are displaced from one another to form a gap 3605. In this example, the gap includes air to form an air gap. In FIG. 19A, gap 3605 has a separation distance 3638. One end of coil 3608 can be connected to, for example, terminal 3011 and the other end to terminal 3012 shown in FIG. 13. At a given time, currents in portion 3609 of the coil 3608 can flow in a direction outwards of the drawing plane (as indicated by the "dots") and currents in portion 3610 can flow in a direction inwards to the drawing plane (as indicated by the "crosses"). The currents can be passed on to a source resonator in source-side circuit 3002 for power transfer.

The tunable inductor 3600 can include an actuator 3619 used to displace portion 3604 of the magnetic material 3602, and thereby changing the distance 3638 of the gap 3605. Such a change leads to a change of the effective permeability of the magnetic material 3602 seen by the coil 3608. The change of effective permeability leads to a change of the inductance of the coil 3608. Accordingly, the inductance of the tunable inductor 3600 can be tuned by mechanically varying the distance 3638.

The actuator 3619 can include a deformable element 3621. For example, the deformable element 3621 can be a shape memory alloy (SMA), which can change its shape when a current is passed through it. In some embodiments, currents passing through the shape memory alloy heat the shape memory alloy, thereby deforming its shape. In certain embodiments, the deformable element 3621 can be an SMA wire or an SMA foil. The SMA can include Nitinol (nickel titanium) material, copper-aluminum-nickel, or alloys of zinc, copper, gold and iron, for example.

In some embodiments, the deformable element 3621 can have a spring structure as illustrated in FIG. 19A. One end of the deformable element 3621 is fixed onto a support structure 3620 and the other end of the deformable element 3621 is fixed onto a support structure 3622. The support structure 3622 can guided through base 3624 along direction 3628.

In the example illustrated in FIG. 19A, the actuator 3619 includes a bias spring 3630, where one end is fixed to a holding element 3625 (e.g., a plastic cap). The holding element 3625 is configured to move portion 3604 by displacing fixture element 3631 fixed to portion 3604 and holding element 3625 on each end, respectively.

The deformable element 3621 can apply force to support structure 3622 in direction 3634. On the other hand, the bias spring 3630 can apply force to holding element 3625 and the support structure 3622 in direction 3632. The forces applied on each end of the support structure 3622 can balance out each other so that fixture element 3631 can hold the portion 3064 in a fixed position. In some embodiments, the deformable element 3621 can be deformed, for example, by passing currents through the deformable element. For example, the deformable element 3621 can shrink when heated by the currents. In another example, the deformable element 3621 can expand when heated by the currents. In these approaches, the deformable element 3621 can apply varying forces onto the support structure 3622.

FIG. 19B is a schematic diagram of the tunable inductor 3600 shown in FIG. 19A after applying currents through the deformable element 3621. In this example, the deformable element 3621 has contracted so that distance 3638 decreased. As a result, the inductance of the tunable inductor 3600 has varied. Length 3639 of the deformable element 3621 can be controlled by adjusting the magnitude and duration of current applied through the deformable element 3621. In this approach, the inductance of the tunable inductor 3600 can be tuned by a user by adjusting the length 3639.

In certain embodiments, the tunable inductor 3600 can include multiple bias springs. Alternatively, in some embodiments, the tunable inductor 3600 may not include a bias spring and the deformable element 3621 can adjust the distance 3638 without using a bias spring.

Generally, one or more deformable elements 3621 can be included in a single actuator.

Figure 20:
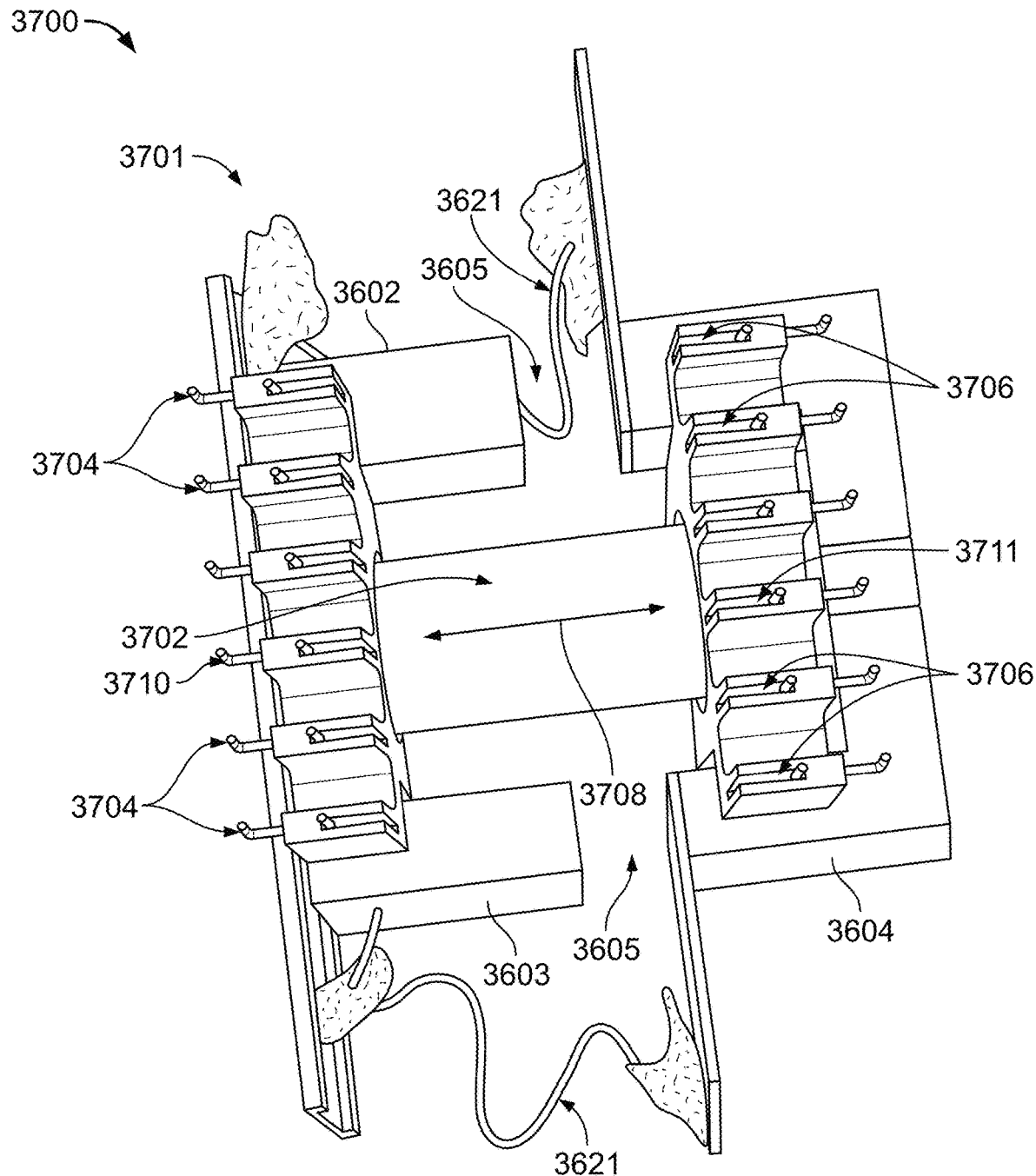
FIG. 20 is an image of another embodiment of a tunable inductor.

FIG. 20 is an image 3700 of an example of a tunable inductor 3701, which includes magnetic material 3602. The magnetic material 3602 includes two portions 3603 and 3604 where a gap 3605 is formed between the portions 3602 and 3604. In this example, each of the two portions 3602 and 3604 form an E-shaped structure. The two portions 3602 and 3604 are held by support structure 3702, which includes a spring (not shown) so that length 3708 is variable. A coil is wound around the center legs of the E-shaped structures of portions 3602 and 3604 in a manner similar to coil 3150 described in FIG. 14B. The coil and the center legs are contained within the support structure 3702. One end of the coil is connected to electrode 3710 and the other end to the electrode 3711 so that currents can pass through the coil by way of the electrodes 3710 and 3711. In some embodiments, the tunable inductor 3701 can be used in either a source-side circuit or a receiver-side circuit so that the coil can acts as a tunable inductor. For example, a power circuit can provide currents through electrodes 3710 and 3711 and then to a source resonator included in the source-side circuit.

In some embodiments, the tunable inductor 3701 can include electrodes 3704 and 3706. A control circuit can be used to apply currents from electrodes 3704 to electrodes 3706 by way of deformable element 3621. In this example, the currents can heat the deformable element 3621, and the heating can change the length of the deformable element 3621 so that the separation between the two portions 3602 and 3604 can be adjusted. As mentioned earlier, the adjustable separation can lead to tunable inductance values of the tunable inductor 3701. In this approach, the inductance of tunable inductor 3701 can be mechanically adjusted by applying electrical currents provided by the control circuit.

In some embodiments, the deformable element 3621 can be deformed by applying a voltage to an adjacent heating or cooling element, which controls the temperature of the deformable element 3621.

In the foregoing examples of tunable inductors, the magnetic material can include hard ferrite or soft ferrites. The magnetic material can include Fe or other ferrous material. In certain embodiments, the magnetic material can include magnetic powdered cores made from Ni, Fe and Mo. Coils can include solid or hollow wires made from materials such as copper, aluminum. In some embodiments, a coil can include a Litz wire. For example, magnetic powdered cores and Litz wire can be utilized at an operating frequency of 85 kHz for wireless power transfer, due to their low loss.

In some embodiments, one or more tunable elements with capacitance tuning capabilities can be used for impedance tuning in a wireless power transfer system. Such tunable elements can tune an impedance of a circuit of the system by tuning capacitance values instead of inductance values. Such tunable elements can be used instead of tunable inductors 3010 and 3014 in power transfer systems 3000 and 3300.

Figure 21:
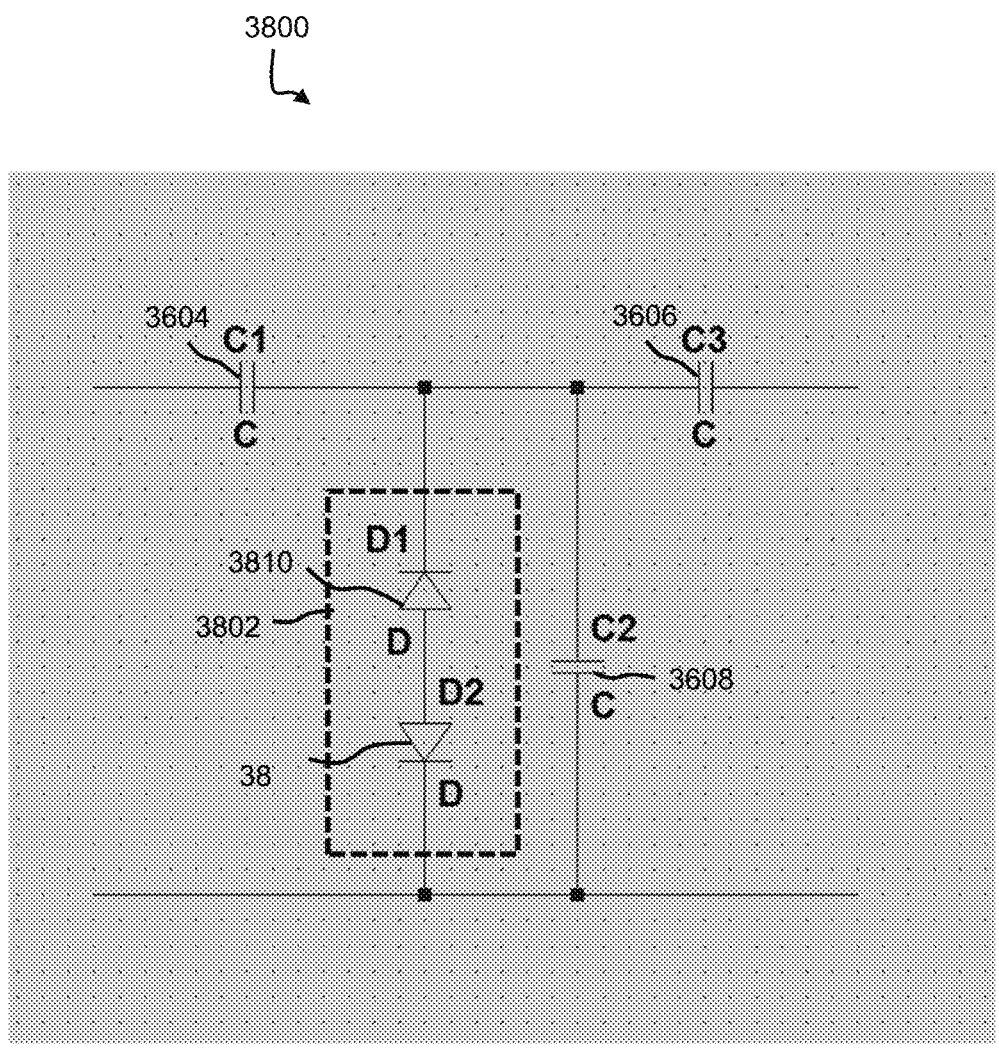
FIG. 21 is a schematic diagram of a portion of a power transfer system featuring a tunable element for adjusting the impedance of a resonator of the system.

FIG. 21 is a schematic diagram of a portion 3800 of a power transfer system including an example of a tunable element 3802 with capacitance tuning capabilities. The portion 3800 can correspond to a portion of a source-side circuit or a receiver-side circuit. In this example, the portion 3800 corresponds to a portion of the source-side circuit. The portion 3800 can include capacitors 3604, 3606 and 3608 which can have fixed value of capacitances or can be variable capacitors to provide a desired impedance value of the source-side circuit.

The tunable element 3802 can include a p-n junction between two different types of a semiconductor material. The capacitance of the tunable element 3802 can be tuned by adjusting a nonlinear depletion capacitance of the reverse biased p-n junction. For example, to achieve this, the tunable element 3802 can include two diodes 3810 and 3811 connected back-to-back as shown in FIG. 21, where each diode includes a p-n junction. Anodes of the diodes 3810 and 3811 are connected to each other. In this arrangement, capacitance of the combined diodes 3810 and 3811 depends on the applied voltage across the tunable element 3802. When an AC voltage is applied to the tunable element 3802, the diodes 3810 and 3811 act as rectifiers charging their depletion capacitances to a reverse bias DC potential proportional to the AC voltage. Accordingly, by adjusting the applied AC voltage, the capacitance of the tunable element 3802 can be tuned.

In some embodiments, tunable element 3802 can include other elements such as MOSFETs having p-n junctions that exhibit a nonlinear capacitance. Elements such as MOSFETs can be used for automatic regulation of impedance and/or with the use of control signals from a control circuit applied to gates of MOSFETs to regulate their impedance. Such techniques can be used for capacitance tuning of the tunable element 3802 without utilizing a microcontroller or complicated control scheme because adjusting the magnitude of the AC voltage (and accordingly the reverse bias DC voltage) across the tunable element 3802 can lead to a change in capacitance. For example, an increase in the magnitude of the AC voltage leads to a decrease in the capacitance. This can allow the tunable element 3802 to automatically tune its capacitance according to a desired voltage and/or protective voltage of a load in a receiver-side circuit.

The foregoing devices and techniques can be used for inductance tuning or capacitance tuning in either or both of a source-side circuit and a receiver-side circuit. The operation frequency of power transfer can be 85 kHz, for example. In some embodiments, the operation frequency can be within 1% (e.g., within 3%, within 5%, within 10%) of 85 kHz. In certain embodiments, the operation frequency can be 85 kHz or more.

In some embodiments, the operation frequency of power transfer can be 145 kHz. The operation frequency can be within 1% (e.g., within 3%, within 5%, within 10%) of 145 kHz. In certain embodiments, the operation frequency can be 145 kHz or more.

Impedance Matching Networks

The tunable inductors disclosed in the foregoing section can be used in a wide variety of impedance matching networks in wireless power transfer systems. FIG. 13 shows an example of one such impedance matching network in both the source resonator and the receiver resonator. More generally, however, the tunable inductors disclosed herein can be used in many different networks. Additional examples of impedance matching networks are described in U.S. Patent Application Publication No. 2010/0308939, the entire contents of which are incorporated herein by reference.

Impedance Matching Network Adjustment and Optimization Impedance matching networks can be adjusted, modified, and/or optimized to account for a variety of different network components (e.g., capacitors, inductors, resistors, rectifiers, voltage sources), power transfer specifications, and operating conditions. To determine suitable values of various operating parameters and/or to determine the effects of adjusting various aspects of a wireless power transfer system's important system operating characteristics (such as the magnetic coupling coefficient, k, between resonators, operating efficiency, maximum transferrable power, voltage, and current), the systems can be simulated and optimized.

Figure 22:
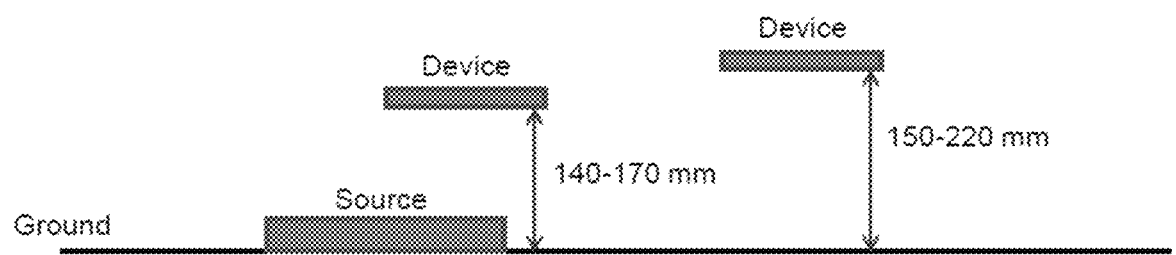
FIG. 22 is a schematic diagram of two wireless power transfer systems with different displacements between source and receiver resonators.

FIG. 22 shows a schematic diagram of two different wireless power transfer systems. In the system on the left side of FIG. 22, a device resonator receiving power wirelessly is displaced vertically from a source resonator transmitting power wirelessly, with a gap between these resonators of between 140 mm and 170 mm. A vertical gap in this range can correspond, for example, to the gap between a source resonator and a vehicle-mounted device resonator in a wireless electric car charging system. The right side of FIG. 22 shows a device resonator vertically displaced from a source resonator by a gap of between 150 mm and 220 mm, which can correspond, for example, to a source-device gap in a wireless power transfer system for an electric truck or other large electric vehicle.

Figure 23:
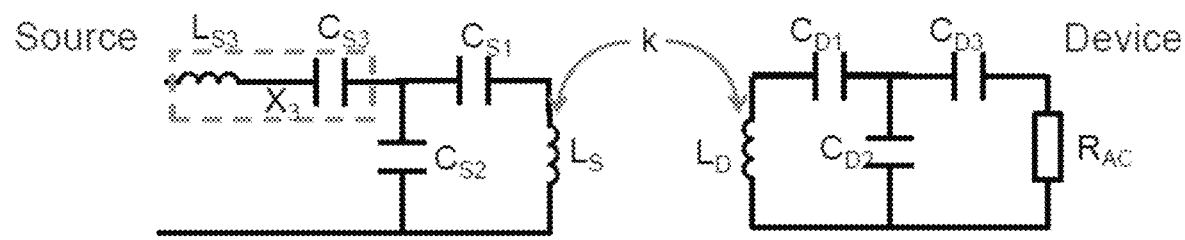
FIG. 23 is a schematic diagram of an impedance matching network topology.

FIGS. 23-30 illustrate an example of impedance matching network simulation and adjustment and/or optimization. FIG. 23 shows a schematic diagram of the impedance matching network topology simulated, which includes networks on both the source and device sides of the system. The source side includes an inductor $L_s$ which couples wirelessly, with coupling constant k, to an inductor $L_D$ on the device side to transfer power from the source side to the device side. The source impedance matching network includes capacitors $C_{S1}$, $C_{S2}$, and $C_{S3}$, and an inductor $L_{S3}$. Capacitor $C_{S3}$ and inductor $L_{S3}$ together form a tunable reactance $X_3$.

The device side includes capacitors $C_{D1}$, $C_{D2}$, and $C_{D3}$, and AC load RAC. The topology shown in FIG. 23 is only an example. More generally, a wide variety of different topologies can be simulated, adjusted, and/or optimized. For example, in some embodiments, the device side can include a DC load and one or more rectifiers configured to convert AC power to DC power. The device side can also include one or more inductors coupled to the rectifier(s). Alternative capacitor arrangements can also be used such as a "pi" capacitor network.

In the system shown in FIG. 23, $L_S$ and $L_D$ were assumed for purposes of simulation to be 58.5 μH and 33.2 μH, respectively, although these parameters can take any value according to the particular system configuration. The Q values for the source and device resonators were assumed to be 300 and 250, respectively, and the coupling constant k was restricted to values between 0.12 and 0.31. $L_S$, $L_D$, and the Q values were further assumed to be independent of k. As above, in general, the values for Q and k can be selected as desired according to particular system configurations.

To optimize the system shown in FIG. 23 (and more generally, systems having a wide range of topologies), the impedance matching networks can be adjusted to maximize an overall figure of merit (FOM). The FOM can be defined in a variety of ways. For the system shown in FIG. 23, the FOM was defined as:

$$\text{FOM}=\eta \times (\eta > 0.91?) \times (340 V \le V_{bus} \le 430 V?) \times (5° \le \varphi \le 45°?)$$

where η is the efficiency of the system, $V_{bus}$ is the system's bus voltage, and φ is the phase of the complex input impedance to the amplifier in the source.

In the equation for FOM above, the three terms in brackets can correspond to Boolean tests which have values of 1 if true, 0 if false. Thus, for example, if η≤0.91, $V_{bus}$ is outside the range from 340 V to 430 V, or φ is outside the range from 5° to 45°, the FOM is zero. These Boolean conditions effectively restrict the range of values of $V_{bus}$, and φ over which the system is simulated by setting FOM=0 everywhere else. When the values of these parameters falls within the ranges above, FOM=η, with FOM=1 being the maximum FOM value.

In some embodiments, the three terms in brackets in the equation for FOM can correspond to tests with a smoother (e.g., continuous, rather than discrete Boolean) transition between limiting values of 1 and 0, as the tested parameter value goes from satisfying the test to not satisfying the test, rather than a strict Boolean test. For example, as $V_{bus}$ goes from more than 340 V to less than 340 V, the value of the test function in the FOM may go smoothly from 1 to 0 over a desired voltage range. It should be appreciated that the range of values of η, $V_{bus}$, and φ can generally be selected as desired to optimize systems of various configurations.

To optimize the system, the FOM is evaluated at each point in k-$V_{load}$ space, where $V_{load}$ represents the range of voltages that the system provides to a load connected on the device side. An overall FOM is then calculated as the integral over the domain in k-$V_{load}$ space defined by 0.125≤k≤0.325 and 300 V≤$V_{load}$≤400 V, with each point within the domain having equal weight. In the plots shown in FIGS. 24-30, this domain is enclosed by a dashed box.

A variety of different methods for adjustment and optimization of the impedance matching network shown in FIG. 23 were investigated. Each of the plots in FIGS. 24A-F shows FOM calculated for a different type of impedance adjustment. The plot in FIG. 24A corresponds to a fixed impedance matching network with no tuning. The plots in FIGS. 24B and 24C correspond to a fixed impedance matching network with frequency tuning in a range from 80-90 kHz, and in a range from 82.5-87.5 kHz, respectively.

Figure 24A:
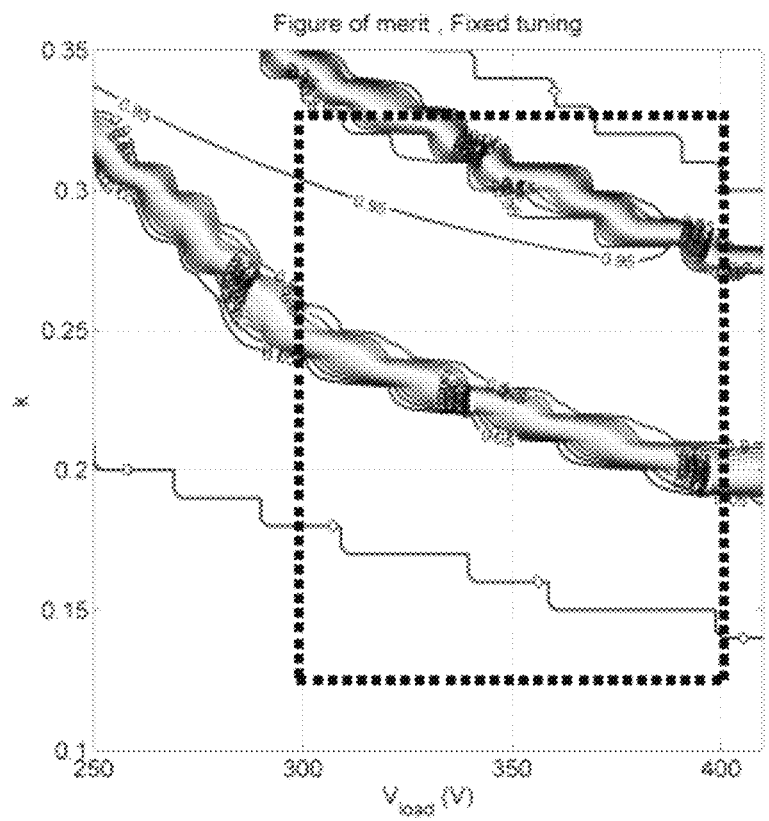
FIGS. 24A-F are plots showing figure of merit (FOM) values in the k-$V_{load}$ domain calculated for different tuning methods for the impedance matching network topology of FIG. 23.
Figure 24B:
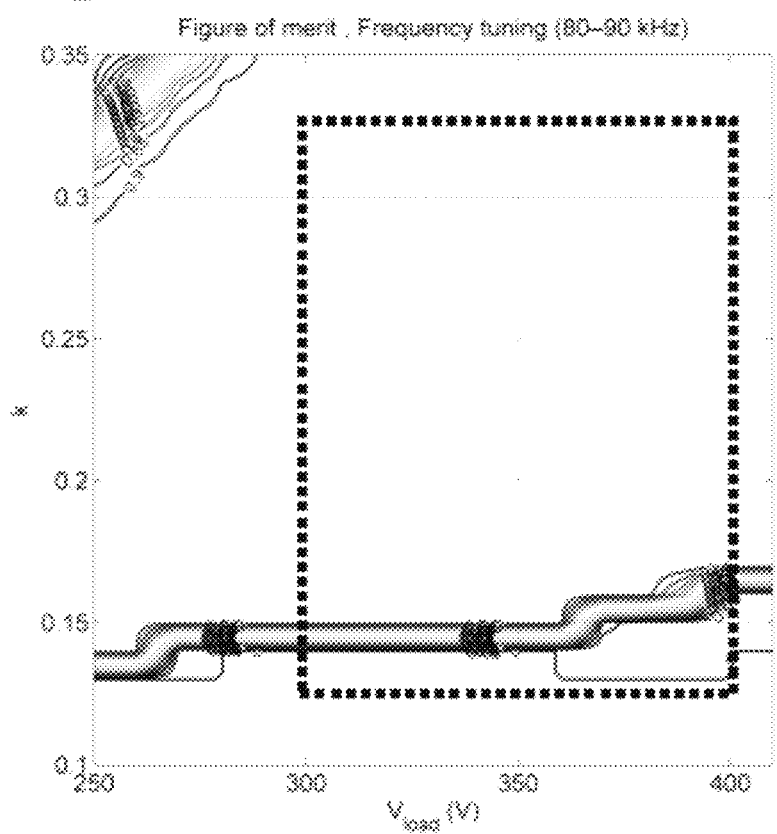
Figure 24C:
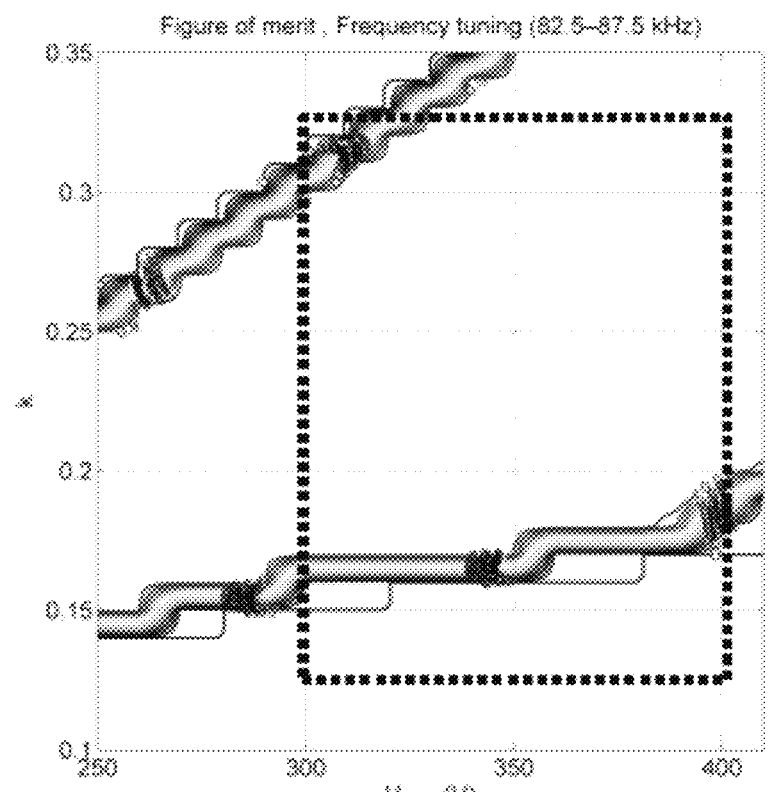
Figure 24D:
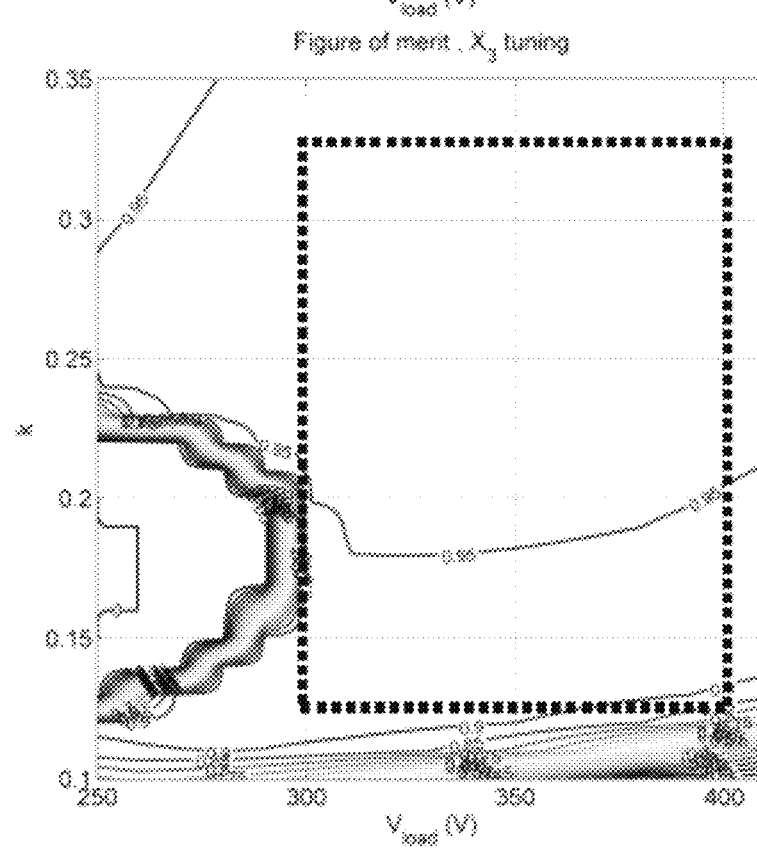
Figure 24E:
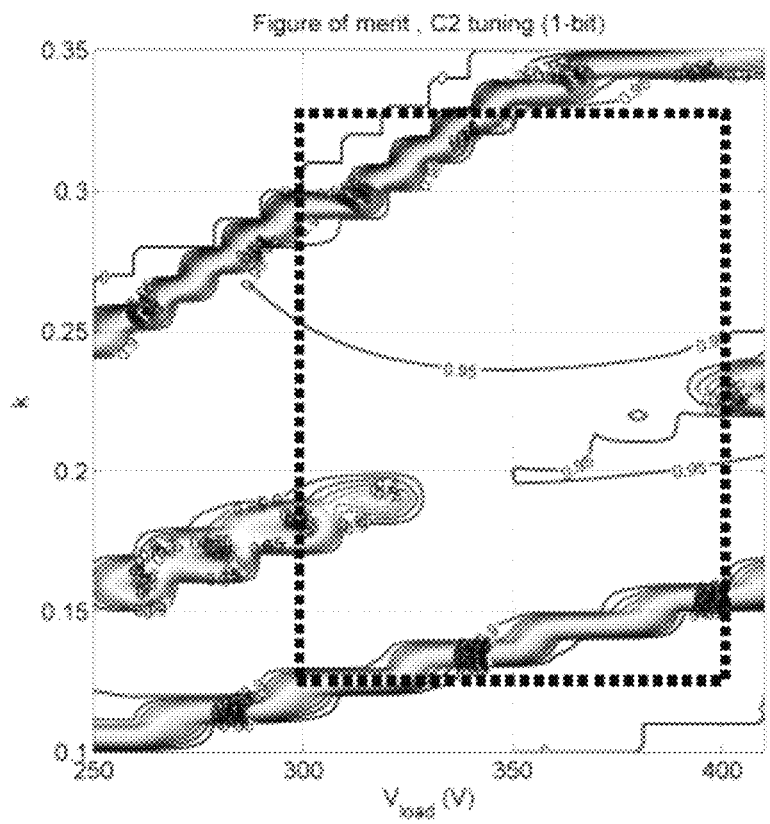
Figure 24F:
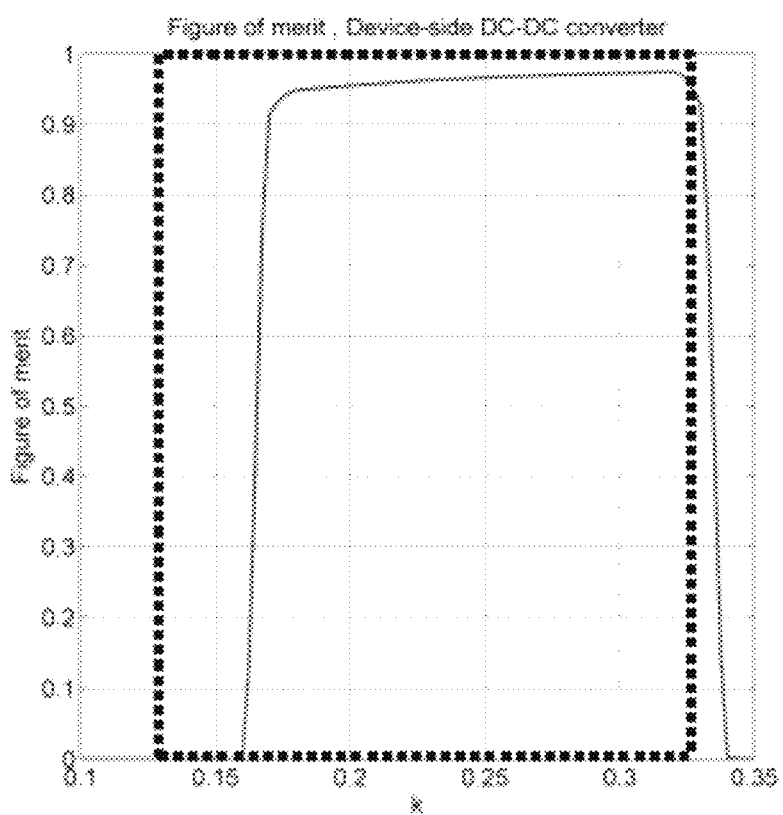

The plot in FIG. 24D corresponds to an impedance matching network where $X_3$ is continuously tunable on the source side. The plot in FIG. 24E corresponds to an impedance matching network where capacitor $C_2$ is tunable on the source side between two discrete values. The plot in FIG. 24F corresponds to a fixed impedance matching network with a DC-DC converter on the device side. The DC-DC converter reduces the variation in $V_{load}$ to zero, so that in FIG. 24F, only k varies. As is evident from the plots in FIGS. 24A-F, frequency tuning with a fixed impedance matching network yields high FOM values (FIGS. 24B and 24C) over a large domain in k-$V_{load}$ space.

Figure 25A:
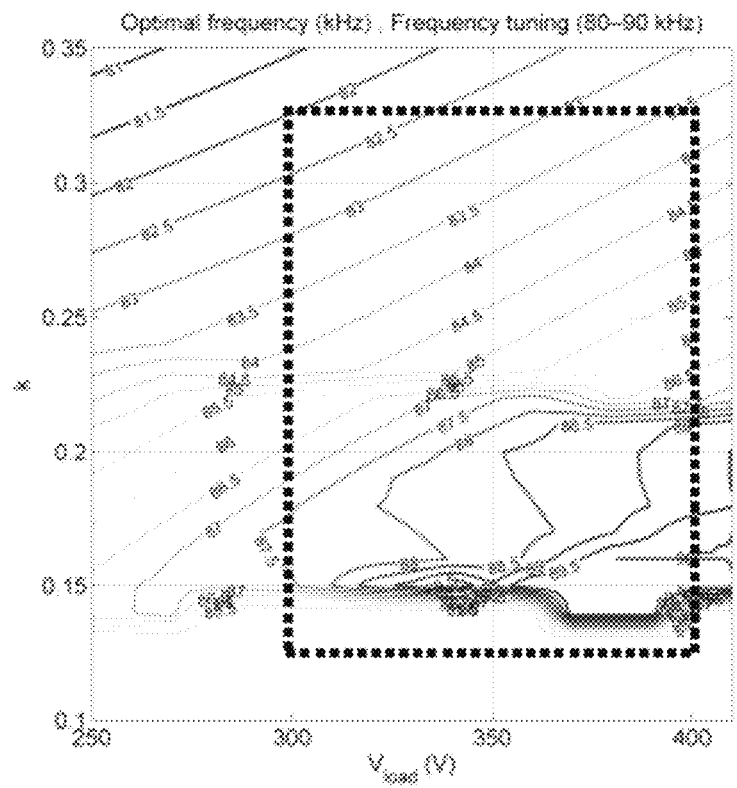
FIGS. 25A-E are plots showing optimal values of the tuning parameter in the k-$V_{load}$ domain calculated for different tuning methods for the impedance matching network topology of FIG. 23.
Figure 25B:
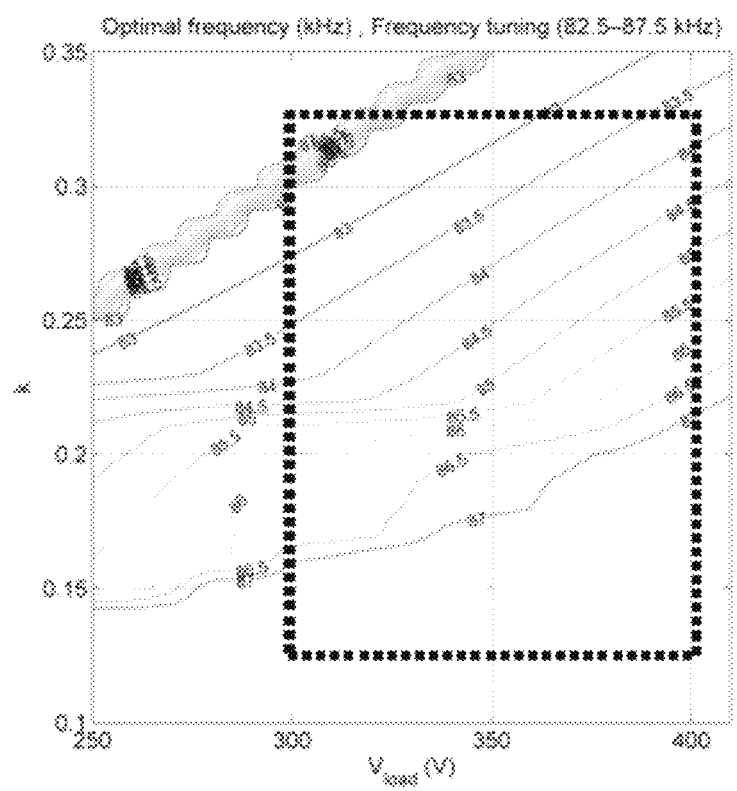
Figure 25C:
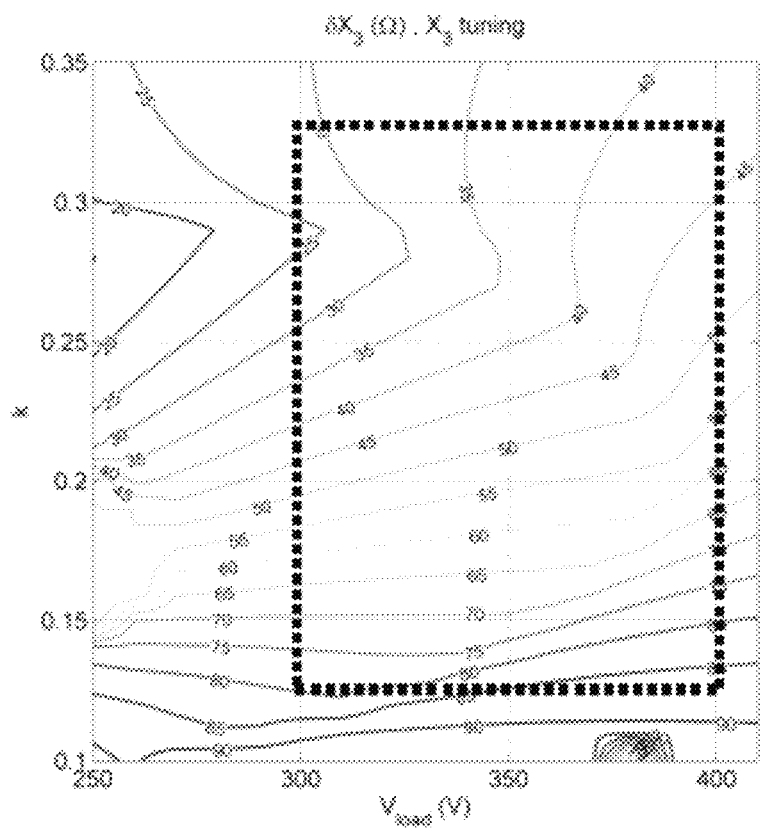
Figure 25D:
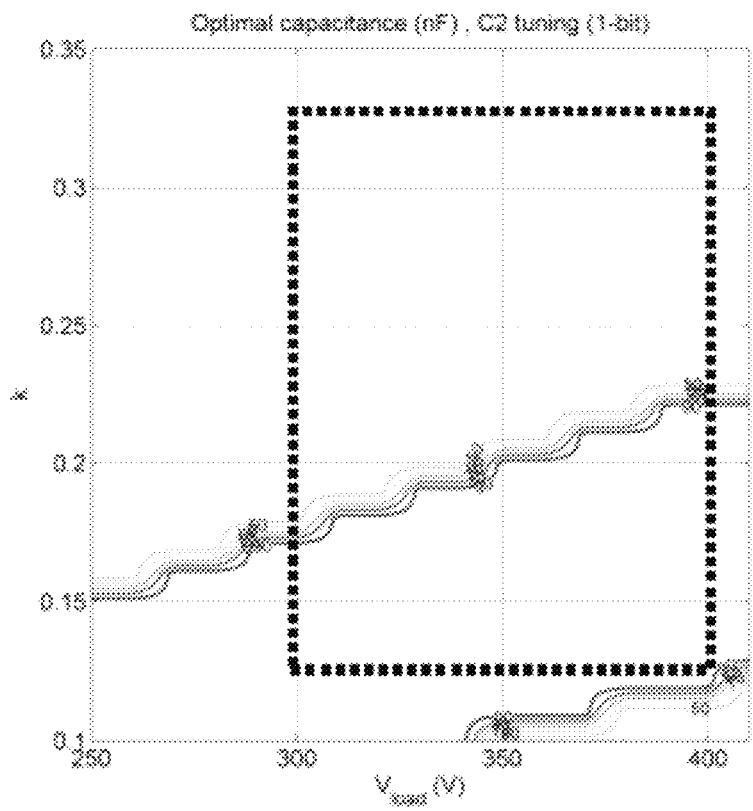
Figure 25E:
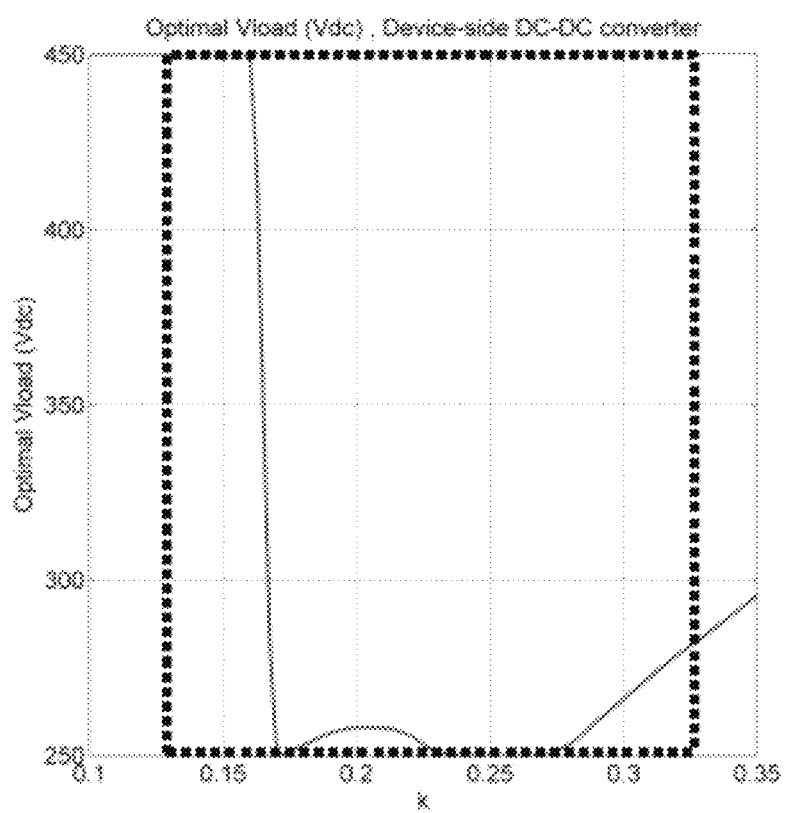

FIGS. 25A-E are plots showing optimal values of the tuning parameter for the various impedance matching network tuning methods described in connection with FIGS. 24A-F. FIG. 25A shows optimal values of the tuning frequency for frequency tuning in the 80-90 kHz band, FIG. 25B shows optimal values of the tuning frequency for frequency tuning in the 82.5-87.5 kHz band, FIG. 25C shows optimal values of the change in reactance for continuous $X_3$ tuning on the source side, FIG. 25D shows optimal values of $C_2$ capacitance for discrete $C_2$ capacitance tuning between two values on the source side, and FIG. 25E shows optimal values of $V_{load}$ for a fixed impedance matching network with a DC-DC converter on the device side.

Figure 26A:
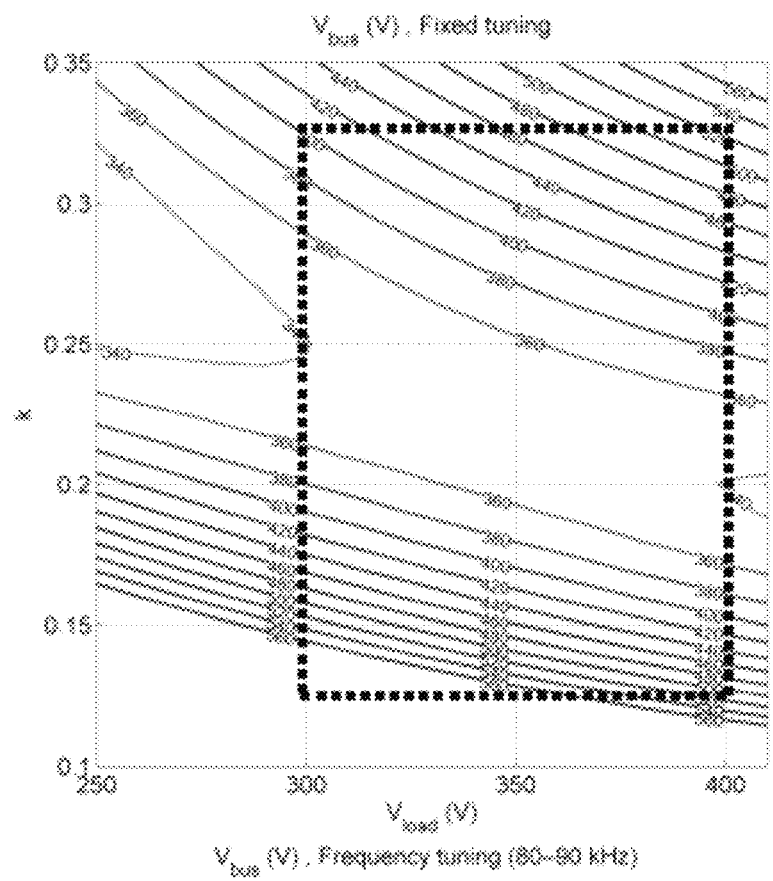
FIGS. 26A-F are plots showing values of the bus voltage ($V_{bus}$) in the k-$V_{load}$ domain calculated for different tuning methods for the impedance matching network topology of FIG. 23.
Figure 26B:
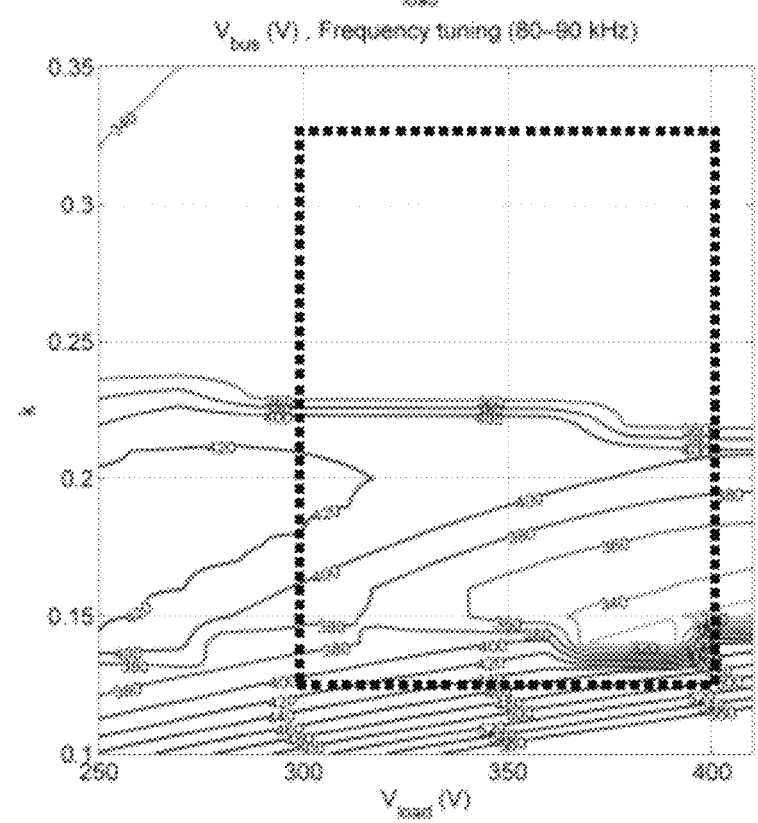
Figure 26C:
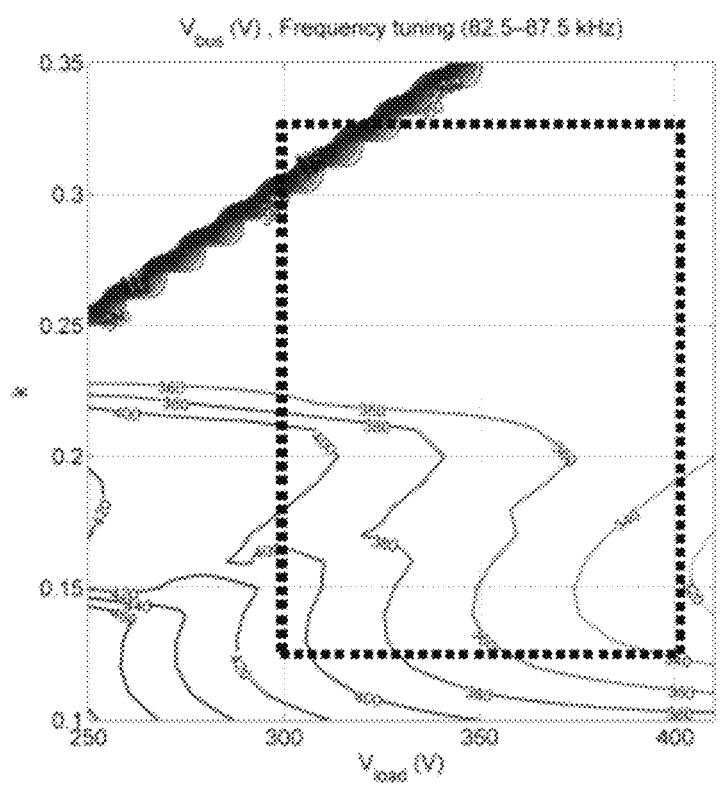
Figure 26D:
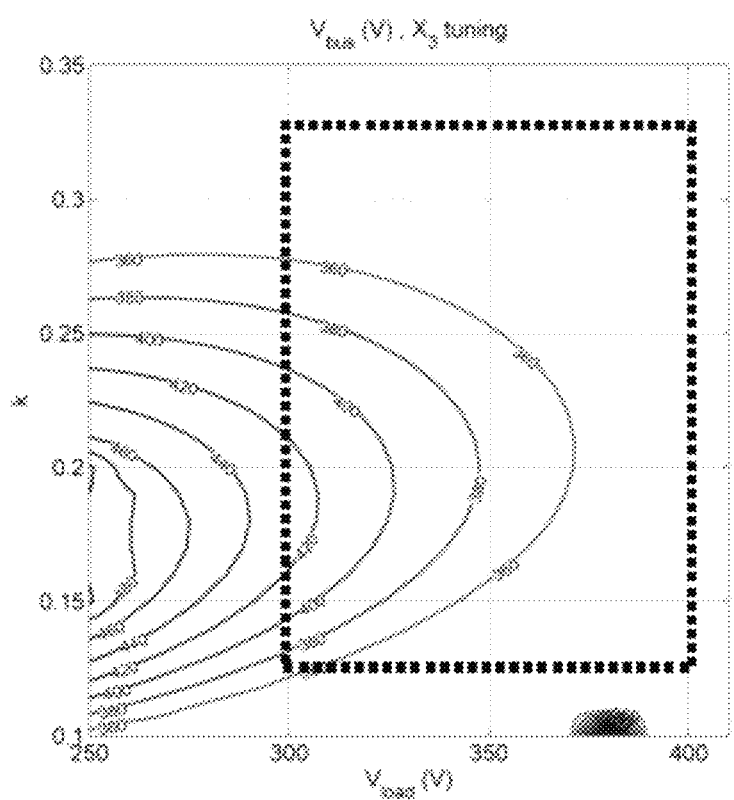
Figure 26E:
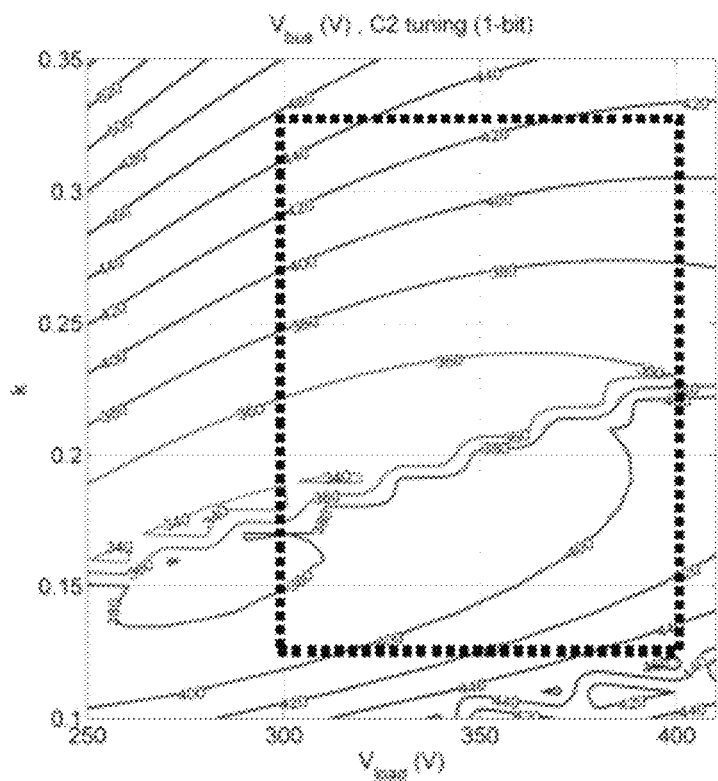
Figure 26F:
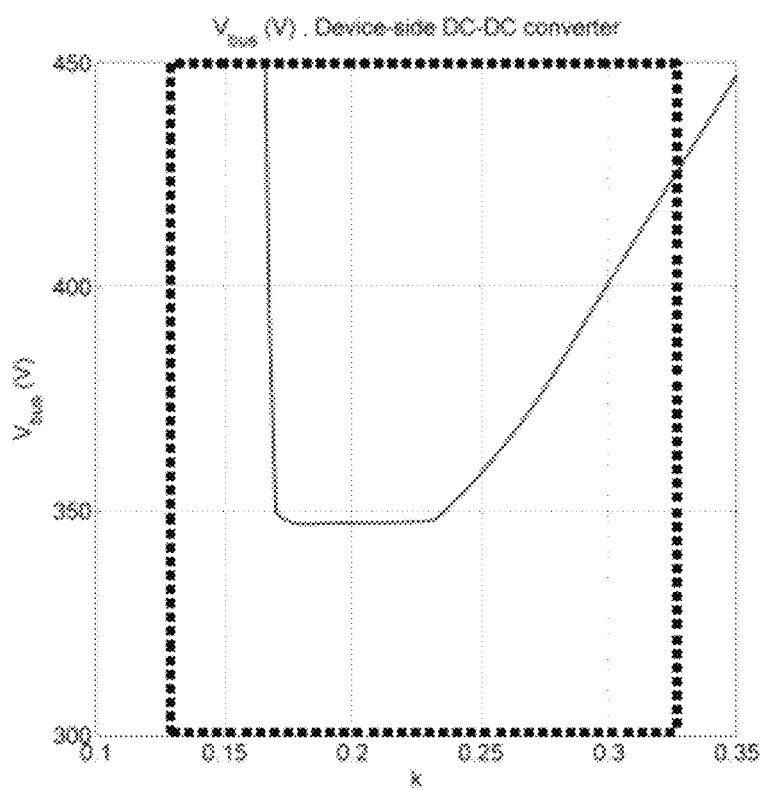

FIGS. 26A-F are plots showing values of the bus voltage $V_{bus}$ for the above-described impedance matching network tuning methods. In particular, FIG. 26A shows $V_{bus}$ values for a fixed impedance matching network with no tuning, FIG. 26B shows $V_{bus}$ values for a fixed impedance matching network with frequency tuning in the 80-90 kHz band, FIG. 26C shows $V_{bus}$ values for a fixed impedance matching network with frequency tuning in the 82.5-87.5 kHz band, FIG. 26D shows $V_{bus}$ values for source-side continuous $X_3$ tuning, FIG. 26E shows $V_{bus}$ values for source-side discrete $C_2$ tuning between two discrete values, and FIG. 26F shows $V_{bus}$ values for a fixed impedance matching network with a DC-DC converter on the device side. As shown in FIGS. 26B and 26C, network optimization by frequency tuning yields consistent $V_{bus}$ values over a wide range of the k-$V_{load}$ domain.

Figure 27A:
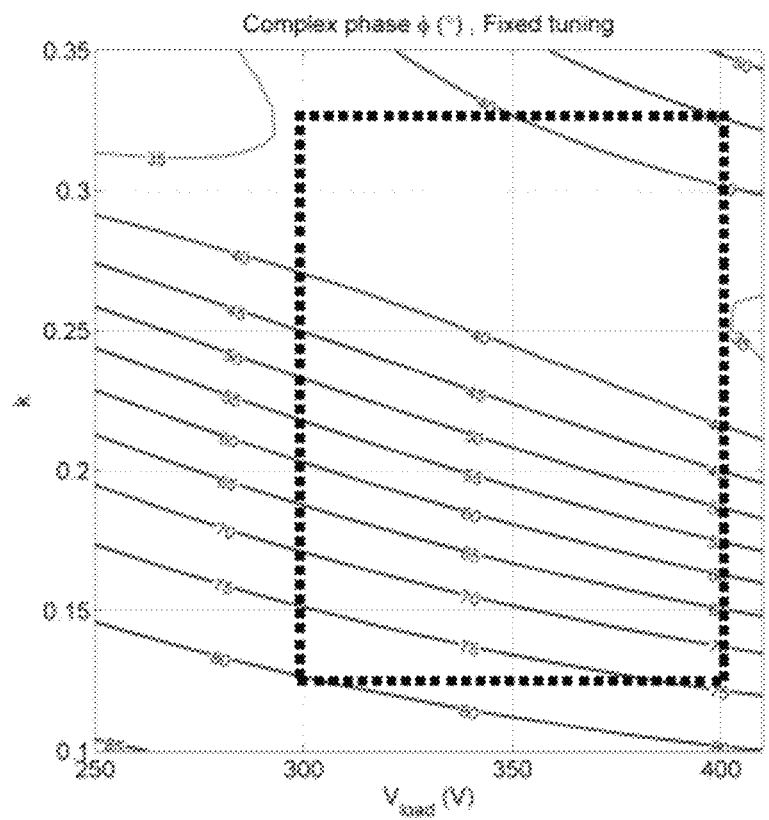
FIGS. 27A-F are plots showing values of the input phase ($\varphi$) in the k-$V_{load}$ domain calculated for different tuning methods for the impedance matching network topology of FIG. 23.
Figure 27B:
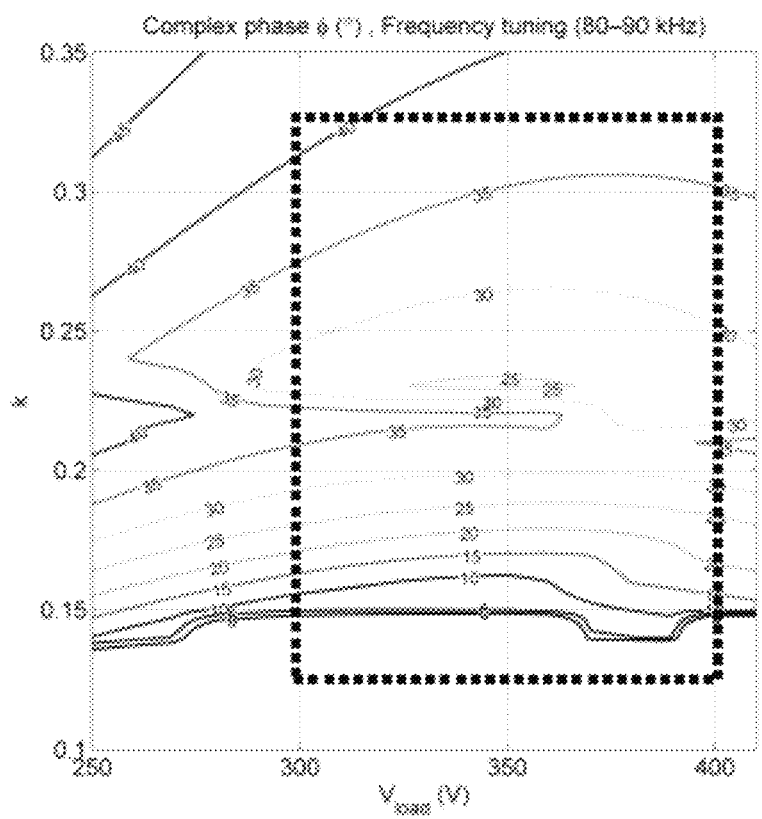
Figure 27C:
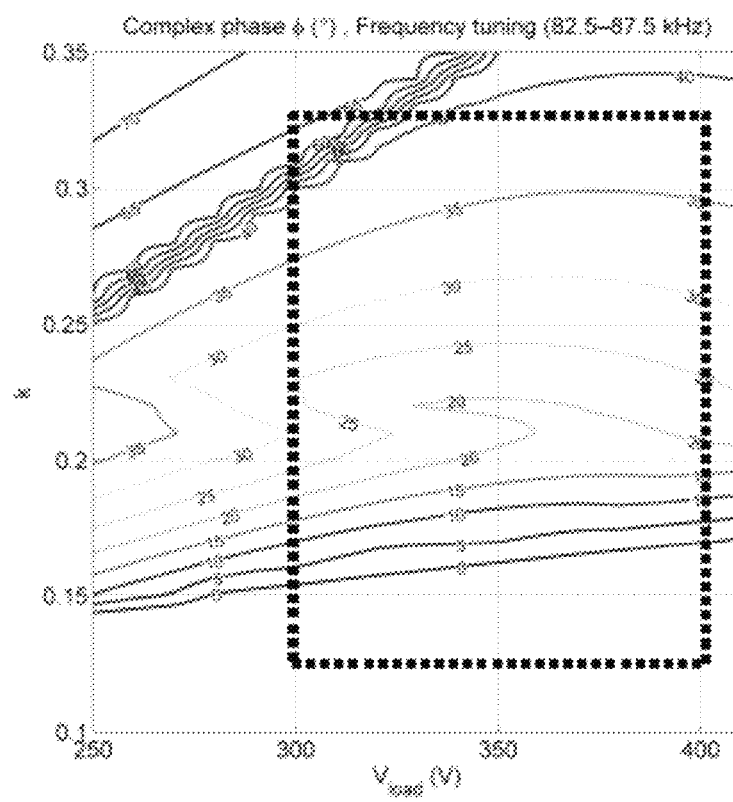
Figure 27D:
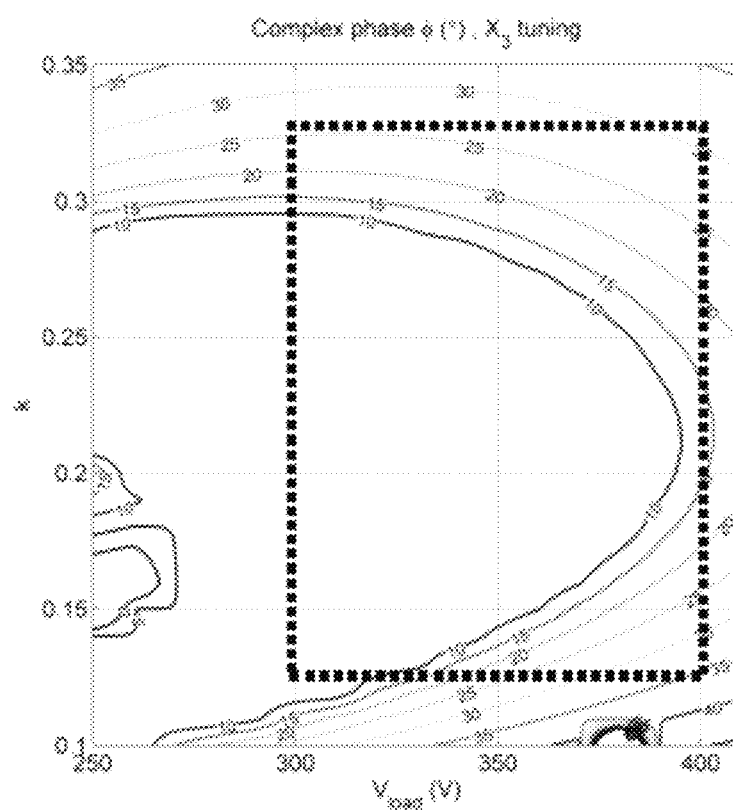
Figure 27E:
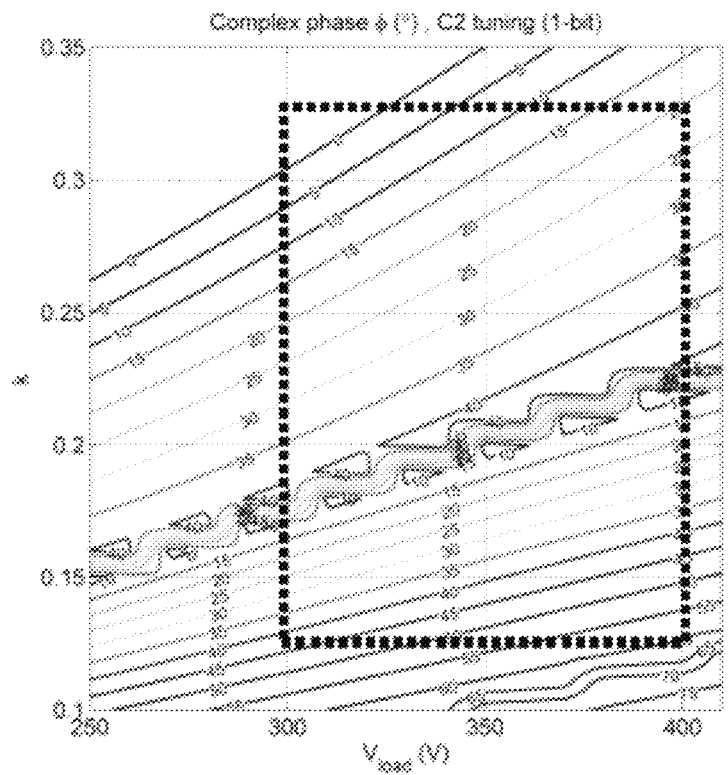
Figure 27F:
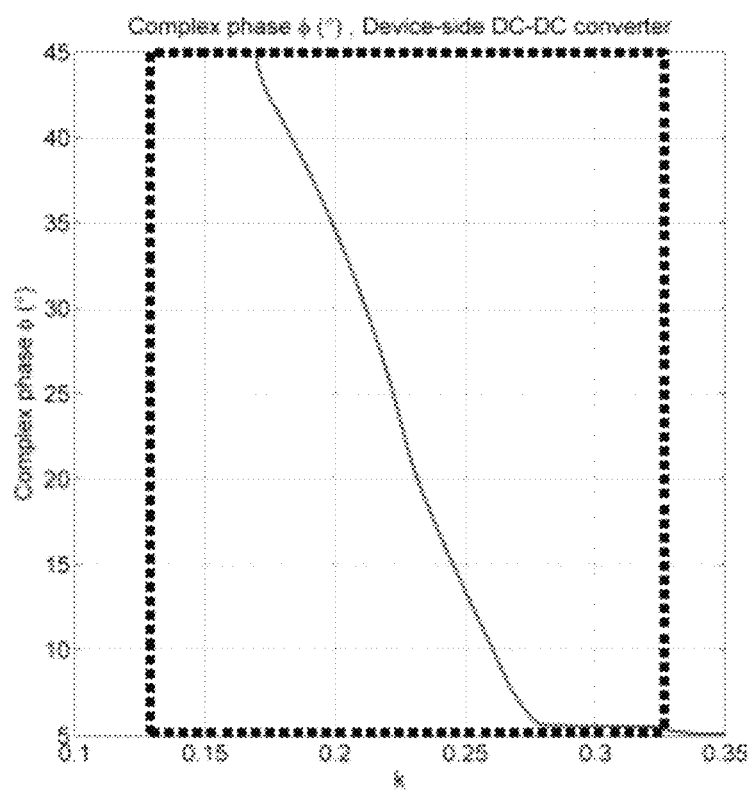

FIGS. 27A-F are plots showing values of the input phase φ for the above-described impedance matching network tuning methods. In particular, FIG. 27A shows φ values for a fixed impedance matching network with no tuning, FIG. 26B shows φ values for a fixed impedance matching network with frequency tuning in the 80-90 kHz band, FIG. 26C shows φ values for a fixed impedance matching network with frequency tuning in the 82.5-87.5 kHz band, FIG. 26D shows φ values for source-side continuous $X_3$ tuning, FIG. 26E shows φ values for source-side discrete $C_2$ tuning between two discrete values, and FIG. 26F shows φ values for a fixed impedance matching network with a DC-DC converter on the device side.

Figure 28A:
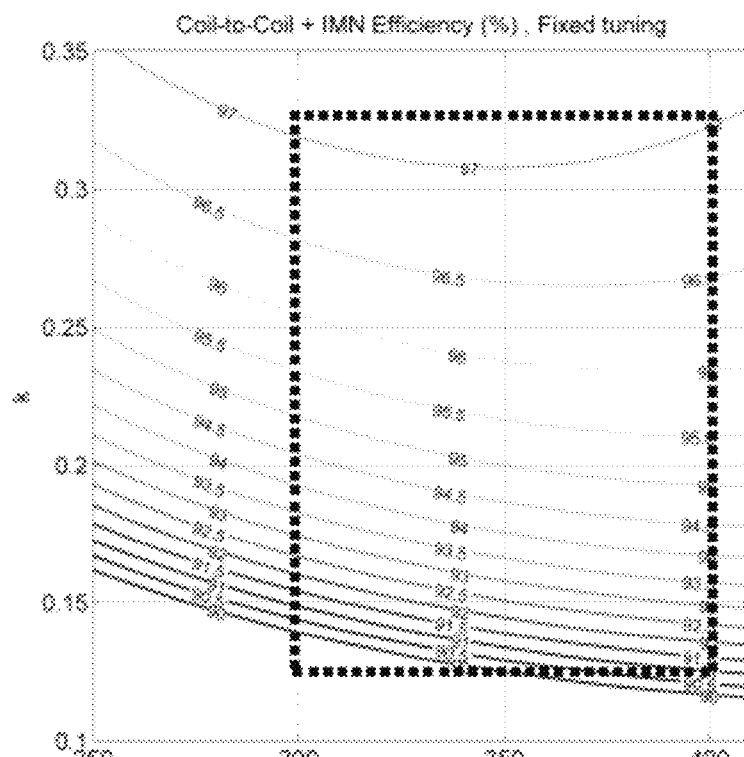
FIGS. 28A-F are plots showing values of combined coil-to-coil transmission and impedance matching network efficiency in the k-$V_{load}$ domain calculated for different tuning methods for the impedance matching network topology of FIG. 23.
Figure 28B:
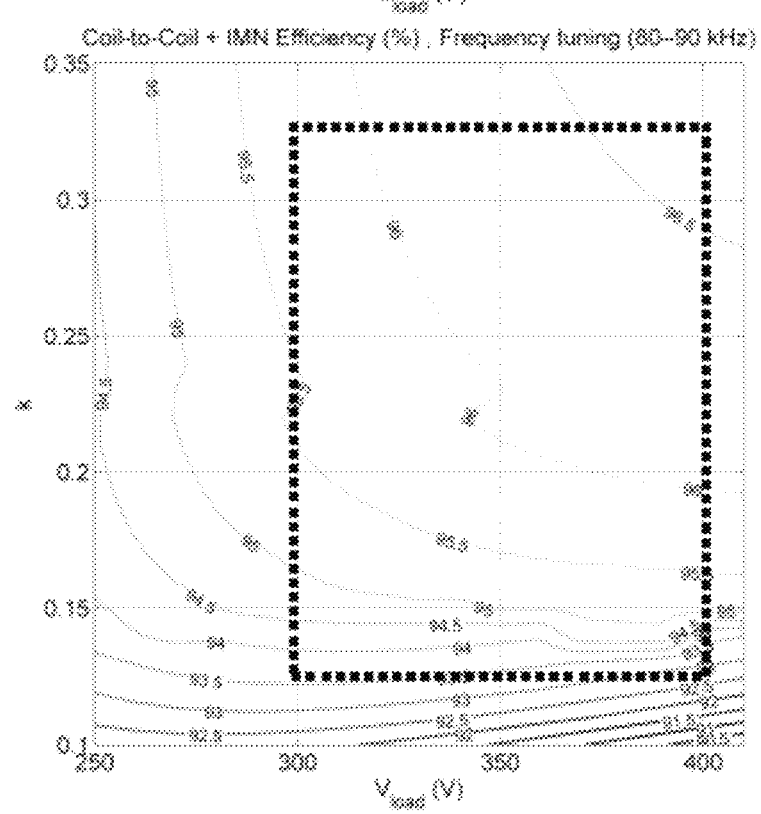
Figure 28C:
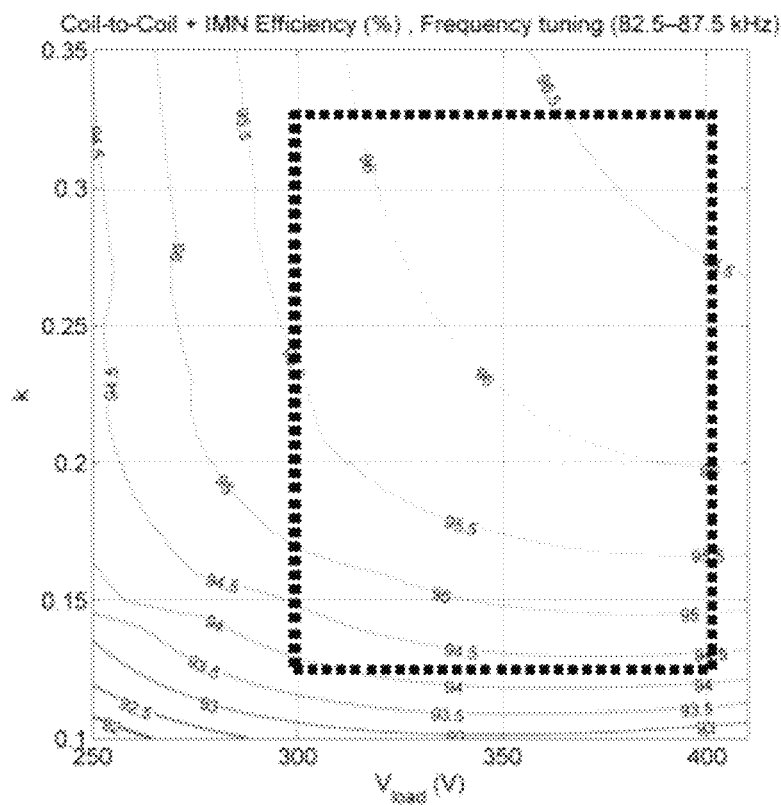
Figure 28D:
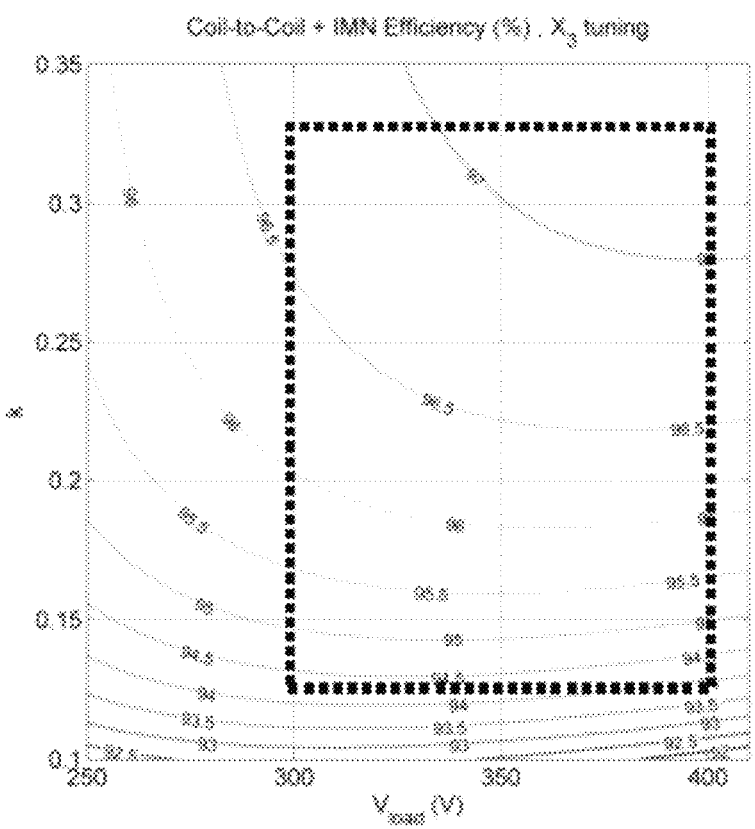
Figure 28E:
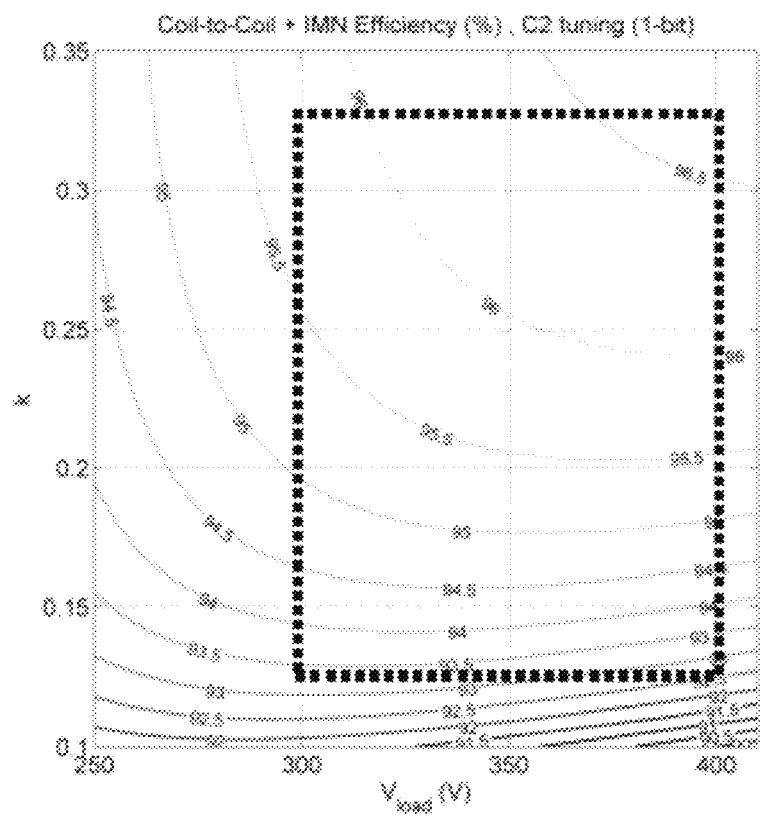
Figure 28F:
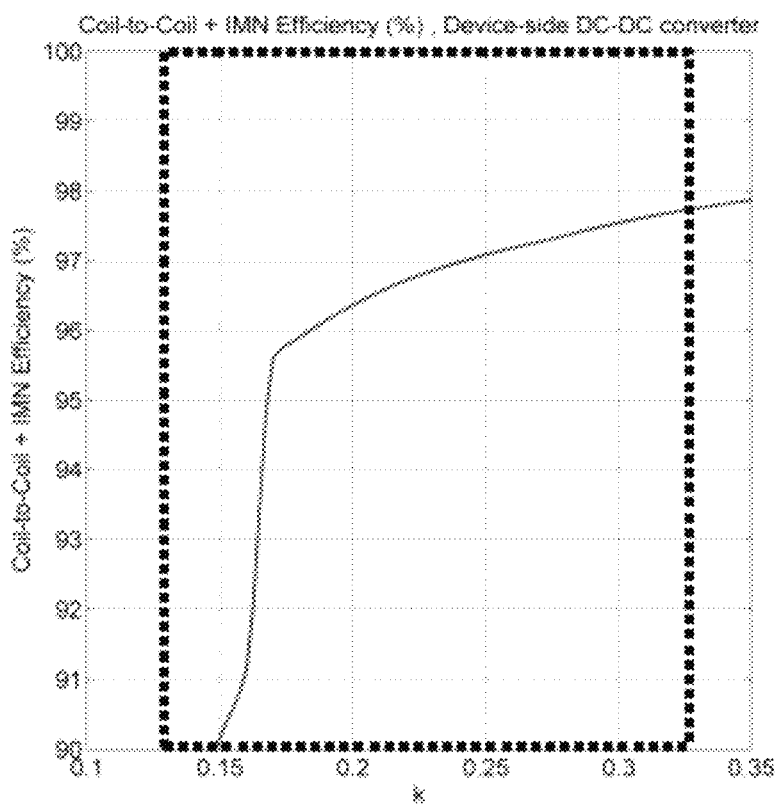

FIGS. 28A-F are plots showing values of (combined) coil-to-coil transmission and impedance matching network efficiency for the above-described impedance matching network tuning methods. The efficiency values calculated and shown in FIGS. 28A-F do not account for efficiency losses in other system components such as inverters and rectifiers. Specifically, FIG. 28A shows efficiency values for a fixed impedance matching network with no tuning, FIG. 28B shows efficiency values for a fixed impedance matching network with frequency tuning in the 80-90 kHz band, FIG. 28C shows efficiency values for a fixed impedance matching network with frequency tuning in the 82.5-87.5 kHz band, FIG. 28D shows efficiency values for source-side continuous $X_3$ tuning, FIG. 28E shows efficiency values for source-side discrete $C_2$ tuning between two discrete values, and FIG. 28F shows efficiency values for a fixed impedance matching network with a DC-DC converter on the device side. As shown in FIGS. 28B and 28C, relatively high efficiency values can be achieved by frequency tuning over a wide range of the k-$V_{load}$ domain.

Figure 29A:
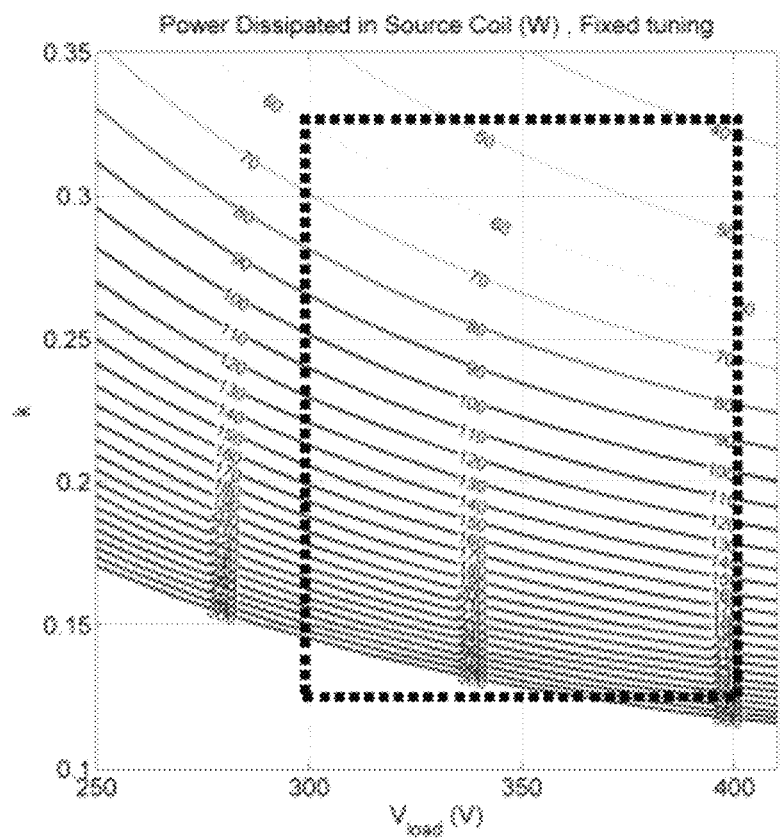
FIGS. 29A-F are plots showing values of power dissipated in the source in the k-$V_{load}$ domain calculated for different tuning methods for the impedance matching network topology of FIG. 23.
Figure 29B:
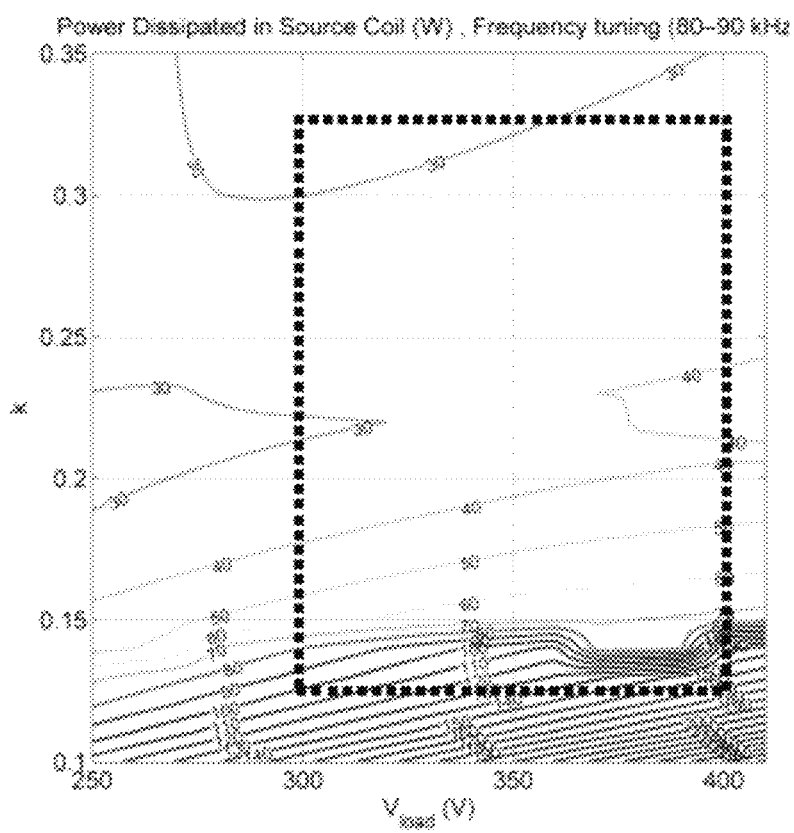
Figure 29C:
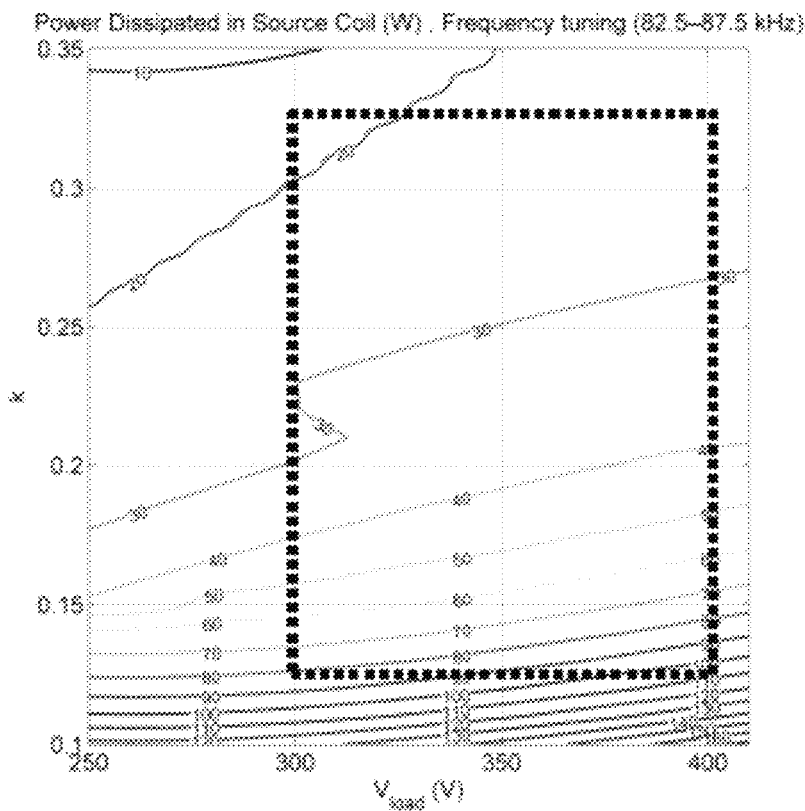
Figure 29D:
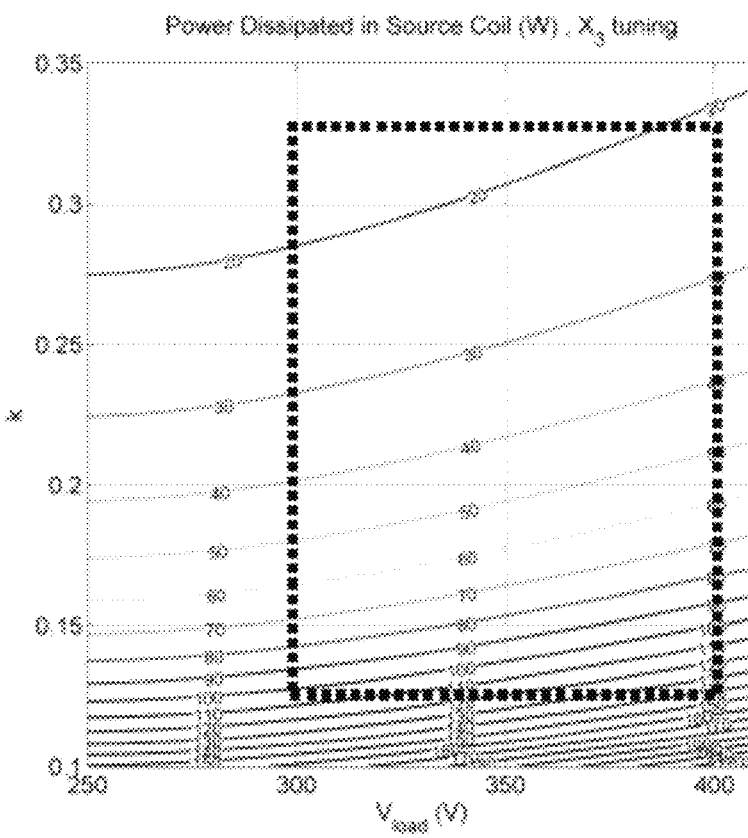
Figure 29E:
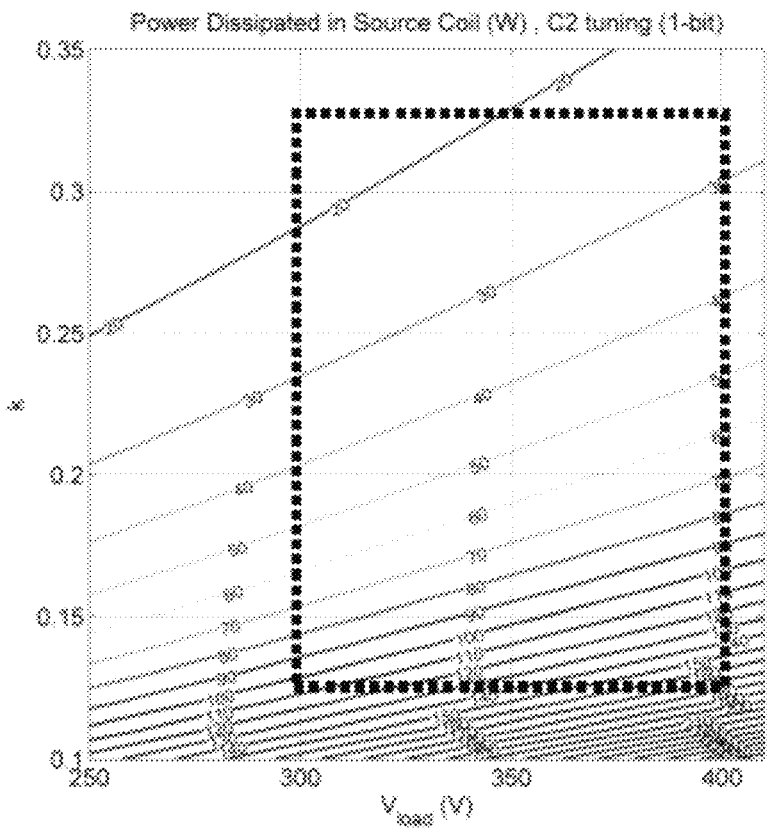
Figure 29F:
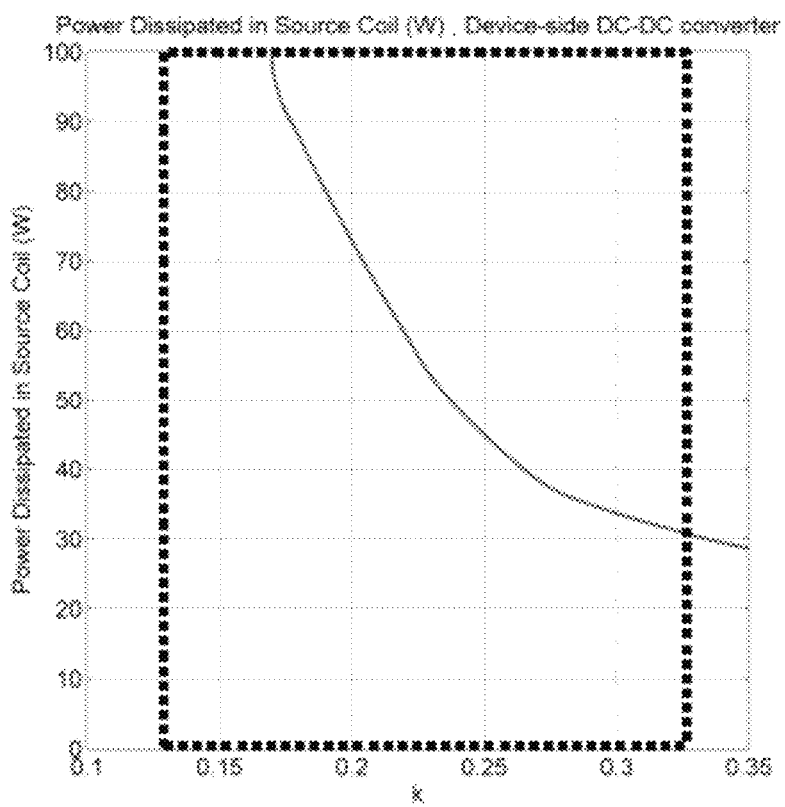

FIGS. 29A-F are plots showing values of power dissipated in the source for the above-described impedance matching network tuning methods. Specifically, FIG. 29A shows power dissipated for a fixed impedance matching network with no tuning, FIG. 29B shows power dissipated for a fixed impedance matching network with frequency tuning in the 80-90 kHz band, FIG. 29C shows power dissipated for a fixed impedance matching network with frequency tuning in the 82.5-87.5 kHz band, FIG. 29D shows power dissipated for source-side continuous $X_3$ tuning, FIG. 29E shows power dissipated for source-side discrete $C_2$ tuning between two discrete values, and FIG. 29F shows power dissipated for a fixed impedance matching network with a DC-DC converter on the device side. As shown in FIGS. 29B and 29C, power dissipation in the source can be minimized over a wide range of the k-$V_{load}$ domain by frequency tuning.

Figure 30A:
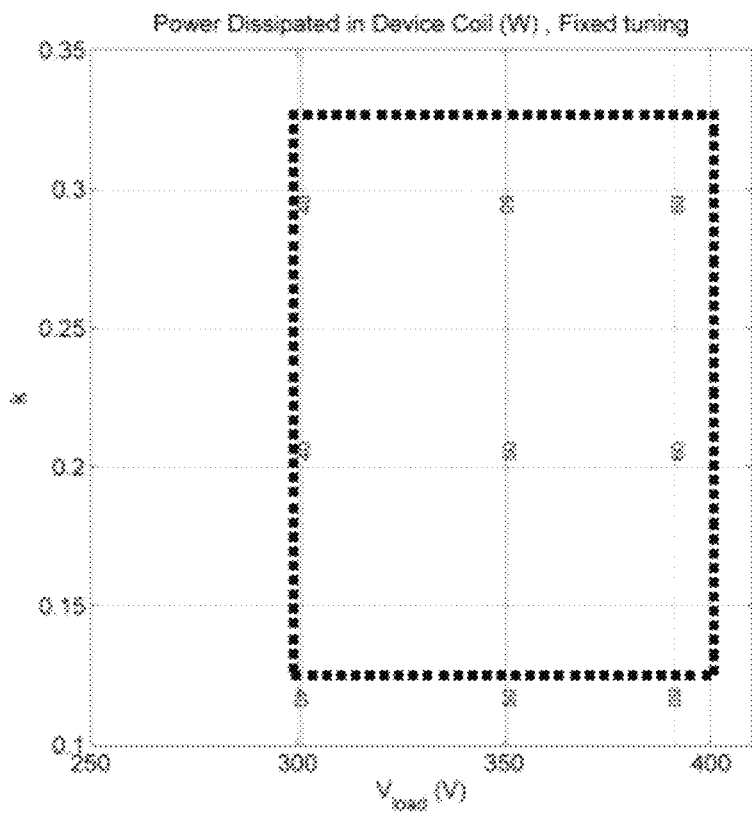
FIGS. 30A-F are plots showing values of power dissipated in the device in the k-$V_{load}$ domain calculated for different tuning methods for the impedance matching network topology of FIG. 23.
Figure 30B:
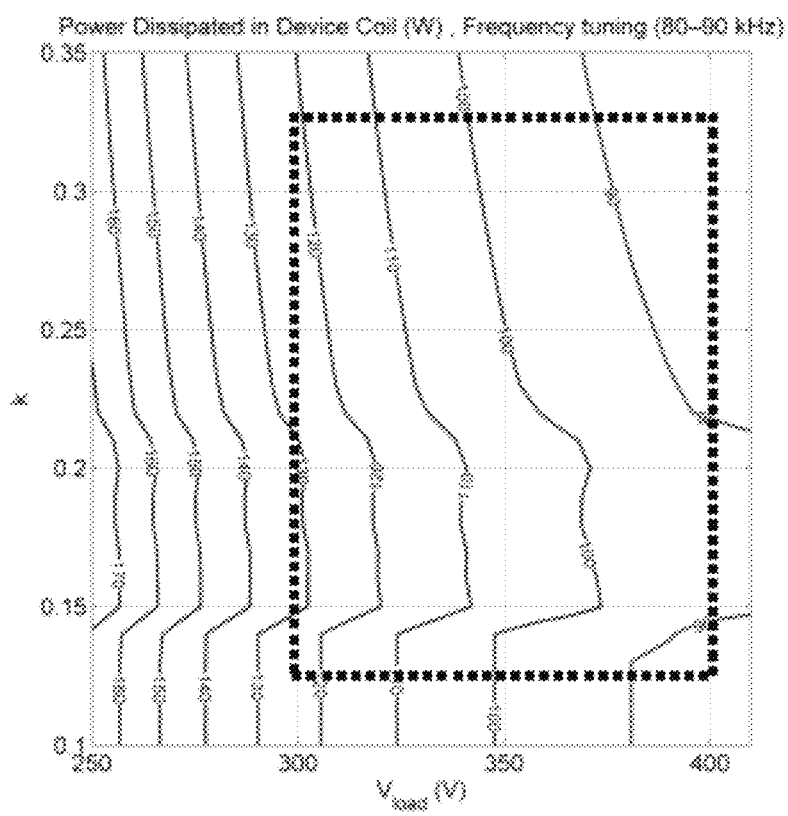
Figure 30C:
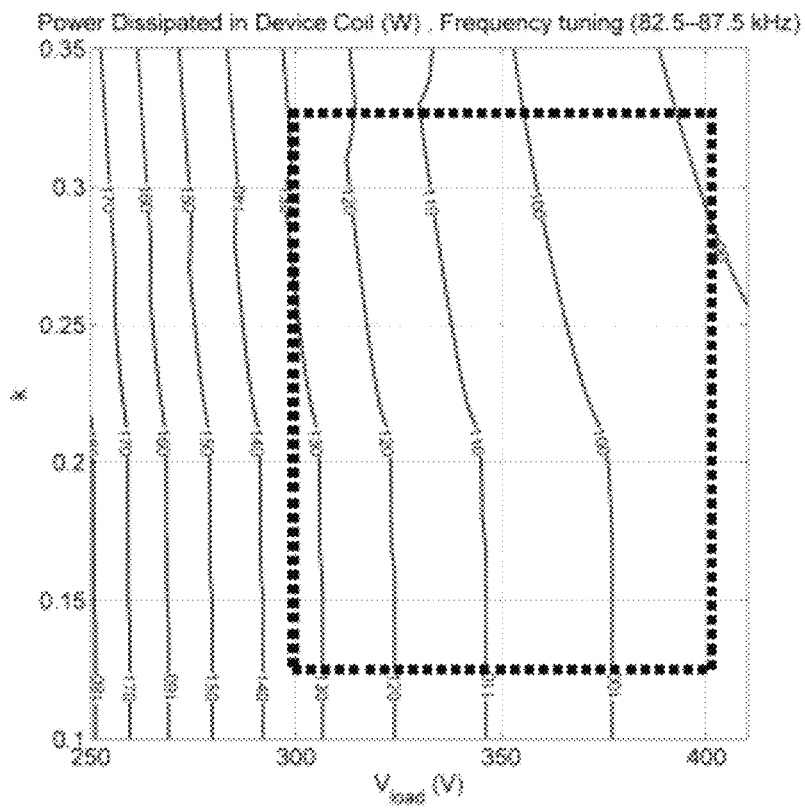
Figure 30D:
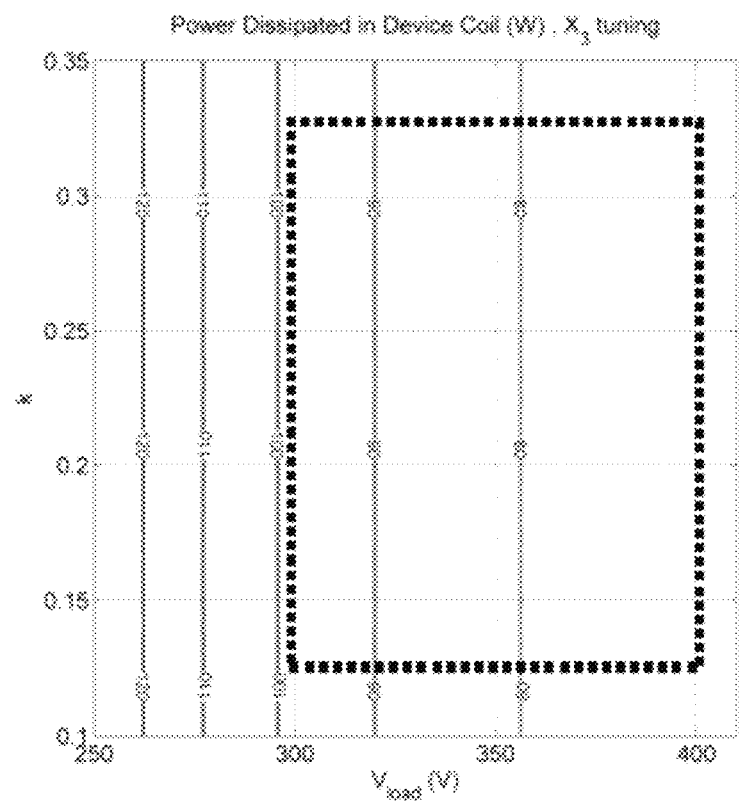
Figure 30E:
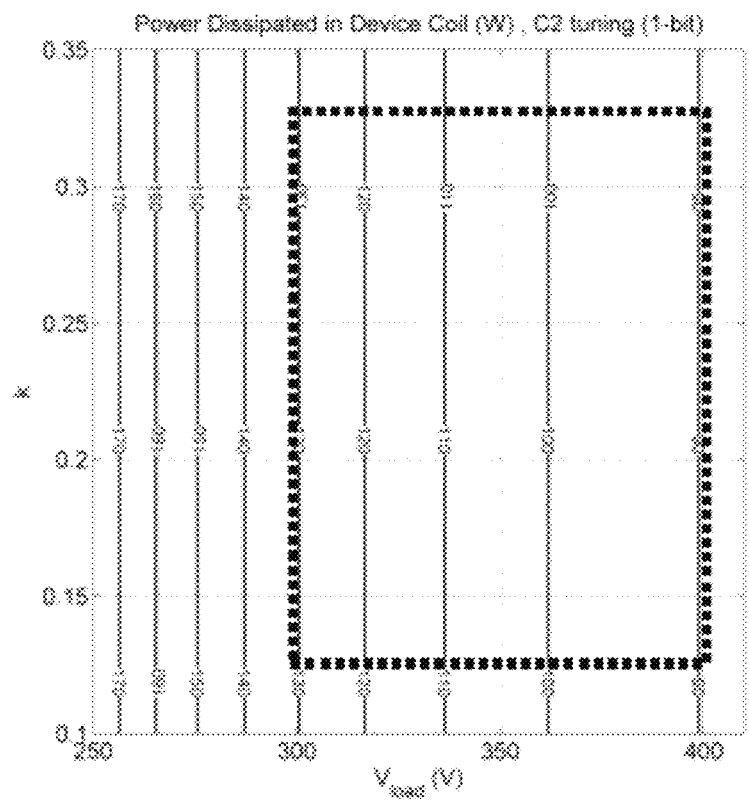
Figure 30F:
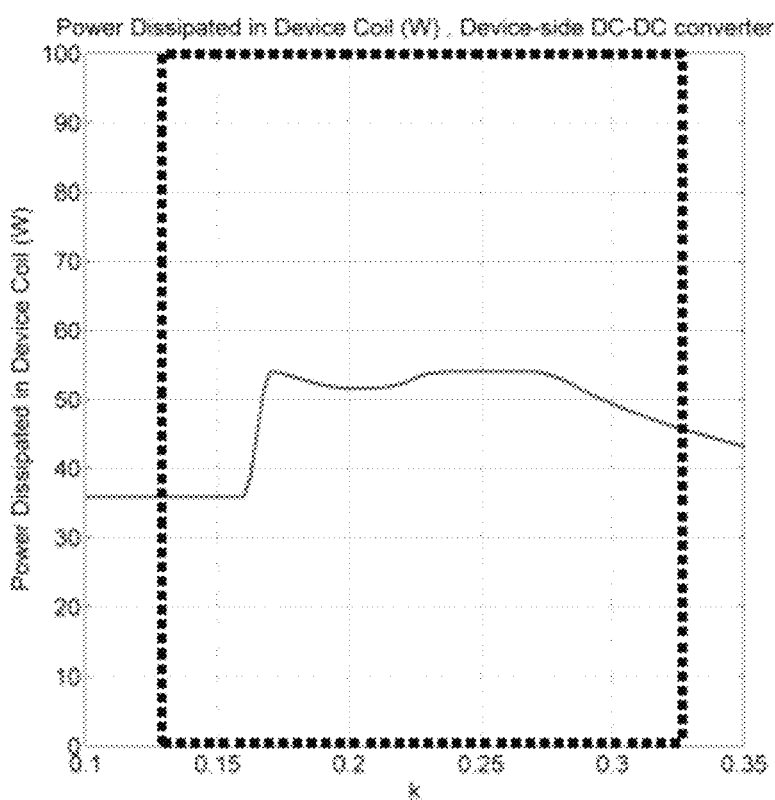

FIGS. 30A-F are plots showing values of power dissipated in the device for the above-described impedance matching network tuning methods. Specifically, FIG. 30A shows power dissipated for a fixed impedance matching network with no tuning, FIG. 30B shows power dissipated for a fixed impedance matching network with frequency tuning in the 80-90 kHz band, FIG. 30C shows power dissipated for a fixed impedance matching network with frequency tuning in the 82.5-87.5 kHz band, FIG. 30D shows power dissipated for source-side continuous $X_3$ tuning, FIG. 30E shows power dissipated for source-side discrete $C_2$ tuning between two discrete values, and FIG. 30F shows power dissipated for a fixed impedance matching network with a DC-DC converter on the device side.

Frequency Tuning in Wireless Energy Transfer Systems

Figure 31:
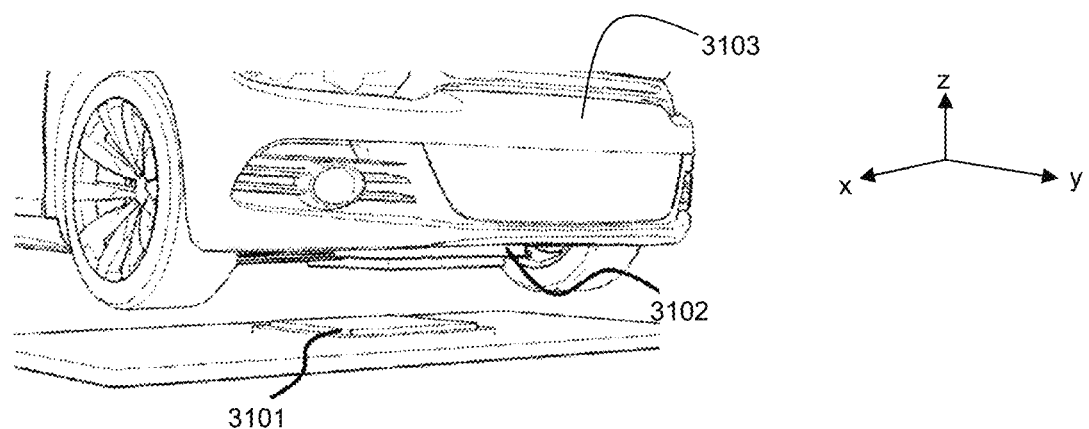
FIG. 31 is a schematic diagram of a wireless power transfer system for use with an electric vehicle.

A variety of challenges exist when providing wireless power for charging electric vehicles. FIG. 31 is a schematic diagram showing an electric vehicle 3103 with a wireless power receiver 3102 mounted to the underside of the vehicle (e.g., mounted to the vehicle chassis). A wireless power transmitter 3101 is positioned in the ground or in the floor of a structure (e.g., in a driveway or a garage) so that when vehicle 3103 is parked, power transmitter 3101 and power receiver 3102 are aligned and power can be transferred from power transmitter 3101 to power receiver 3102. Power receiver 3102 is typically connected to one or more of the vehicle's batteries and electrical systems, and wirelessly transferred power can be used to charge the vehicle's batteries and/or to power the vehicle's electrical systems.

For reference purposes, in the following discussion, the coordinate system shown in FIG. 31 is adopted unless otherwise stated. In this coordinate system, wireless power transmitter 3101 and wireless power receiver 3102 are separated along the z-direction when vehicle 3103 is parked over transmitter 3101. Vehicle 3103 can also be displaced from power transmitter 3101 along either of the x- and y-directions as well. That is, vehicle 3103 can be displaced relative to power transmitter 3101 in the plane of the ground or floor in which power transmitter 3101 is positioned. In embodiments, displacements of vehicle 3103 in any of the coordinate directions relative to power transmitter 3101 affects the efficiency with which power can be wirelessly transferred between power transmitter 3101 and power receiver 3102.

In particular, when a vehicle is parked repeatedly over power transmitter 3101, considerable variation can exist in the position of the vehicle relative to the power transmitter. As the position of the vehicle relative to power transmitter 3101 changes in the x-, y-, and z-directions, the range of output power and output voltages from power receiver 3102 changes. If vehicle 3103 is displaced sufficiently far in the x- and/or y-directions (e.g., so that power receiver 3102 is not vertically above (e.g., in the z-direction) power transmitter 101), the range of output power and output voltages from the power receiver 3102 can be limited significantly. This limits the ability of a wireless power transfer system to efficiently provide charging power to the vehicles batteries, which may require a range of voltages over a charging cycle. As an example, for a power transmitter and receiver that are aligned in the x-y plane and displaced by 12.5 cm in the z-direction, the wireless power receiver can provide full power across an output DC voltage range of 300-360 V. If the power transmitter and power receiver are displaced from one another by 6 cm in the y-direction, the wireless power receiver's DC voltage range is reduced to 300-315 V. To compensate for the reduced voltage range, DC-DC converters can be used to expand the voltage output range from the rectifier in power receiver 3102. However, the use of such converters can significantly reduce the overall efficiency of power receiver 3102.

Figure 32:
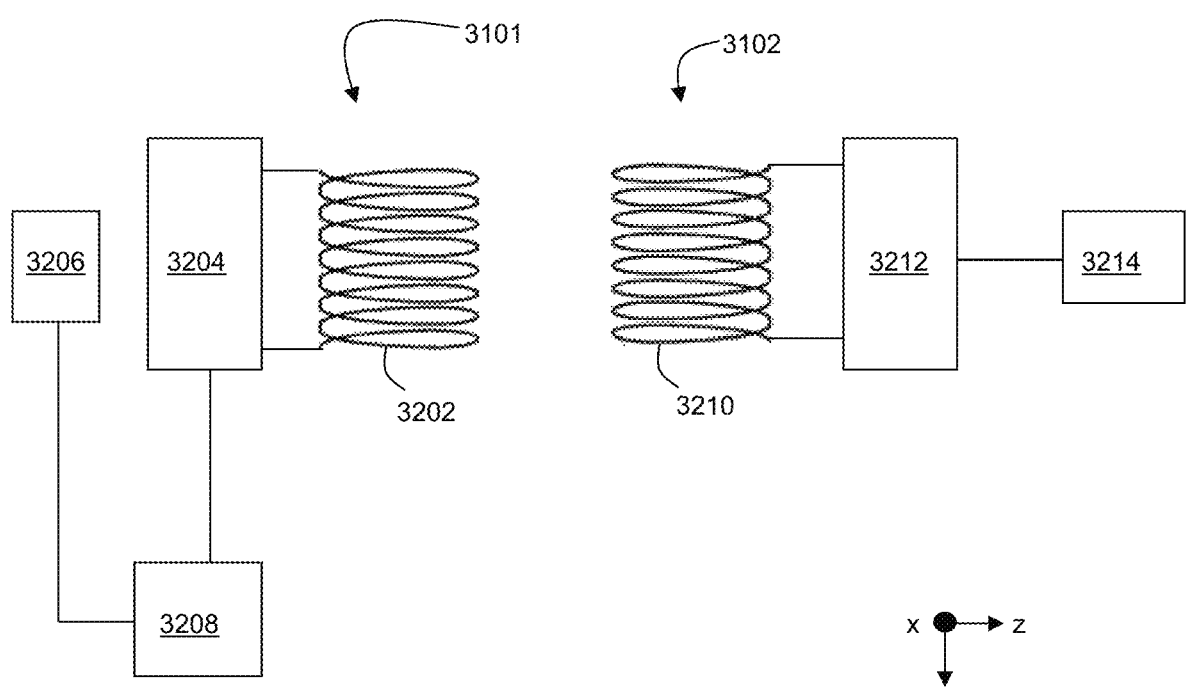
FIG. 32 is a schematic diagram of a wireless power transmitter and a wireless power receiver.

FIG. 32 is a schematic view of wireless power transmitter 3101 and wireless power receiver 3102. Wireless power transmitter 3101 typically includes one or more coils 3202 coupled to a power source 3206. As shown in FIG. 32, in some embodiments, coils 3202 can be coupled to power source 3206 through an optional impedance matching network 3204. A controller (e.g., which typically includes one or more electronic processors) is coupled to power source 3206 and impedance matching network 3204.

Wireless power receiver 3102 includes one or more coils 3210 coupled, through optional impedance matching network 3212, to a load 3214. Load 3214 can be one or more vehicle batteries, a vehicle electrical system or circuit, or any other vehicle component that draws electrical power.

Coil(s) 3202 form part of a power transmitting resonator in wireless power transmitter 3101, and coil(s) 3210 form part of a power receiving resonator in wireless power receiver 3102. During operation, power source 3206 delivers power to coil(s) 3202, which generate magnetic fields at a frequency determined by power source 1106 under the control of controller 3208. The frequency is typically chosen to be resonant with a frequency of the power receiving resonator in wireless power receiver 3102, so that the magnetic fields induce a current in coil(s) 3210, thereby delivering electrical power to load 3214.

As power transmitter 3101 and power receiver 3102 are displaced from one another in the x-, y-, and z-directions, the coupling value k between the power transmitting and power receiving resonators is reduced, and therefore the reflected impedance of the power receiving resonator connected to load 3214 that is seen by power source 3206 changes. Additionally, the load 3214 may also change during operation, for example as the battery voltage changes during the charge cycle, which may change the reflected impedance that is seen by power source 3206. Because the bus voltage within the amplifier of power source 3206 is limited to a maximum value and the current that can be supplied by the power source is limited to a maximum value, changes in the reflected impedance typically limit the range of the power and voltage that can be delivered to load 3214. For large displacements in any of the coordinate directions, certain voltages may not be achievable at load 3214, even when power source 3206 is operating at capacity.

In some vehicle charging applications, the frequency of power transfer is nominally fixed, e.g., at a value of 85 kHz. Even in fixed frequency systems, however, the reflected impedance is frequency dependent, and by changing the frequency at which power is delivered, the reflected impedance of power receiving resonator with load 3214 as seen by power source 3106 can be adjusted. Thus, by adjusting or "tuning" the frequency of power transfer between power transmitter 3101 and power receiver 3102, controller 3208 can compensate for changes in coupling that occur due to relative displacements between power transmitter 3101 and power receiver 3102 in any of the coordinate directions and for changes in load 3214, allowing higher output voltages at load 3214 to be achieved. As mentioned briefly above, maintaining a relatively wide range of output voltages at load 3214 can be important for loads such as vehicle batteries, which typically require a range of voltages over a charging cycle.

Tuning the frequency at which power is transferred can thus provide a number of significant operating advantages. For example, adjusting the frequency by as little as ±5% or less can, in some wireless power transfer systems, increase the voltage range at load 3214 by as much as 100 V. In addition, impedances as seen by the power source 3206 that would otherwise be outside the operating range of power transmitter 3101 can be changed so that they are within the operating range of the transmitter. Power transfer at displacements between power transmitter 3101 and power receiver 3102 that would otherwise have been too large for effective power transfer to load 3214 can be achieved, and existing voltage ranges at previously achievable displacements can be increased.

In some embodiments, increasing the available voltage range at load 3214 can also increase the overall system efficiency. Certain wireless power transfer systems are more efficient when operating at higher voltages. Even when such systems include a DC-DC converter, higher voltage ranges can be made accessible by frequency tuning, thereby improving system efficiency.

Figure 33:
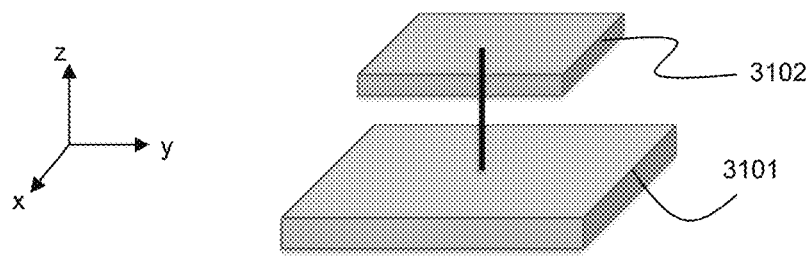
FIG. 33 is a schematic diagram of another wireless power transfer system.

FIG. 33 shows a schematic diagram of a simulated wireless power transfer system that includes a power transmitter 3101 and a power receiver 3102. At a relative displacement of 10 cm in the z-direction and ±15 cm in the x-direction, when transferring 3300 Watts the achievable voltage range at a load connected to power receiver 3102 is 340-400 V without frequency tuning, and 260-400 V with frequency tuning. At a relative displacement of 10 cm in the z-direction and ±7.5 cm in the y-direction, when transferring 3300 Watts the achievable voltage range at a load connected to power receiver 3102 is 340-400 V without frequency tuning, and 260-400 V with frequency tuning.

For a relative displacement of 12.5 cm in the z-direction and a relative displacement of ±12.5 cm in the x-direction, when transferring 3300 Watts the voltage range without frequency tuning is 300-315 V, and the voltage range with frequency tuning is 260-400 V. When the displacement in the x-direction is smaller (e.g., ±10 cm or less), when transferring 3300 Watts the voltage range without frequency tuning is 300-360 V, and the voltage range with frequency tuning is 260-400 V.

For a relative displacement of 12.5 cm in the z-direction and ±6 cm in the y-direction, when transferring 3300 Watts the voltage range without frequency tuning is 300-360 V, and the voltage range with frequency tuning is 260-400 V. When the displacement in the y-direction is smaller (e.g., ±4.5 cm or less), when transferring 3300 Watts the voltage range without frequency tuning is 300-360 V, and the voltage range with frequency tuning is 260-400 V.

For even larger relative displacements of 15 cm in the z-direction, no voltage range for displacements of ±12.5 cm or ±10 cm in the x-direction is achievable without frequency tuning, but frequency tuning allows voltage ranges of 260-350 V and 260-400 V to be achieved, respectively, when transferring 3300 Watts. For smaller displacements in the x-direction (e.g., ±5 cm or less), when transferring 3300 Watts the voltage range without frequency tuning is 260-270 V, and the voltage range with frequency tuning is 260-400 V.

For relatively displacements of 15 cm in the z-direction and ±6 cm or ±4.5 cm in the y-direction, no voltage range is achievable without frequency tuning, but voltage ranges of 260-350 V and 260-400 V, respectively, when transferring 3300 Watts can be achieved with frequency tuning. For smaller displacements in the y-direction (e.g., ±3 cm or less), a voltage range of 260-270 V can be attained without frequency tuning when transferring 3300 Watts. The voltage range with frequency tuning is 260-400 V.

The foregoing measurement results demonstrate that the output voltage range in wireless power transfer systems can be significantly expanded using frequency tuning techniques. In some embodiments, these techniques even permit wireless power transfer where it would not otherwise occur due to relatively large displacements between the power transmitter and receiver. Considered another way, the use of frequency tuning methods permits a wider range of alignment tolerances between the power transmitter and receiver in a wireless power transfer system. Flexibility with regard to alignment tolerances can be particularly important in vehicle charging applications, where the alignment between the power transmitter and receiver varies frequently.

Figure 34:
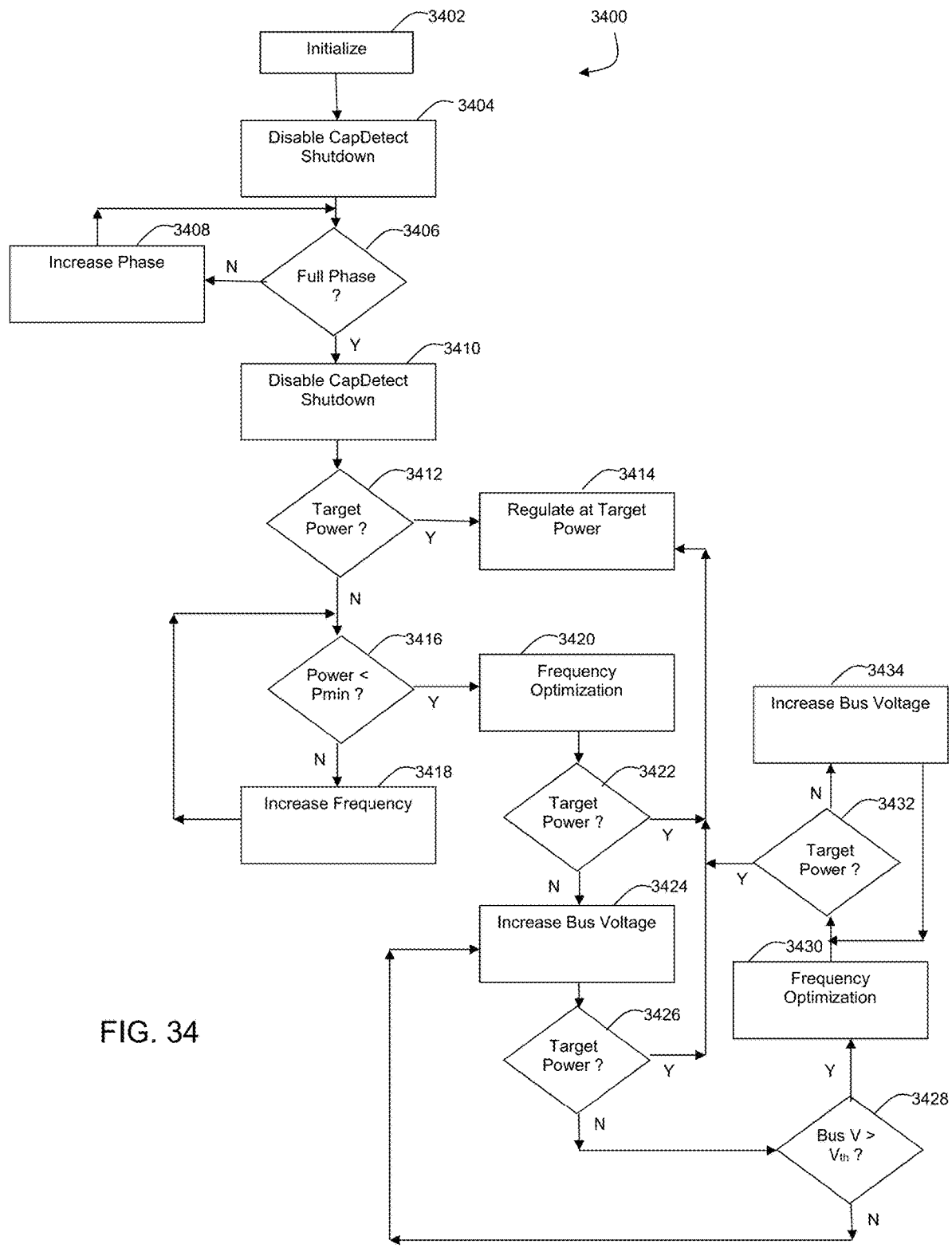
FIG. 34 is a flow chart showing a series of steps for implementing frequency tuning in wireless power transfer systems.

FIG. 34 shows a flow chart 3400 that includes a series of example steps for implementing frequency tuning in wireless power transfer systems. Not all steps are required in flow chart 400; the example is shown only to illustrate a functional implementation of frequency tuning. In embodiments, a controller (e.g., controller 3208) performs the steps shown in FIG. 34. In some embodiments, controller 3208 can perform the steps automatically with no feedback or input from a human operator.

The frequency tuning methods disclosed herein typically use a measured signal, which will be referred to subsequently as the "CapDetect" signal, for feedback during frequency adjustment. The CapDetect signal—which can be used to determine whether the wireless power transfer system is operating in a capacitive mode, i.e., the impedance seen by the power source has a negative reactance, —corresponds to the measured time between the switching edge of the amplifier in power source 3206 and the zero crossing of the output resonant current from the amplifier. In other words, the CapDetect signal corresponds to the phase difference between the voltage and current output signals from power source 3206. In embodiments, a wireless power transmitter is configured for operation at a range of different CapDetect values for a particular frequency. When the measured CapDetect signal falls outside the allowable range of values, controller 3208 can be configured to shut down the wireless power transmitter (e.g., to prevent damage to internal components from overheating).

Figure 35:
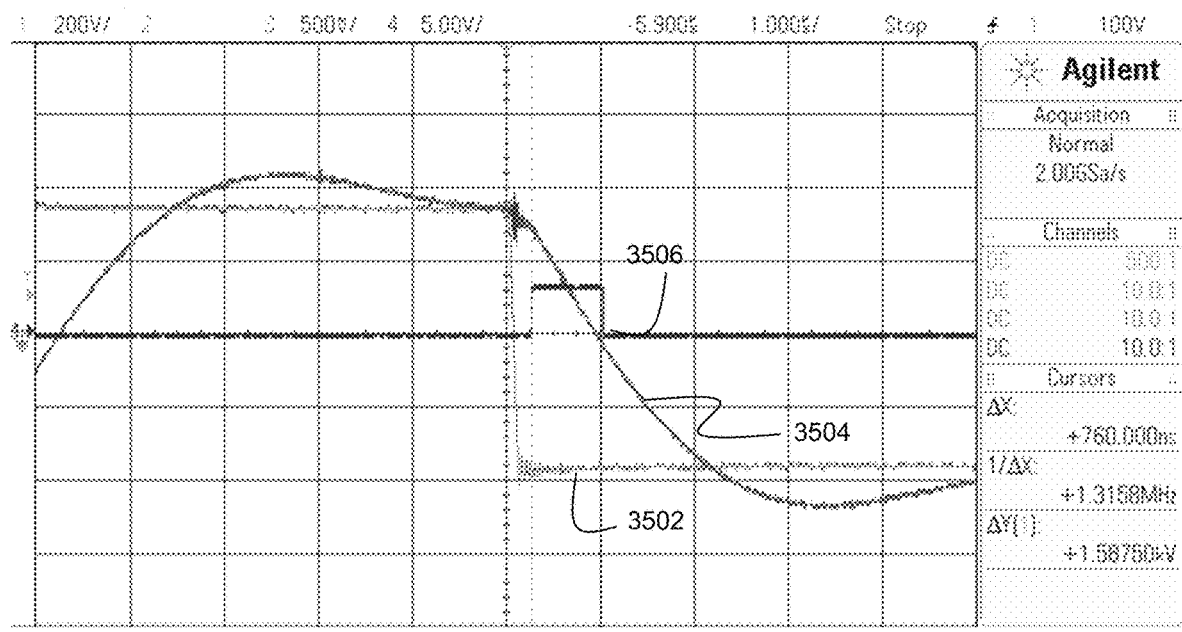
FIG. 35 is a graph showing measured voltage, current, and phase difference waveforms in a power source of a wireless power transmission apparatus.

FIG. 35 shows a series of measured signals from a wireless power transmitter. In particular, signal 3502 corresponds to the output voltage from the amplifier in power source 3206, signal 3504 corresponds to the output current from the amplifier, and signal 3506 is the measured CapDetect signal corresponding to the phase difference between signals 3502 and 3504.

Returning to FIG. 34, in a first step 3402, the wireless power transfer system is initialized for frequency tuning. Initialization can include, for example, setting power transmitter to operate at a minimum frequency (e.g., a minimum frequency of 81.38 kHz for 85 kHz systems), setting the amplifier power control phase to a minimum value (e.g., reducing to a minimum power output from power source 32), and/or setting power source 3206 to operate at a minimum internal bus voltage.

Next, in step 3404, the shutdown check procedure—which is based on the measured value of the CapDetect parameter—is disabled, if it exists. Then, in step 3406, the power control phase in power source 3206 is checked to determine whether it is a maximum value. If the power control phase is not at a maximum value, the power control phase is increased at step 3408, and the power control phase is checked again in step 3406 to determine whether it is now at a maximum value. If instead the power control phase is already maximized, the CapDetect-based shutdown check procedure is re-enabled at step 3410.

Then, at step 3412, the power output is measured to determine whether the power transmitter is delivering a target amount of power to a load (e.g., load 3214 connected to a wireless power receiver 3102). If the target output power level has been reached, control passes to step 3414, and controller 3208 regulates power source 3206 at the target power level. If the target output power level has not been reached, then in step 3416, controller 3208 determines whether the output power is greater than a pre-determined minimum power level $P_{min}$ (which can be, for example, 500 W). If the output power level is less than $P_{min}$, controller 3208 increases the frequency of the oscillating magnetic field generated by power transmitter 3101 (e.g., by increasing the frequency of the current delivered to coil(s) 3202), and control returns to step 3416, where the output power level is checked again.

After the output power level is larger than $P_{min}$, the frequency of the field is optimized in step 3420. This optimization step will be discussed in greater detail subsequently.

Next, the output power at the optimized frequency is measured in step 3422 and compared to the target output power. If the output power level matches the target power level, control passes to step 3414 and the output power is regulated by controller 3208 at the target level. Otherwise, controller 3208 increases the bus voltage in power source 3206 in step 3424, and the output power level is again measured and compared to the target power level in step 3426. If the target power level has been reached, control passes to step 3414.

If the target power level has not been reached, controller 3208 checks the bus voltage in step 3428 to determine whether it is greater than a pre-determined threshold bus voltage $V_{th}$ (e.g., in some embodiments, $V_{th}$ can be 400 V). If the bus voltage remains less than $V_{th}$, then the bus voltage is again increased when control passes to step 3424. If instead the bus voltage has reached $V_{th}$, then another frequency optimization is performed at step 3430.

Following step 3430, the output power is again measured and compared to the target output power level in step 3432. If the target power level has been reached, control passes to step 3414. Otherwise, controller 3208 increases the bus voltage at step 3434, and control returns to step 3432.

Figure 36:
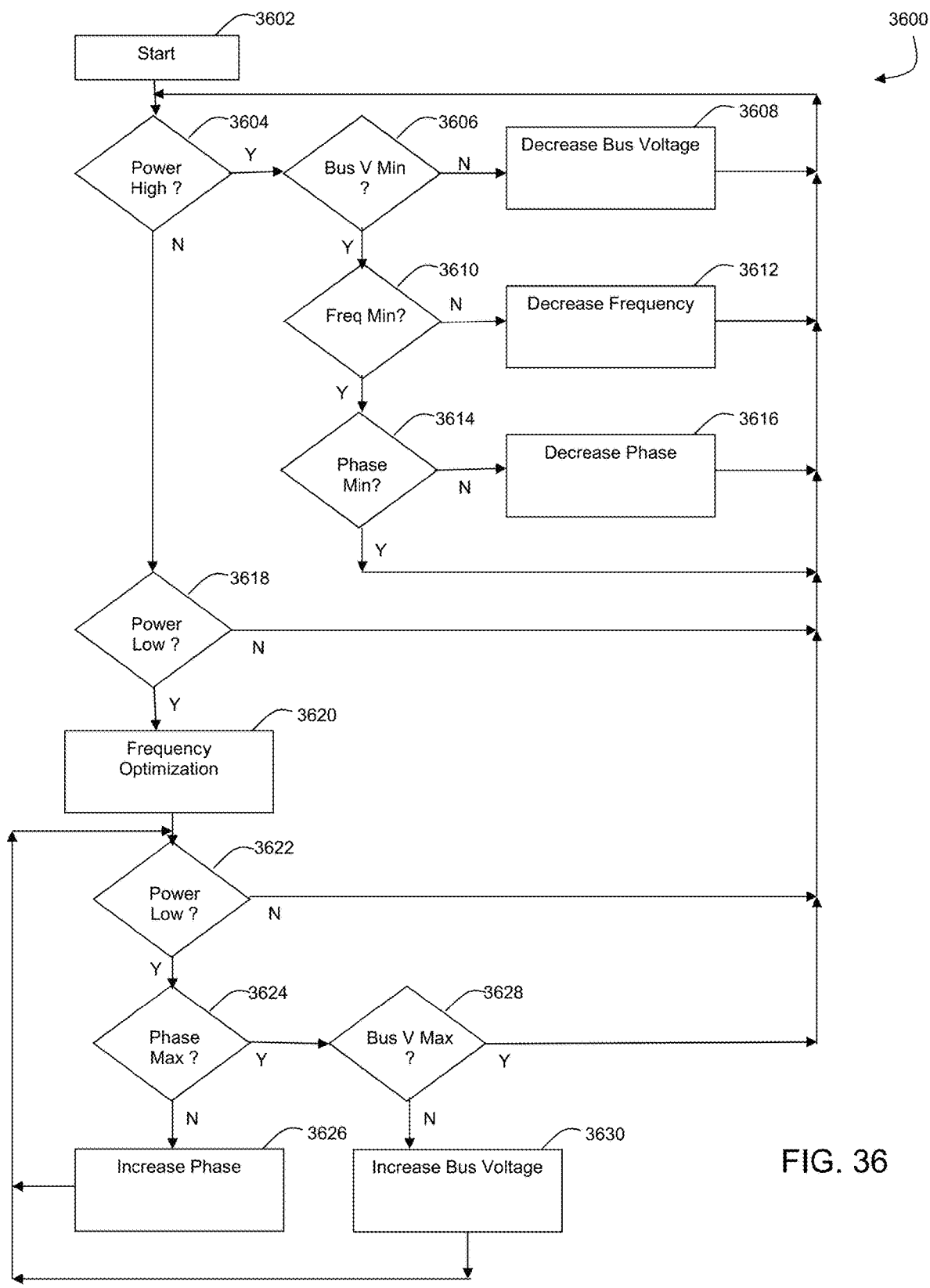
FIG. 36 is a flow chart showing a series of steps for regulating the output power of a wireless power transfer system at a pre-determined power level.

FIG. 36 is a flow chart 3600 showing a series of steps for regulating the output power at a pre-determined power level (e.g., within ±100 W of a target output power level). The procedure begins in step 3602 and controller 3208 checks the output power level in step 3604 to determine whether it is higher than a pre-determined maximum power level. If it is higher, controller 3208 checks the bus voltage in step 3606 to determine whether it is at a minimum value. If it is larger than the minimum value, the bus voltage is reduced in step 3608 and control returns to step 3604.

Alternatively, if the bus voltage is at the minimum value, then controller 3208 checks the frequency to determine whether it has reached a minimum value. If not, the frequency is reduced in step 3612 and control returns to step 3604. If the frequency has instead reached a minimum pre-determined value, then controller 3208 checks to determine whether the power control phase has reached a minimum value in step 3614. If the power control phase has not reached the minimum value, then the power control phase is reduced in step 3616. Control then returns to step 3604 from either step 3614 or step 616.

If the output power has not exceeded the maximum value in step 3604, then the output power level is checked to determine whether it has exceeded a pre-determined minimum value in step 3618. If it has not, then control returns to step 3604. But if the output power has fallen below the minimum value, then a frequency optimization step occurs in step 3620. Next, in step 3622, the output power at the optimized frequency is checked against the pre-determined minimum value. If the power is no longer lower than the minimum value, control returns to step 3604. However, if the output power remains low, then control passes to step 3624 and controller 3208 checks to determine whether the maximum power control phase value has been reached.

If the power control phase is not yet at a maximum value, the power control phase is reduced in step 3626, and control returns to step 3622. Alternatively, if the maximum power control phase value has been reached, then controller 3208 checks to determine whether a pre-determined maximum bus voltage has been reached in step 3628. If the bus voltage is less than the maximum bus voltage, the bus voltage is increased at step 3630 and control returns to step 3622. If the maximum bus voltage has been reached in step 3628, control returns to step 3604.

Figure 37:
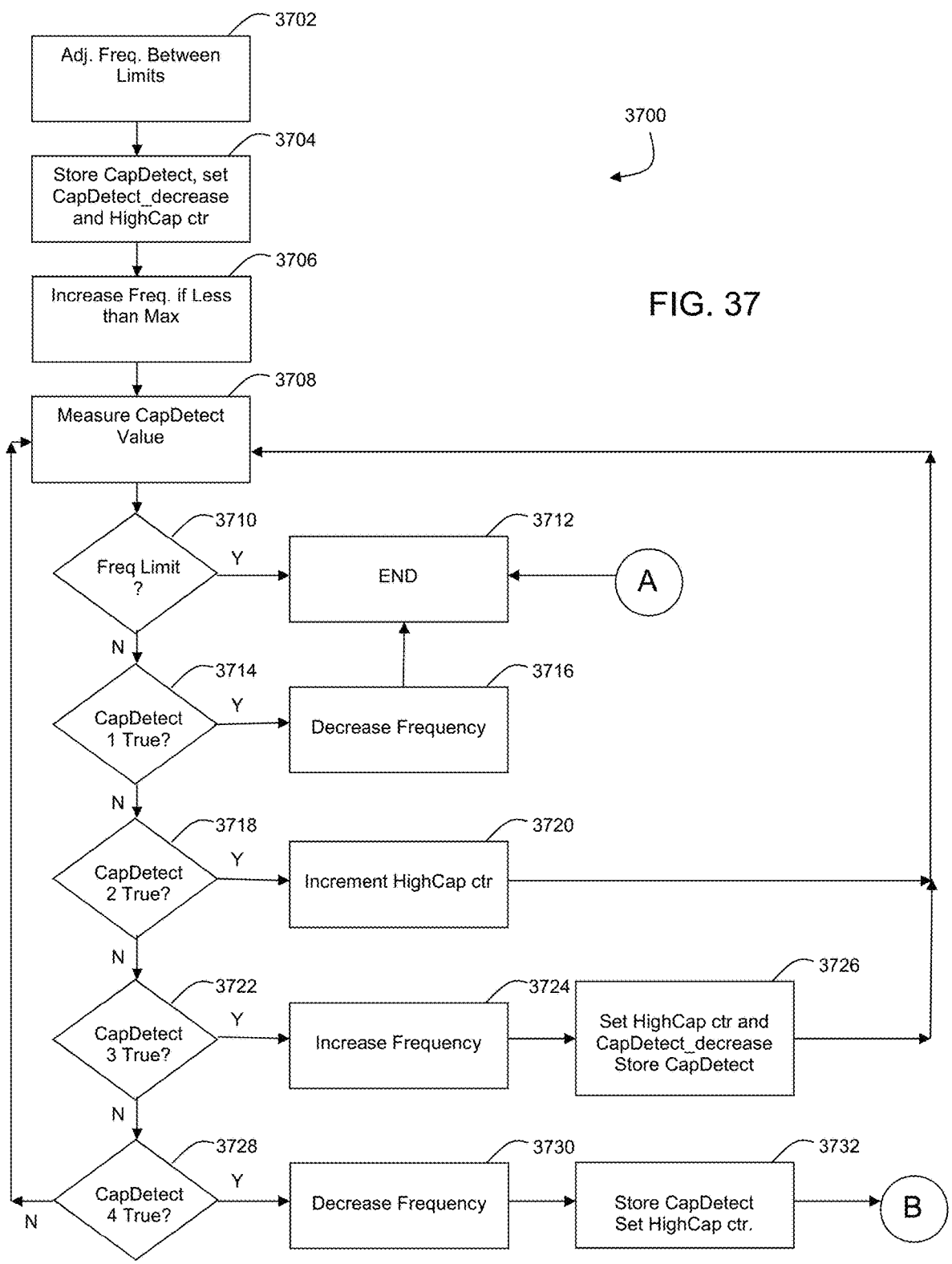
FIG. 37 is a flow chart showing a series of steps for implementing frequency optimization in wireless power transfer systems.
Figure 37:
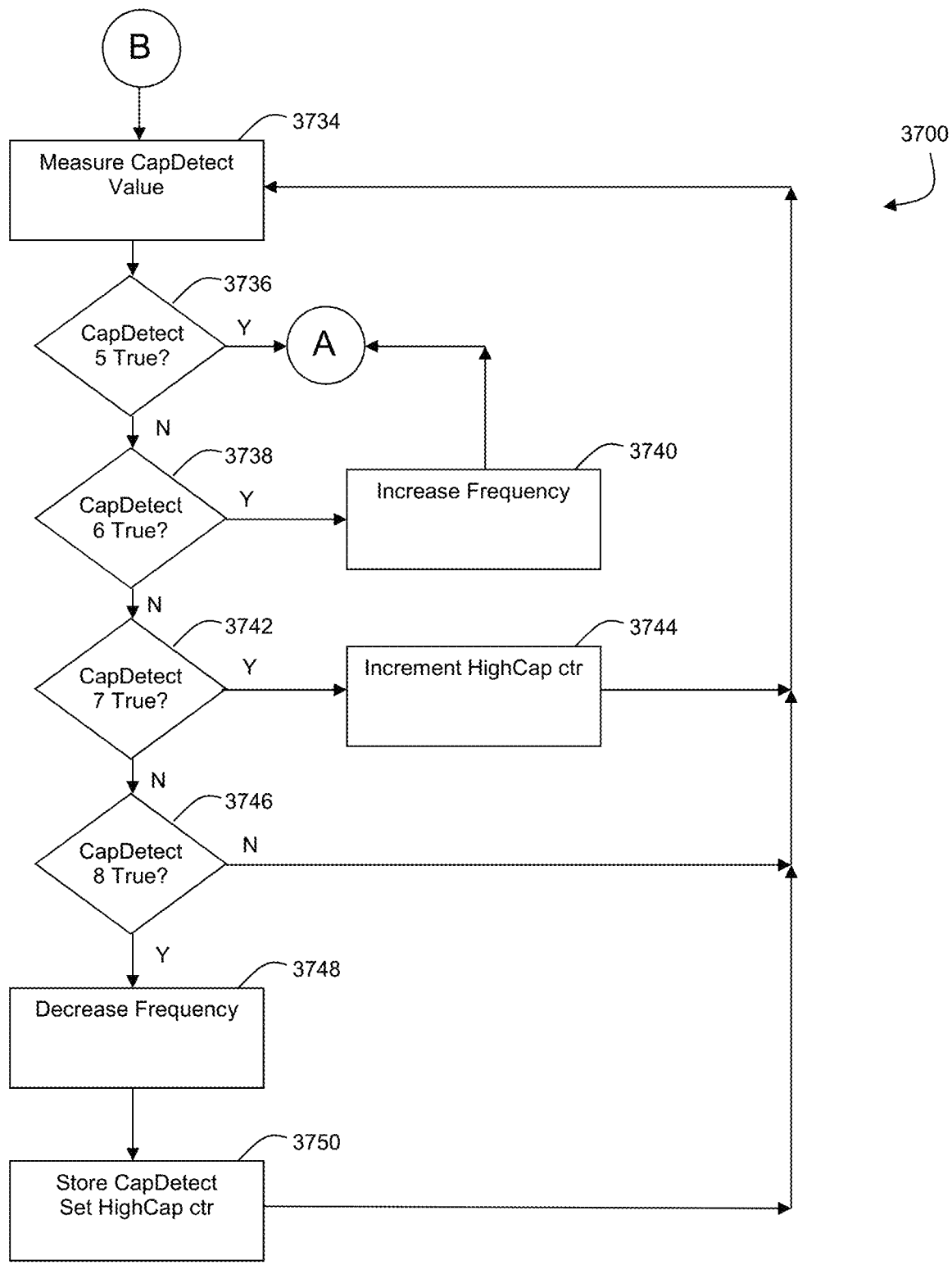

Flow charts 3400 and 3600 both include frequency optimization steps. FIG. 37 shows a flow chart 3700 that includes a series of steps for optimizing the frequency at which magnetic fields are generated by power transmitter 3101 (and therefore, the frequency at which power is delivered to load 3214 connected to power receiver 3102).

In embodiments, the procedure shown in flow chart 3700 optimizes the frequency by slowing increasing the frequency and measuring the corresponding value of the CapDetect parameter, until the point where the measured value of CapDetect passes through a clear minimum value. At that point, the procedure terminates, as the frequency setting that generates a minimum CapDetect value has been determined.

In step 7302, controller 3208 ensures that the frequency is between pre-determined minimum and maximum values by adjusting the frequency to be equal to the minimum value if it is currently smaller, and adjusting the frequency to be equal to the maximum value if it is currently larger. Next, in step 3704, controller 3208 stores the current CapDetect value, sets a flag (hereinafter the "CapDetect_decrease" flag) to a value of false to indicate that the CapDetect value has not decreased, and sets a counter (hereinafter the "High-Cap" counter)—which counts the number of times that the value of CapDetect has exceeded a pre-determined high value limit—to a value of zero.

Next, in step 3706, controller 3208 increases the frequency if it is less than the maximum pre-determined value. Then the value of CapDetect is measured in step 3708, and in step 3710, controller 3208 checks to determine whether the pre-determined high frequency limit has been reached, which includes determining whether the current value of CapDetect is less than or equal to the immediate previously measured value, and whether the current frequency has reached the maximum frequency value, and whether the HighCap counter has exceeded a limiting value (e.g., 3). If true, the procedure terminates at step 3712.

Otherwise, in the next step 3714, controller 3208 performs a "CapDetect 1" check that includes determining whether the current value of CapDetect is larger than the immediate previously measured value, and the value of the CapDetect_decrease flag is true, and whether the HighCap counter has exceeded the limiting value. If true, the frequency is reduced at step 3716 and the procedure terminates.

The procedure otherwise continues at step 3718, where controller 3208 performs a "CapDetect 2" check that includes determining whether the current value of CapDetect is larger than the immediate previously measured value, and whether the HighCap counter is less than or equal to the limiting value. If true, HighCap counter is increased at step 3720, and control returns to step 3708.

If the CapDetect 2 check returns a false value, controller 3208 performs a "CapDetect 3" check at step 3722, which includes determining whether the current CapDetect value is less than or equal to the immediate previously measured value, and the current frequency is less than the pre-determined maximum frequency value. If true, controller 3208 increases the frequency at step 3724 and, at step 3726, sets HighCap counter to zero, sets the CapDetect_decrease flag to true, and stores the current CapDetect value. Control then returns to step 3708.

If the CapDetect 3 check returns a false value, then controller 3208 performs a "CapDetect 4" check at step 3728, which includes determining whether the current CapDetect value is larger than the immediate previously measured value, and whether the measured CapDetect has decreased (i.e., whether CapDetect_decrease is false), and whether the HighCap counter is larger than the limiting value. If true, the frequency is reduced at step 3730, and at step 3732, the value of CapDetect is stored and HighCap counter is set to zero.

Control then passes to step 3734, where controller 3208 again measures the CapDetect value. In step 3736, controller 3208 performs a "CapDetect 5" check, which includes determining whether the current CapDetect value is less than or equal to the immediate previously measured value, and whether the current frequency is less than the pre-determined minimum frequency, and the HighCap counter has exceeded the limiting value. If true, the procedure terminates.

If false, controller 3208 performs a "CapDetect 6" check at step 3738, which includes determining whether the current CapDetect value is greater than the immediate previously measured value, and whether the HighCap counter is greater than the limiting value. If true, the frequency is increased at step 3740, and the procedure terminates.

Otherwise, controller 3208 performs a "CapDetect 7" check at step 3742, which includes determining whether the current CapDetect value is greater than the immediate previously measured value, and whether the HighCap counter is less than or equal to the limiting value. If true, the HighCap counter is incremented in step 3744, and control returns to step 3734.

If false, controller 3208 performs a "CapDetect 8" check at step 3746, which includes determining whether the current CapDetect value is less than or equal to the immediate previously measured value, and whether the current frequency is greater than the pre-determined maximum frequency value. If false, control returns to step 3734.

If true, the frequency is decreased at step 3748, and then at step 3750, controller 3208 stores the CapDetect value and sets the HighCap counter to zero. Control then returns to step 3734.

Thus, by measuring the value of CapDetect (that is, the phase difference between the output voltage and current signals produced by power source 3206), the frequency at which power is delivered can be tuned. As discussed above, tuning the frequency allows relative displacements between power transmitter 3101 and power receiver 3102 to be compensated, which is particularly useful in vehicle charging applications.

In addition, frequency tuning allows for a significant increase in the output voltage range delivered to a load connected to power receiver 3102. Operating with a wider output voltage range can increase the efficiency of the wireless power transfer system. Further, operating with a wider output voltage range can permit delivery of power to certain types of loads—such as vehicle batteries—that typically demand a range of voltages during power consumption or during a charging cycle.

Frequency Tuning and Figure of Merit

In wireless power transfer systems, nonlinear optimizations can be performed to select certain system components to maximize a figure of merit (FOM) defined for the system. The FOM is a numerical value that is zero or small if certain system requirements are not satisfied (e.g., voltages or phases that are not within specified ranges). Otherwise, the FOM may represent a measure of efficiency of the system. Other system parameters that may be important for particular systems, such as currents or voltages on components such as capacitors, inductors, diodes, electronic switches, etc., may also be included in the definition of FOM. As discussed previously, in general, the FOM is evaluated and optimized in a two-dimensional k-$V_{load}$ space (that is, a space defined by a coordinate system in the magnetic coupling coefficient, k, between source and receiver resonators, and the voltage at the load coupled to the receiver resonator). Various system variables can change in k-$V_{load}$ space. For example, resonator inductances can change as a function of k. These changes can be incorporated into the FOM optimization because the FOM is evaluated at each point in the space.

Figure 38:
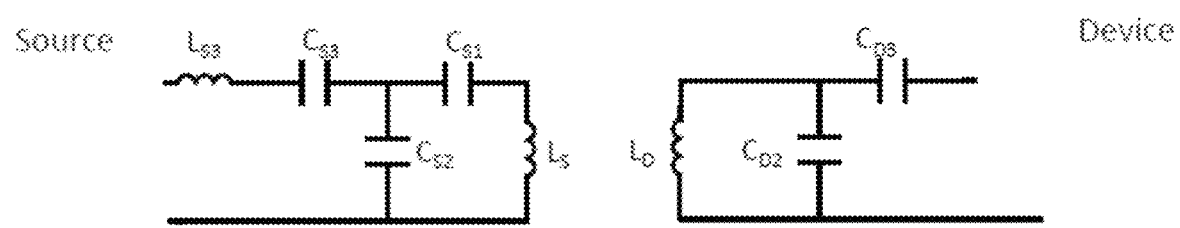
FIG. 38 is a schematic diagram showing example impedance matching networks in a wireless power transfer system.

To evaluate FOM, impedance matching network topologies are selected and various system parameters and constraints are defined. For example, a C1/C2/C3/L3 matching network can be used in the power transmission apparatus (the "Source" network) and a C2/C3 matching network can be used in the power receiving apparatus (the "Device" network), as shown in FIG. 38. The parameter $V_{load}$ can be constrained within a range of, for example, 290-353 V, and the bus voltage $V_{bus}$ in the power transmission apparatus can be constrained to a range of, for example, 390-440 V. The frequency of the transmitted power can be constrained within a range from 81.88-89.5 kHz, for example. With constraints in place, the FOM can be evaluated as $$FOM = \eta \times (\eta > 0.90?) \times (V_{bus,min} \leq V_{bus} \leq V_{bus,max}?) \times (5° \leq \varphi \leq 45°?)$$

where, as described previously, η is the efficiency of the system, $V_{bus}$ is the system's bus voltage, and φ is the phase of the complex input impedance to the amplifier in the source. Note that the above equation for FOM differs slightly from the FOM equation discussed previously, in that a different test value for η is used in the first bracketed term, and in the second bracketed term, the generalized limits $V_{bus, min}$ and $V_{bus, max}$ are used in place of specific values for these parameters. In general, the specific values for the various parameters in the bracketed test terms can be selected as desired to simulate, adjust and optimize wireless power transfer systems having a wide variety of configurations.

Also, as discussed above, FOM optimization techniques can be combined with the frequency tuning methods disclosed herein to ensure that wireless power transfer systems operate at high efficiency. To optimize a system, for example, FOM calculations can be performed iteratively. At each iteration in the optimization process, impedance matching networks are selected, and then for each point in k-$V_{load}$ space, an operating frequency is selected. At each point in k-$V_{load}$ space, FOM is then calculated, and individual FOMs can be averaged together (or combined in other ways, such as by computing the median and/or applying other constraints).

The method by which the operating frequency is selected can affect the results of the FOM-based optimization. In some embodiments, the frequency that is selected is the one that maximizes the calculated FOM. However, determining that frequency value can be difficult in practice. Thus, in certain embodiments, the frequency that is selected for the FOM optimization is the frequency that minimizes the phase in power source 3206 (i.e., the frequency that results in the smallest CapDetect value, as discussed in connection with FIG. 37). Frequency values selected in this manner typically yield FOM values that are nearly as large as those derived from pure optimization based on the frequency.

Hardware and Software Implementation

The steps described above in connection with various methods for inductance tuning, signal generation and detection, and logic operations, can be implemented in electrical circuits, in logic units, and/or in one or more electronic processors executing computer programs generated using standard programming techniques. Such programs are designed to execute on programmable computers, processors, or specifically designed integrated circuits, each comprising an electronic processor, a data storage system (including memory and/or storage elements), at least one input device, and least one output device, such as a display or printer. The program code is applied to input data (e.g., measured and/or generated signals) to perform the functions described herein and generate output information (e.g., control signals), which is applied to one or more circuit components such as tunable inductors, signal generators, and detectors. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the analysis and control functions described herein. Electronic processors can, in general, be configured through software instructions to perform any of the method steps, analysis functions, and control functions disclosed herein.

Other Embodiments

Although the foregoing disclosure focuses largely on attributes and features of the source resonator in a wireless power transfer system, the features, steps, and systems, and devices disclosed herein are also generally applicable to the receiver resonator in a wireless power transfer system. For example, the receiver resonator can include one or more impedance matching networks that can include any of the tunable inductors disclosed herein.

Additional features and examples of wireless power transfer systems that implement impedance tuning are disclosed, for example, in U.S. Patent Application Publication No. 2011/0193416, the entire contents of which are incorporated herein by reference.

A number of embodiments have been described. Nevertheless, it will be understood that various modifications may be made without departing from the spirit and scope of the disclosure. Accordingly, other embodiments are within the scope of the following claims.

What is claimed is:

1. A power transmitting apparatus configured to wirelessly transmit power to a power receiving apparatus connected to an electrical load, the power transmitting apparatus comprising:
a circuit comprising an inductive element formed by at least one loop of conductive material, wherein the inductive element forms a resonator with at least a portion of the circuit; and
a controller configured to:
receive information about a phase difference between a voltage waveform and a current waveform associated with impedance matching circuitry of a power source of the power transmitting apparatus;
determine whether the phase difference is within an allowable range of phase differences;
adjust an impedance of the circuit if the phase difference is outside the allowable range of phase differences; and
adjust at least one of a phase, a duty cycle, and a bus voltage of an amplifier of the power source if the phase difference is within the allowable range of phase differences to drive the power transmitting apparatus toward a target output power.

2. The apparatus of claim 1, wherein the controller is further configured to receive information about a phase difference between a voltage waveform and a current waveform associated with an amplifier of the power source of the power transmitting apparatus.

3. The apparatus of claim 1, wherein the voltage and current waveforms correspond to one member selected from the group consisting of voltage and current waveforms within the impedance matching circuitry, voltage and current waveforms at an output of the impedance matching circuitry, and voltage and current waveforms at an input of the impedance matching circuitry.

4. The apparatus of claim 1, wherein the controller is configured to adjust the impedance of the circuit to reduce the phase difference.

5. The apparatus of claim 4, further comprising:
a detector coupled to the power source and to the controller, and comprising:
a first input terminal configured to receive a first waveform corresponding to the voltage waveform;
a second input terminal configured to receive a second waveform corresponding to the current waveform; and
at least one logic unit, wherein the at least one logic unit is configured to generate an output waveform that corresponds to the phase difference between the first and second waveforms; and
wherein the controller is configured to receive the output waveform from the detector.

6. The apparatus of claim 5, wherein the at least one logic unit comprises:
a first logic unit connected to the first and second input terminals and configured to produce a third waveform based on the first and second waveforms; and
a second logic unit configured to receive the third waveform and configured to produce the output waveform based on the third waveform.

7. The apparatus of claim 5, wherein the output waveform comprises a pulse having a width that corresponds to a temporal offset between the first and second electrical signals.

8. The apparatus of claim 7, wherein the first logic unit is configured to perform an AND logical operation, and the second logic unit is configured to perform an XOR logical operation.

9. The apparatus of claim 4, wherein the controller is configured to reduce the impedance of the circuit to reduce the phase difference.

10. The apparatus of claim 4, wherein the controller is configured to increase the impedance of the circuit to increase the phase difference.

11. The apparatus of claim 1, wherein the controller is configured to adjust a frequency of the power source based on the target output power of the power transmitting apparatus.

12. The apparatus of claim 1, wherein the power transmitting apparatus is configured to transmit power to the power receiving apparatus when the power receiving apparatus is mounted to an electric vehicle.

13. The apparatus of claim 1, wherein the power transmitting apparatus is configured to transmit power to the power receiving apparatus when the electrical load comprises one or more batteries of an electric vehicle.

14. A method comprising:
wirelessly transferring power from a power transmitting apparatus to a power receiving apparatus connected to an electrical load;
receiving a first electrical signal comprising information about a voltage waveform associated with impedance matching circuitry of a power source of the power transmitting apparatus;
receiving a second electrical signal comprising information about a current waveform associated with the impedance matching circuitry of the power source;
determining a phase difference between the first and second electrical signals;
determining whether the phase difference is within an allowable range of phase differences;
adjusting an impedance of a circuit of the power transmitting apparatus if the phase difference is outside the allowable range of phase differences; and
adjusting at least one of a phase, a duty cycle, and a bus voltage of an amplifier of the power source if the phase difference is within the allowable range of phase differences to drive the power transmitting apparatus toward a target output power.

15. The method of claim 14, further comprising adjusting a frequency of a component of the power source based on the target output power of the power transmitting apparatus.

16. The method of claim 14, further comprising adjusting at least one of an inductor and a capacitor of the circuit based on the phase difference to adjust the impedance of the circuit.

17. The method of claim 14, comprising adjusting the impedance of the circuit to minimize the phase difference.

* * * * *